United States Patent
Shinkai et al.

(10) Patent No.: US 10,197,849 B2
(45) Date of Patent: Feb. 5, 2019

(54) ILLUMINATION APPARATUS AND DISPLAY UNIT

(71) Applicant: Sony Corporation, Tokyo (JP)

(72) Inventors: Shogo Shinkai, Kanagawa (JP); Akira Ebisui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1129 days.

(21) Appl. No.: 14/398,845

(22) PCT Filed: Apr. 30, 2013

(86) PCT No.: PCT/JP2013/062634
§ 371 (c)(1),
(2) Date: Nov. 4, 2014

(87) PCT Pub. No.: WO2013/168638
PCT Pub. Date: Nov. 14, 2013

(65) Prior Publication Data
US 2015/0109763 A1   Apr. 23, 2015

(30) Foreign Application Priority Data

May 9, 2012 (JP) .................................. 2012-107772

(51) Int. Cl.
*G02F 1/13357* (2006.01)
*G02F 1/1343* (2006.01)
(Continued)

(52) U.S. Cl.
CPC .......... *G02F 1/1336* (2013.01); *G02B 6/005* (2013.01); *G02F 1/133615* (2013.01);
(Continued)

(58) Field of Classification Search
CPC ..................... G02F 1/1336; G02F 1/134309
See application file for complete search history.

(56) References Cited

U.S. PATENT DOCUMENTS 6,285,420 B1 * 9/2001 Mizumo .............. G02B 6/0056
349/65
6,795,136 B2 * 9/2004 Umemoto ......... G02F 1/133615
349/61
(Continued)

FOREIGN PATENT DOCUMENTS

JP        06-347790       12/1994
JP        2001-042329      2/2001
(Continued)

OTHER PUBLICATIONS

International Search Report issued in connection with International Patent Application No. PCT/JP2013/062634, dated Jun. 11, 2013. (2 pages).

*Primary Examiner* — Dung Nguyen
(74) *Attorney, Agent, or Firm* — K&L Gates LLP

(57) ABSTRACT

An illumination apparatus includes a pair of substrates arranged oppositely to each other with a distance, and a light source disposed on a side surface of one of the pair of substrates. The illumination apparatus further includes an electrode that is provided on a surface of each of the pair of substrates and generates an electric field in a direction intersecting perpendicularly to the surface of the substrate. The illumination apparatus further includes a light modulation layer that is disposed at a clearance between the pair of substrates and is configured to exhibit scattering property or transparency to light from the light source, based on magnitude of the electric field generated by the electrode. The electrode includes a plurality of first electrode blocks on a surface of one of the pair of substrates.

20 Claims, 42 Drawing Sheets

(51) Int. Cl.
*G02F 1/1335* (2006.01)
*F21V 8/00* (2006.01)
*G02F 1/1334* (2006.01)
*F21V 14/00* (2018.01)

(52) U.S. Cl.
CPC ...... *G02F 1/134309* (2013.01); *F21V 14/003* (2013.01); *G02B 6/0038* (2013.01); *G02B 6/0055* (2013.01); *G02B 6/0076* (2013.01); *G02F 1/1334* (2013.01); *G02F 2001/133601* (2013.01)

(56) References Cited

U.S. PATENT DOCUMENTS

| | | | |
|---|---|---|---|
| 9,052,546 B2* | 6/2015 | Shinkai | G02F 1/133615 |
| 2012/0257139 A1 | 10/2012 | Shinkai et al. | |
| 2012/0257144 A1 | 10/2012 | Shibata et al. | |
| 2015/0293402 A1* | 10/2015 | Shinkai | H04N 13/0454 349/15 |

FOREIGN PATENT DOCUMENTS

| | | |
|---|---|---|
| JP | 2002-023160 | 1/2002 |
| JP | 2008-185758 | 8/2008 |
| WO | 2011/080948 | 7/2011 |
| WO | 2012/053411 | 4/2012 |

\* cited by examiner

[ FIG. 1 ]
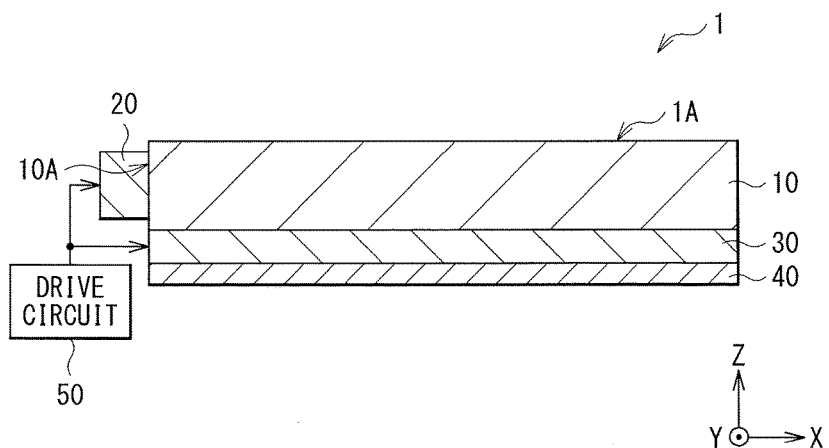
[ FIG. 2 ]
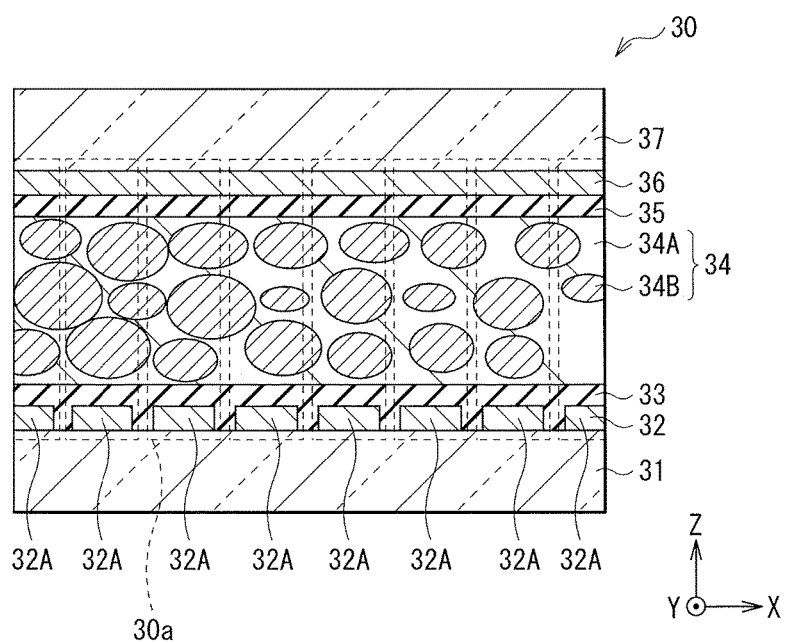

[ FIG. 3 ]
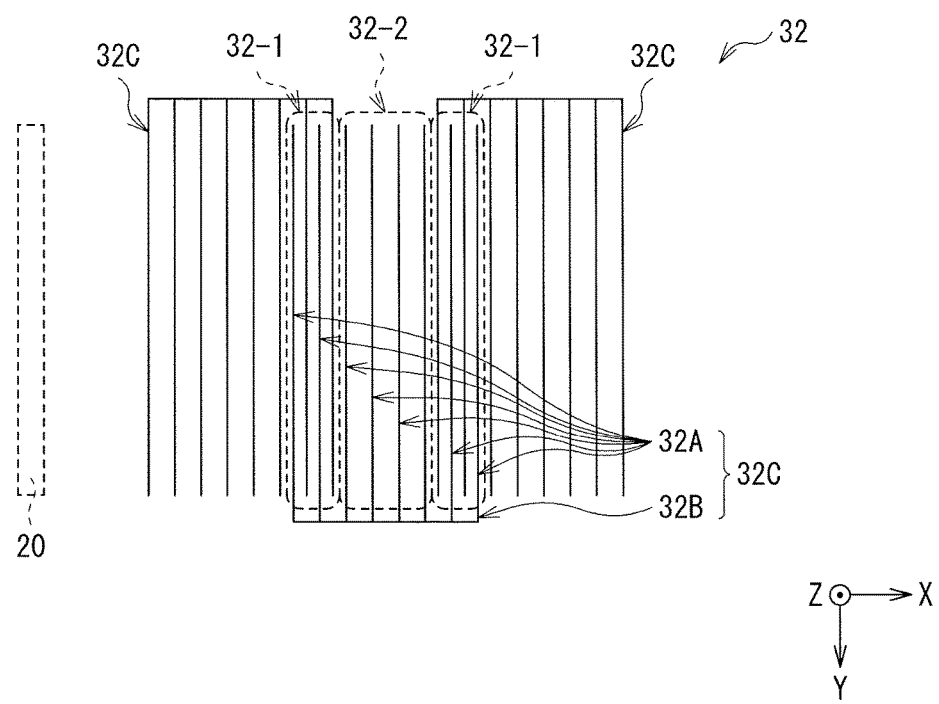

[ FIG. 4A ]
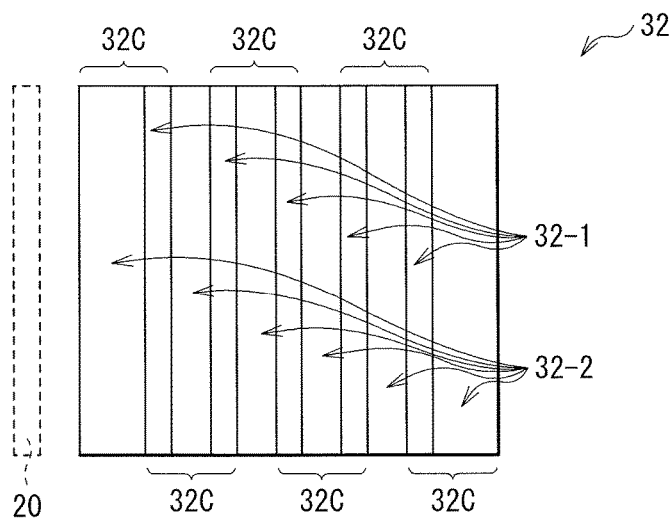
[ FIG. 4B ]
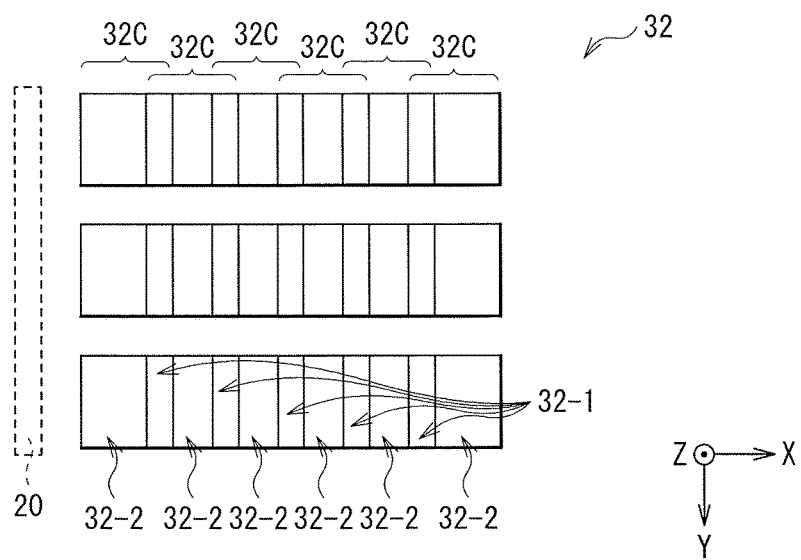

[ FIG. 5 ]
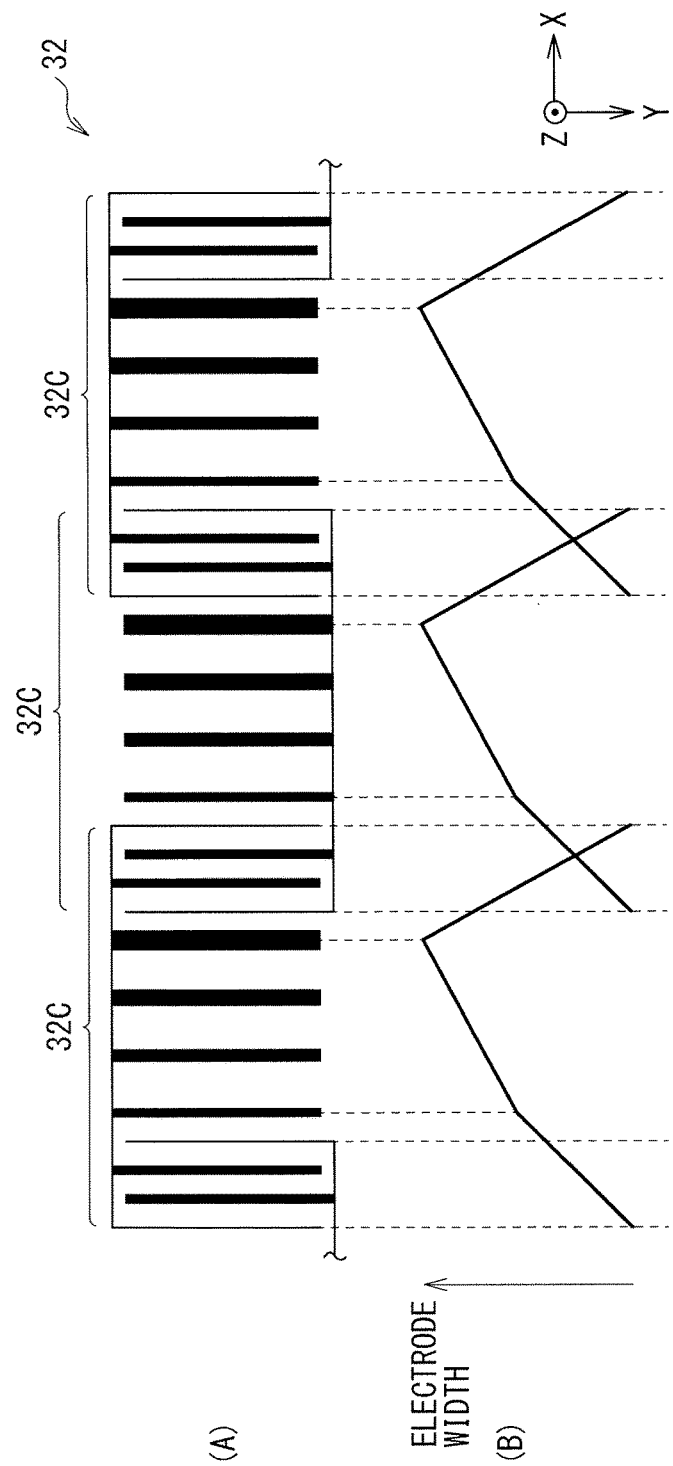

[ FIG. 6A ]
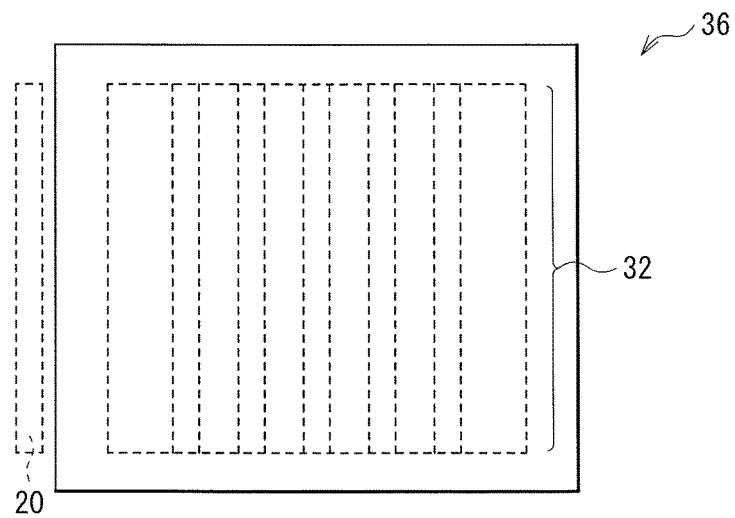
[ FIG. 6B ]
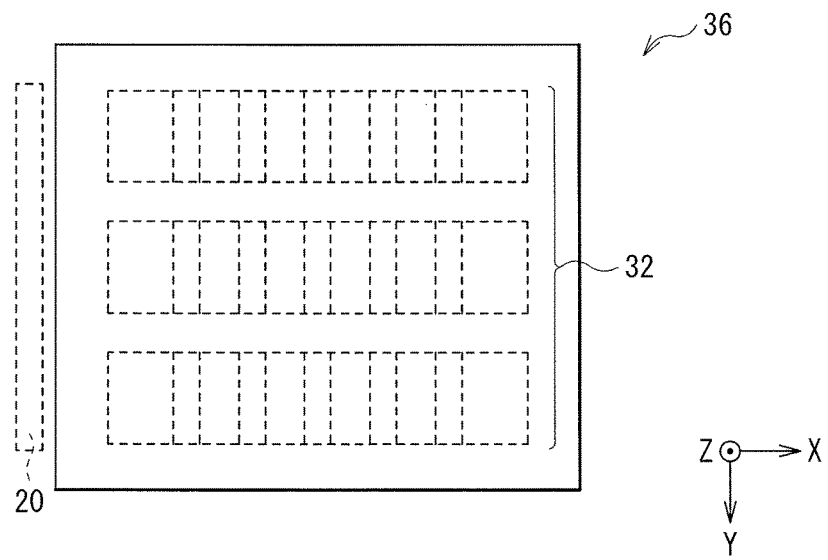

[ FIG. 7A ]
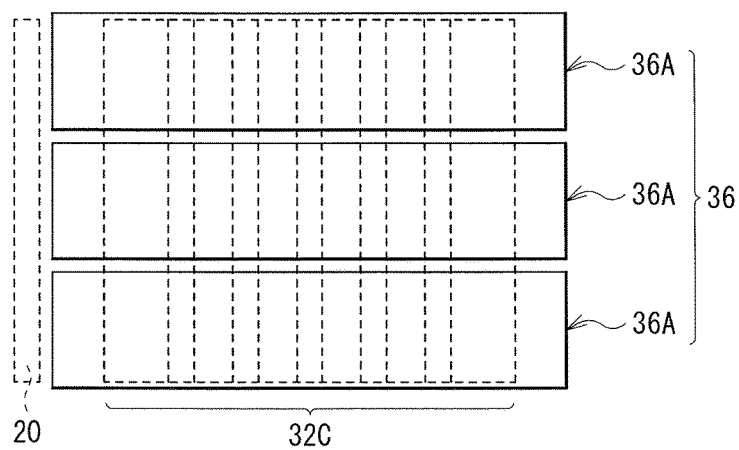
[ FIG. 7B ]
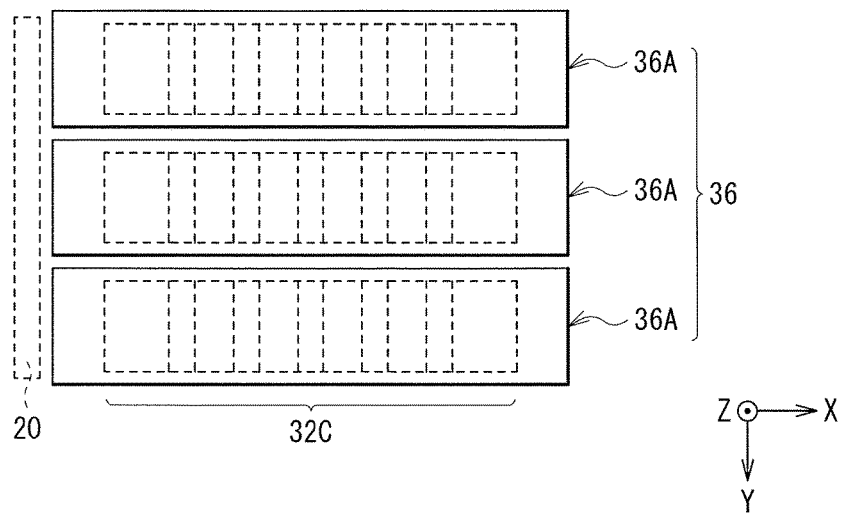

[ FIG. 8 ]
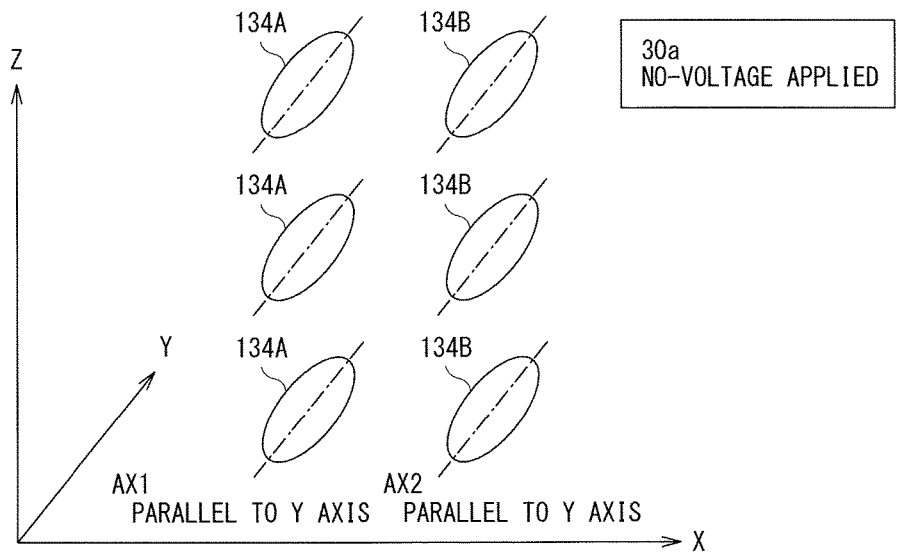
[ FIG. 9 ]
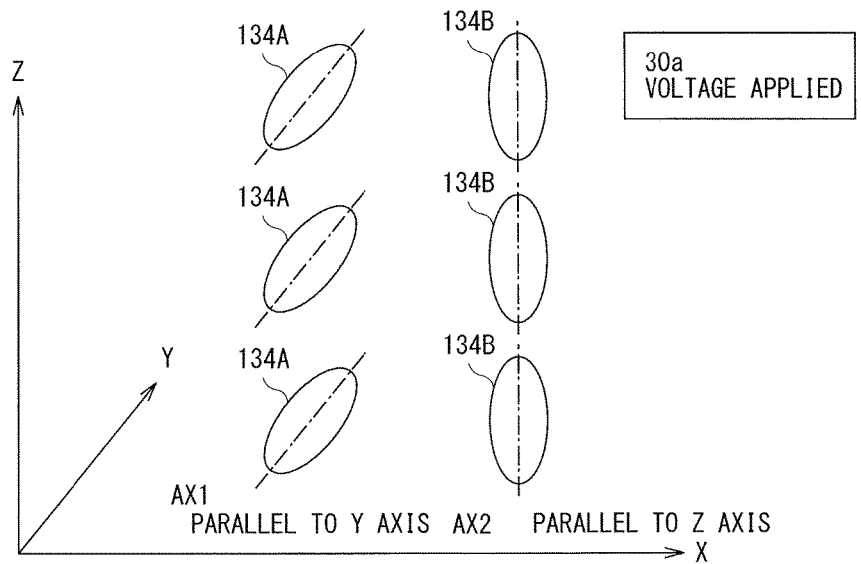

[ FIG. 10 ]
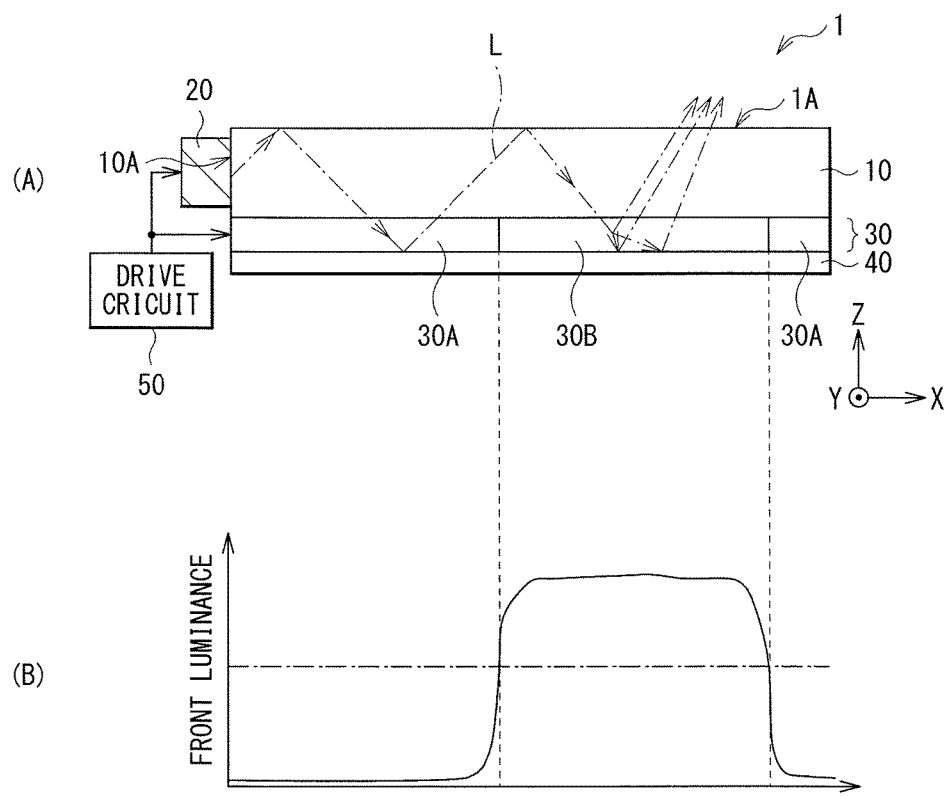

[ FIG. 11A ]
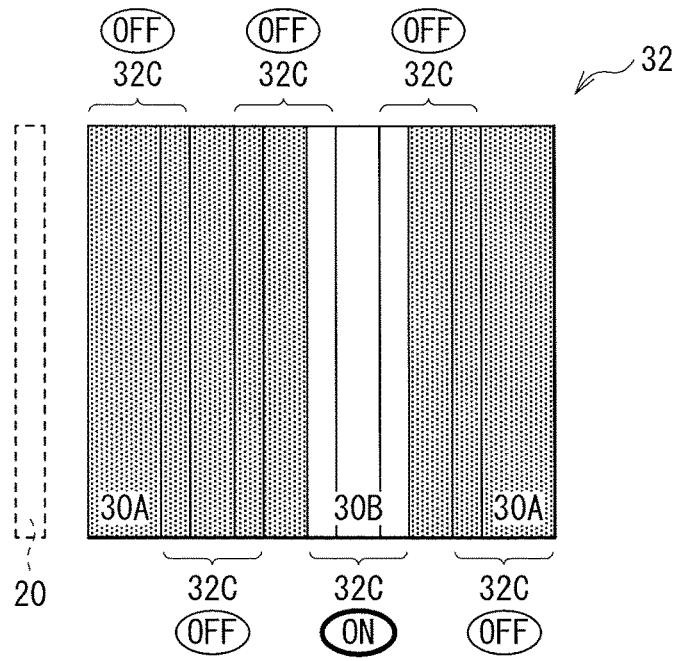
[ FIG. 11B ]
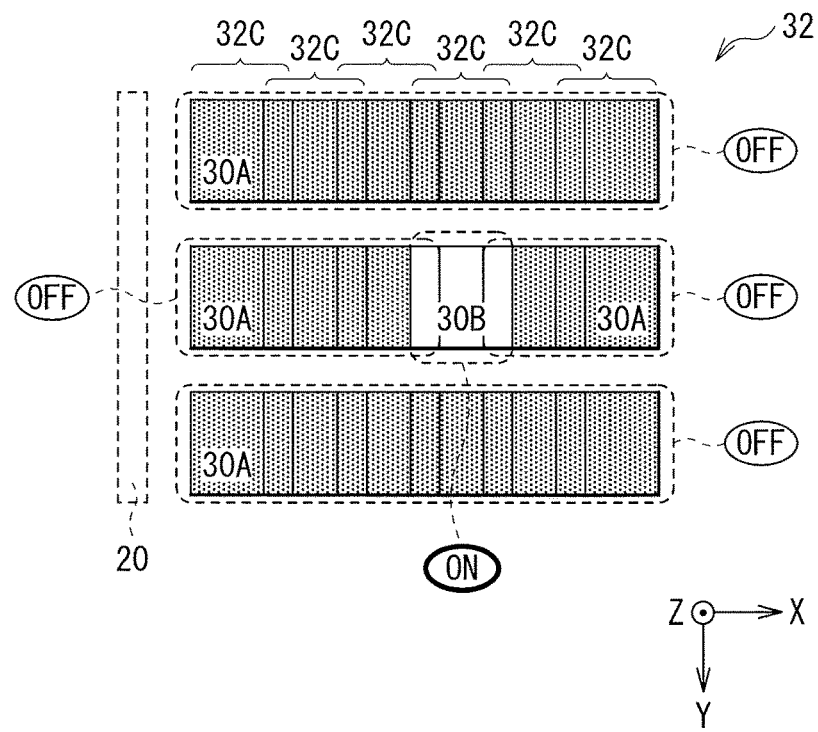

[ FIG. 12A ]
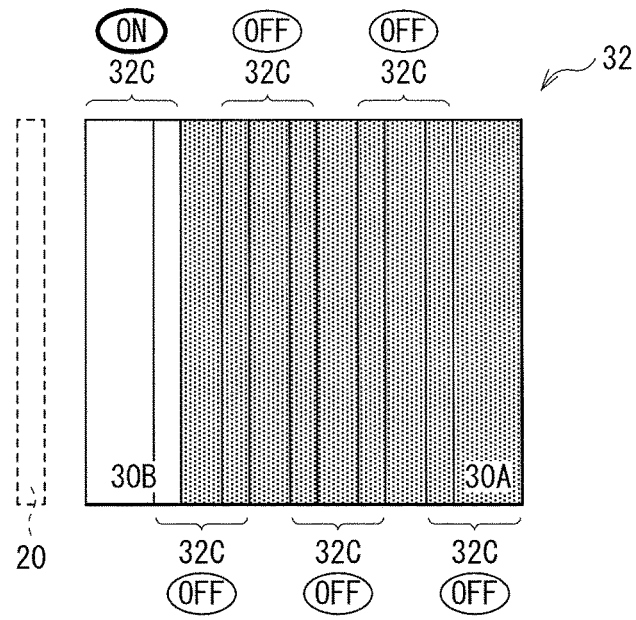
[ FIG. 12B ]
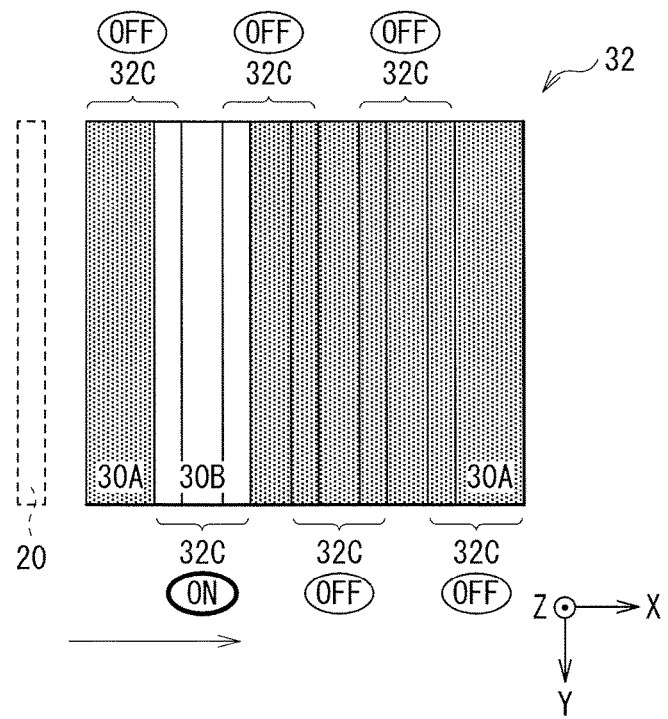

[ FIG. 13A ]
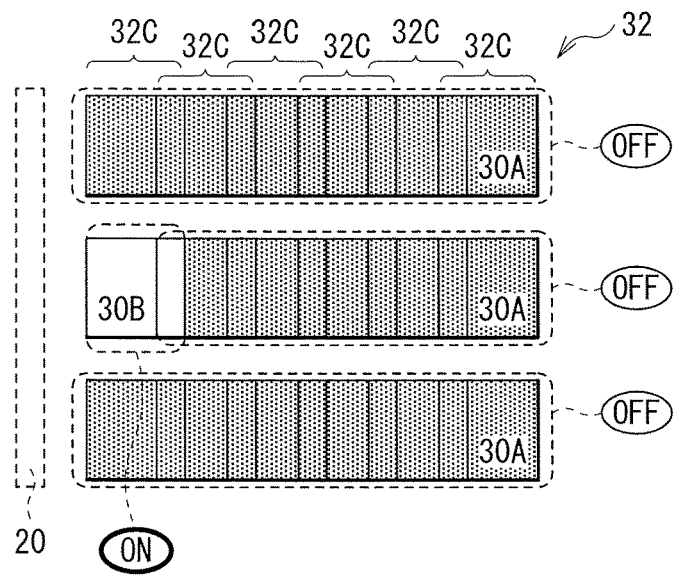
[ FIG. 13B ]
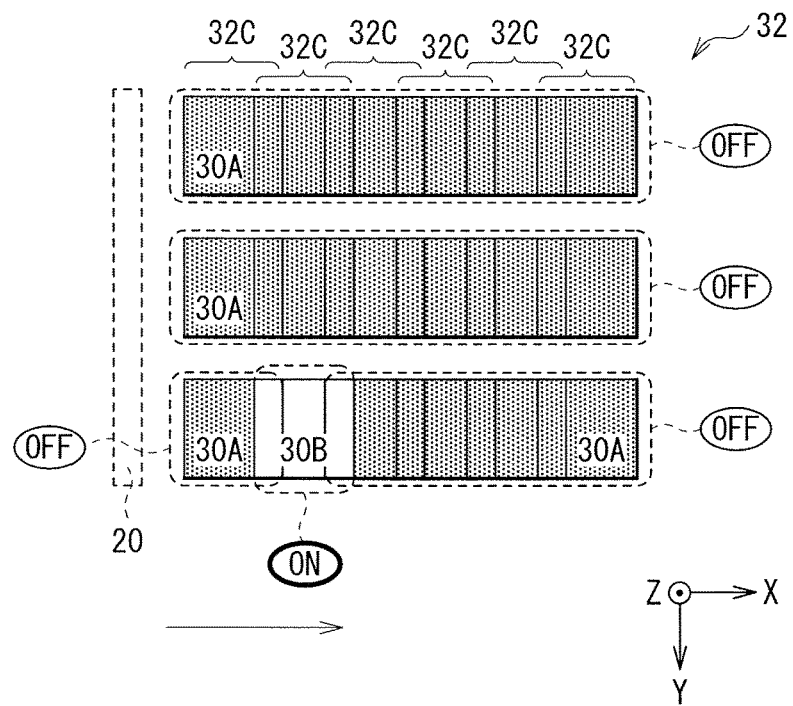

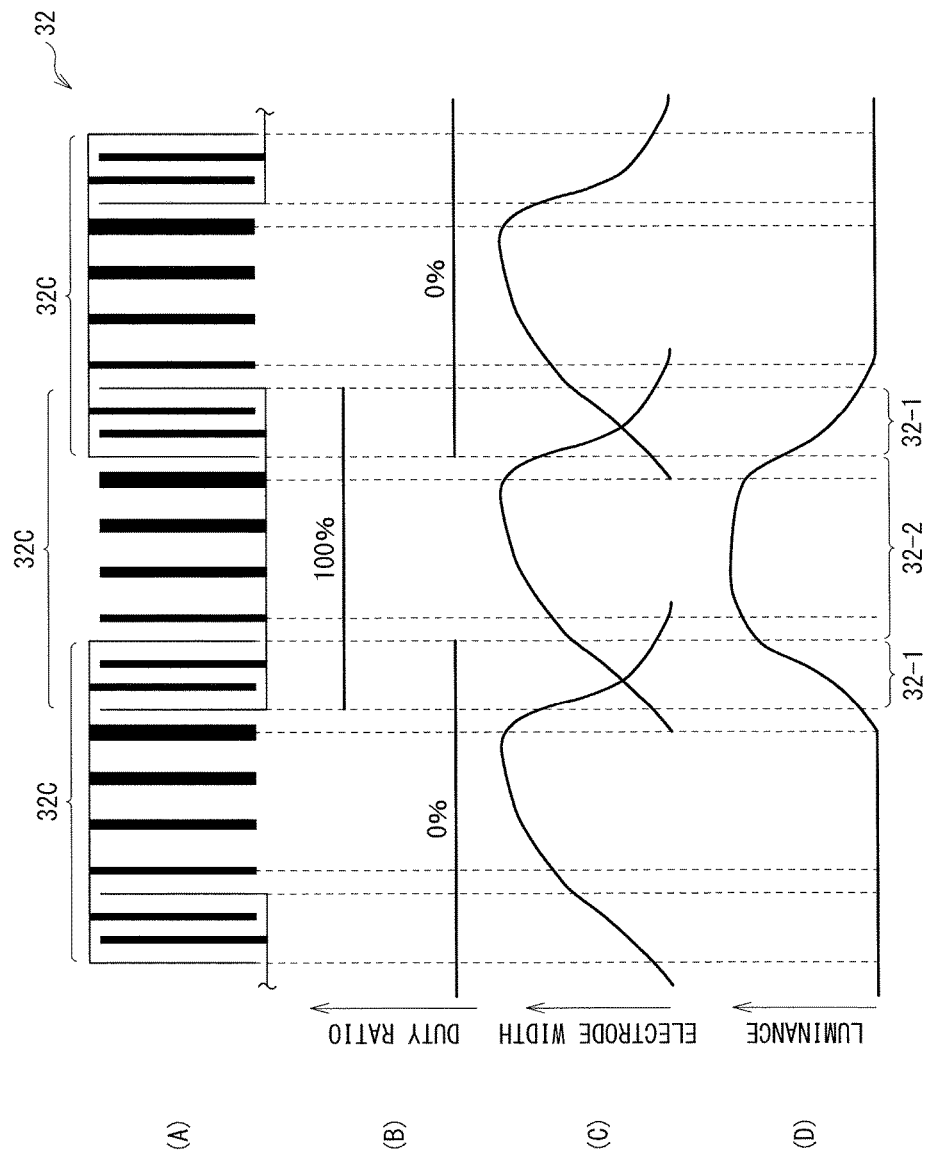
[FIG. 14]

[ FIG. 15A ]
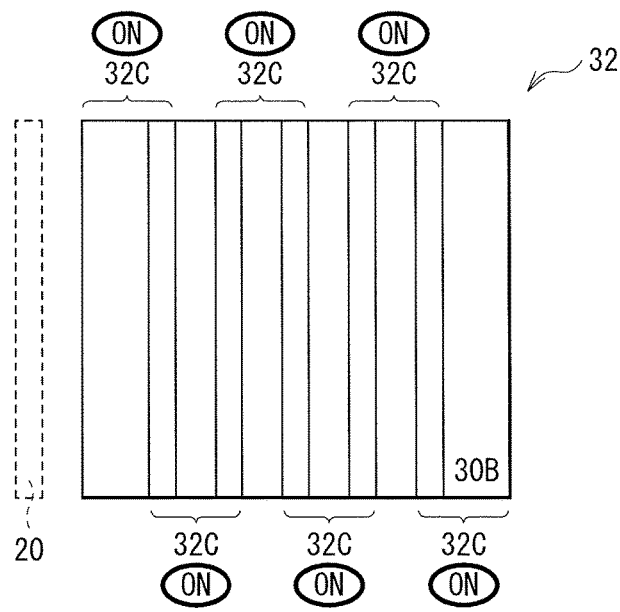
[ FIG. 15B ]
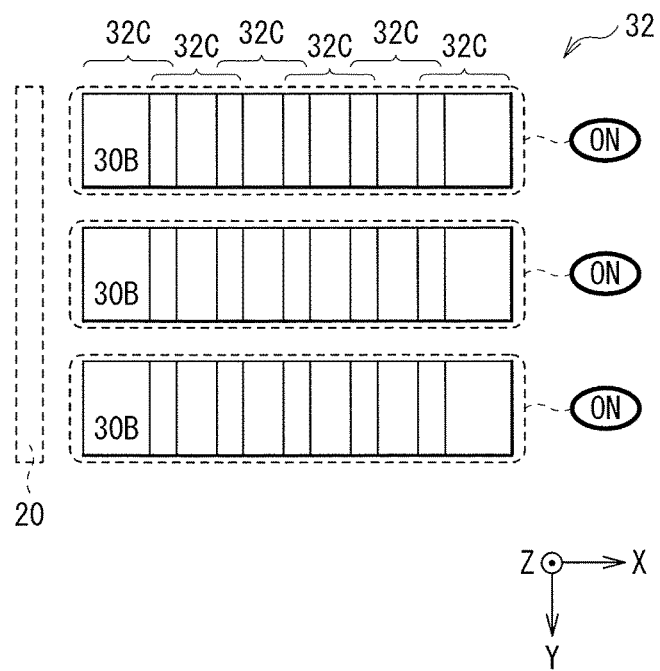

[ FIG. 16 ]
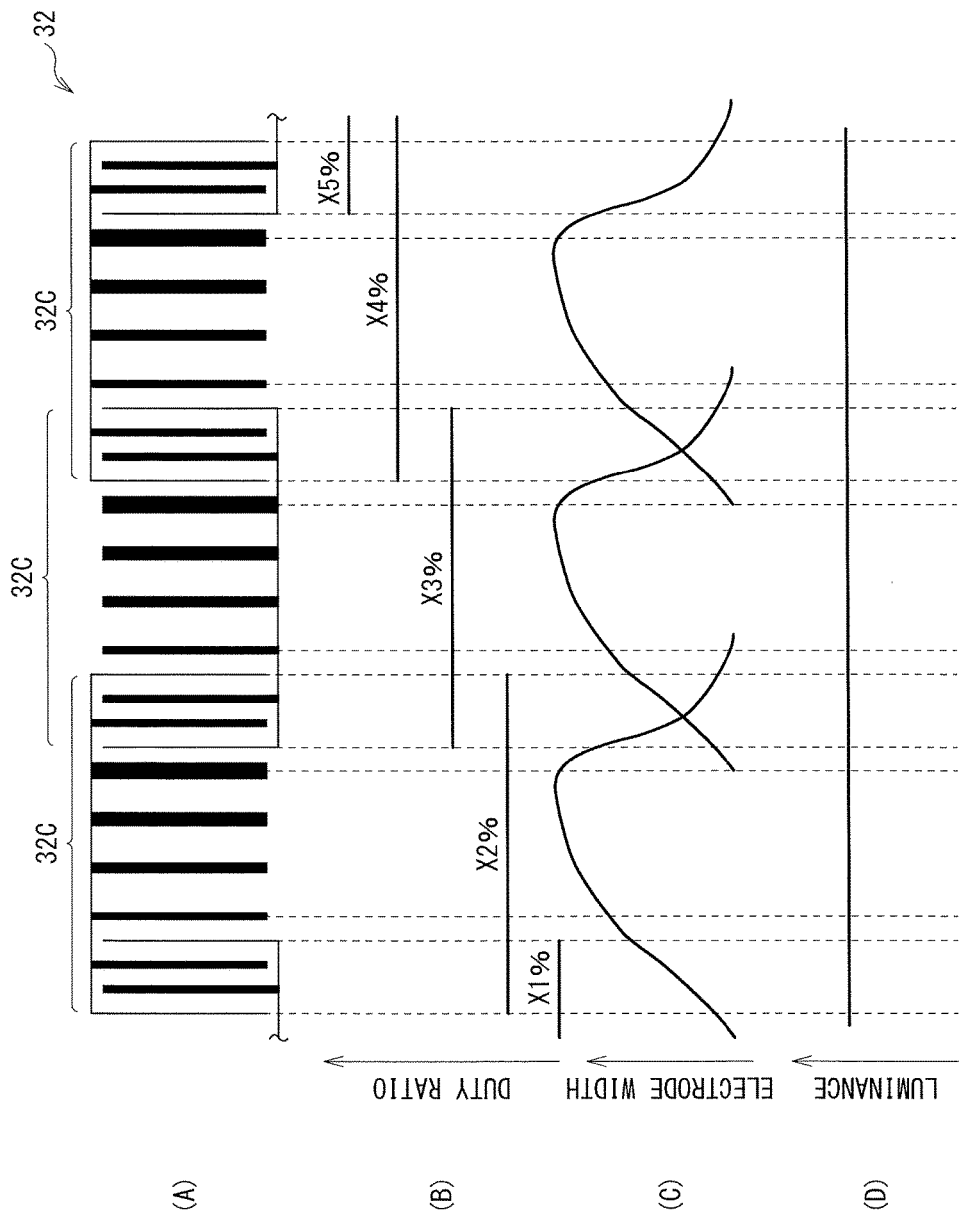

[ FIG. 17 ]
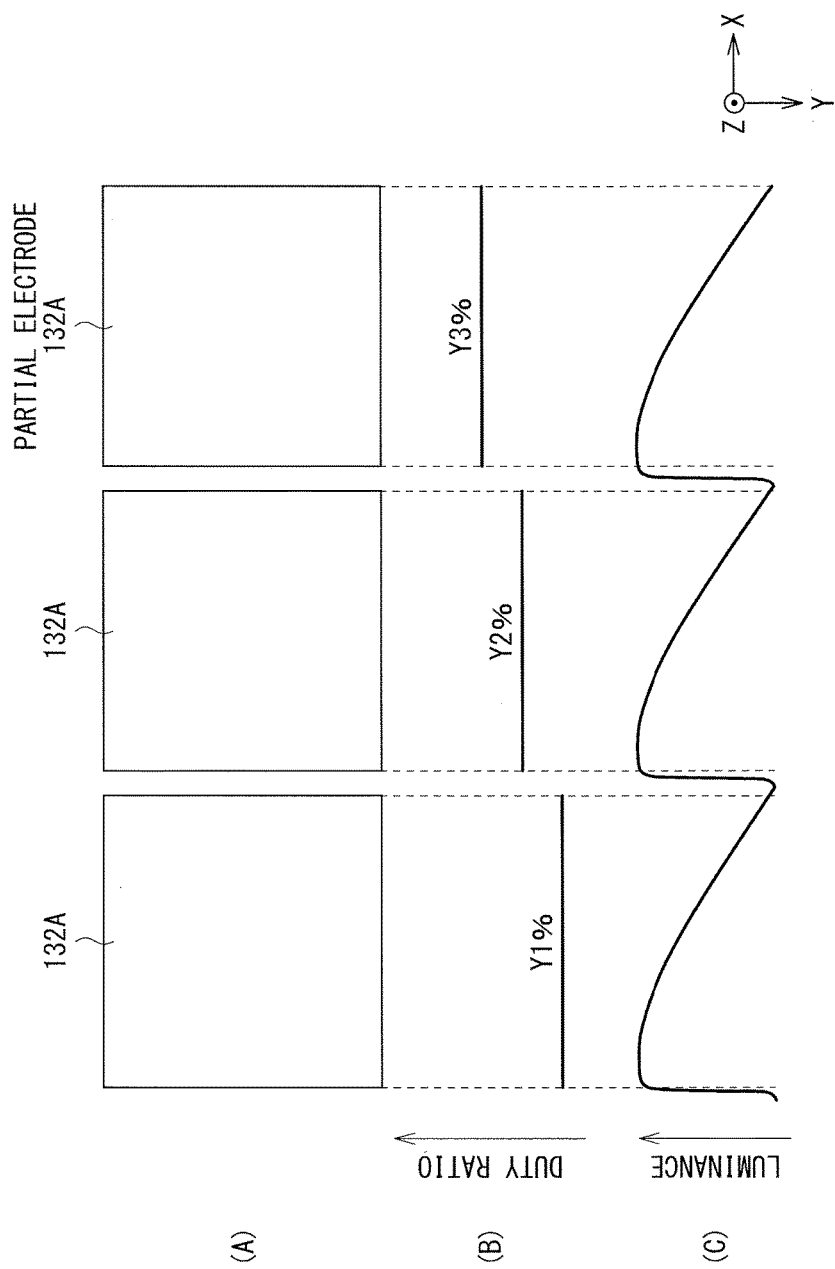

[ FIG. 18 ]
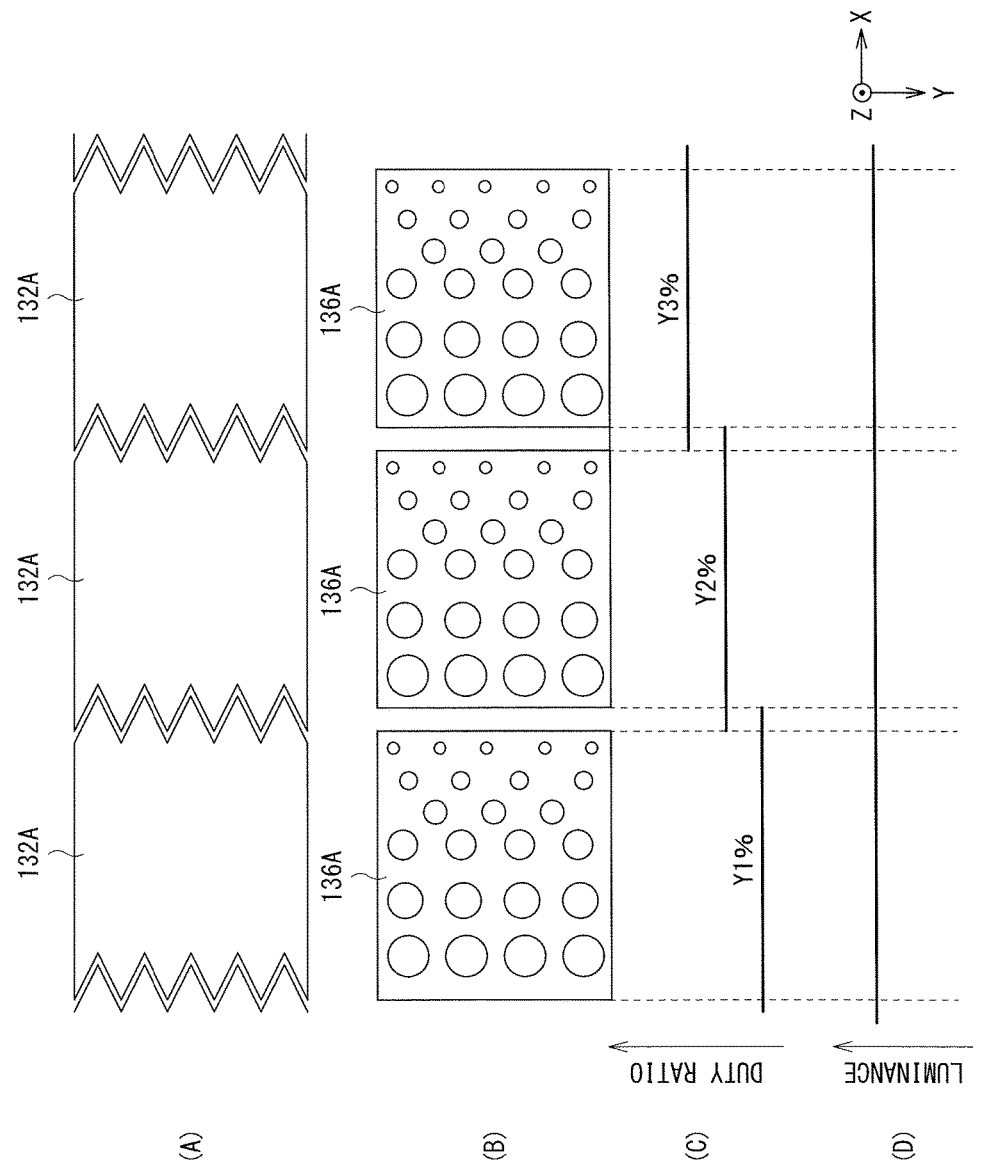

[FIG. 19]
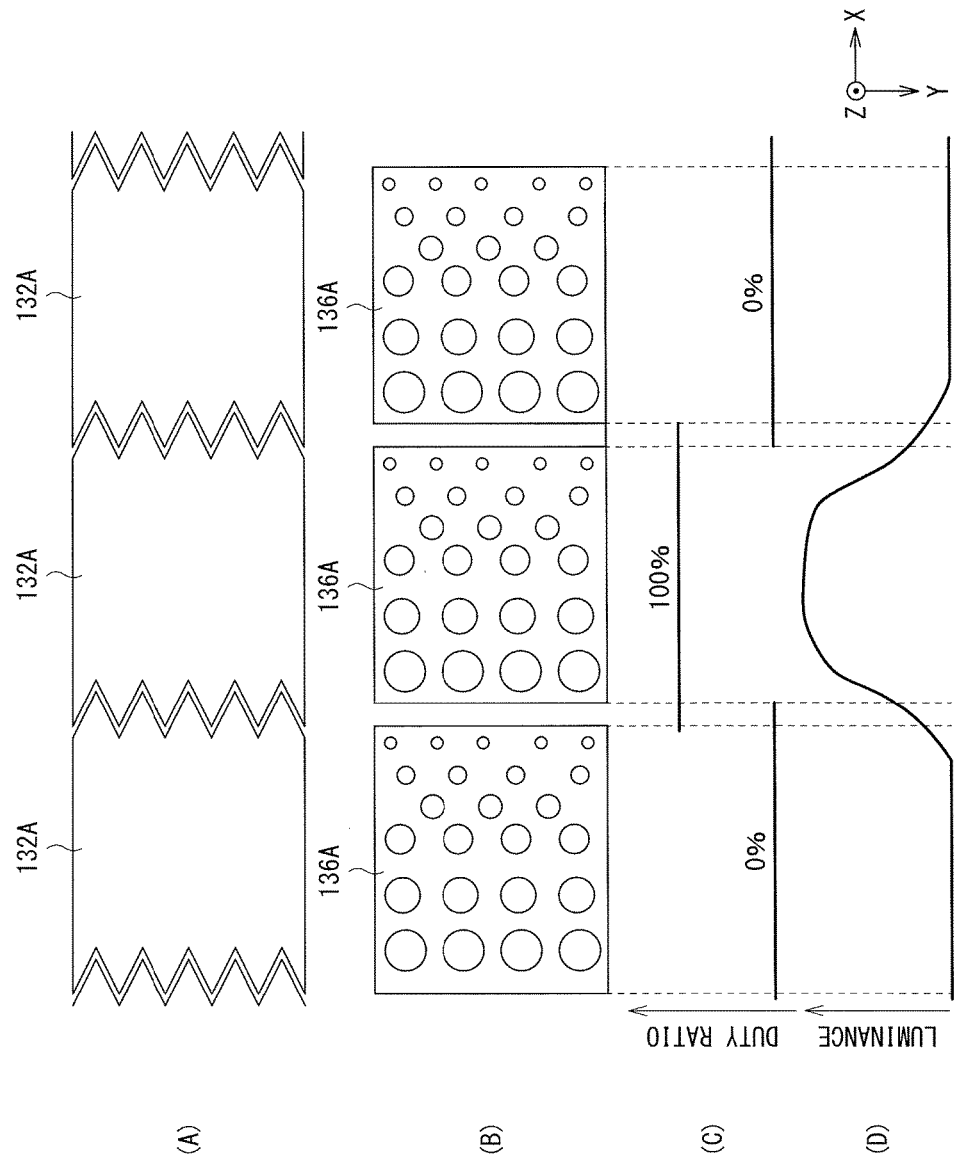

[ FIG. 20 ]
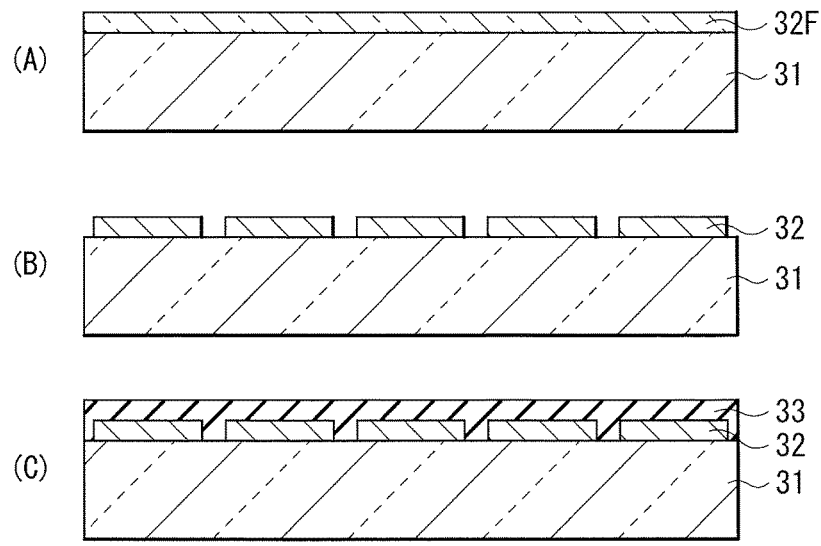
[ FIG. 21 ]
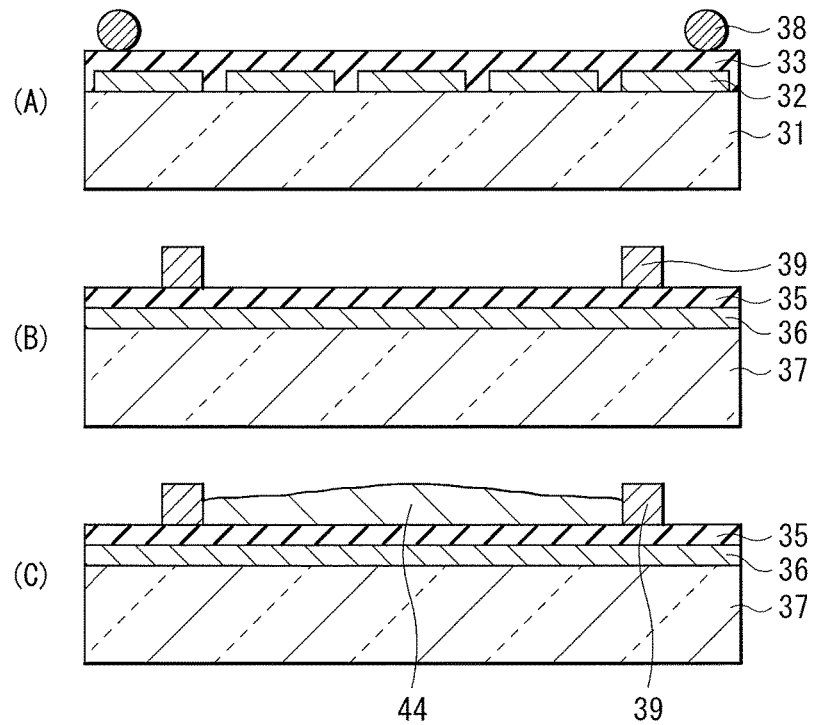

[ FIG. 22 ]
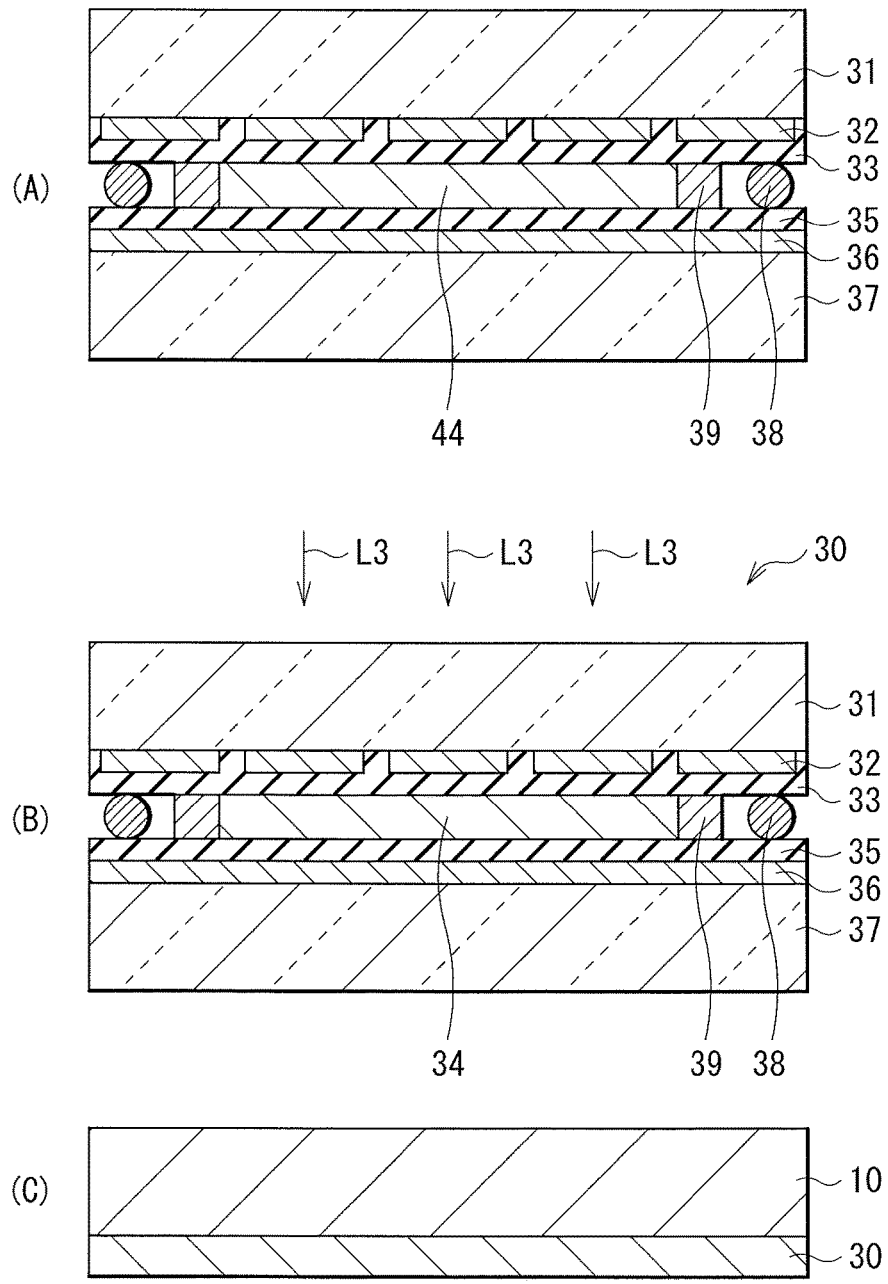

[ FIG. 23 ]
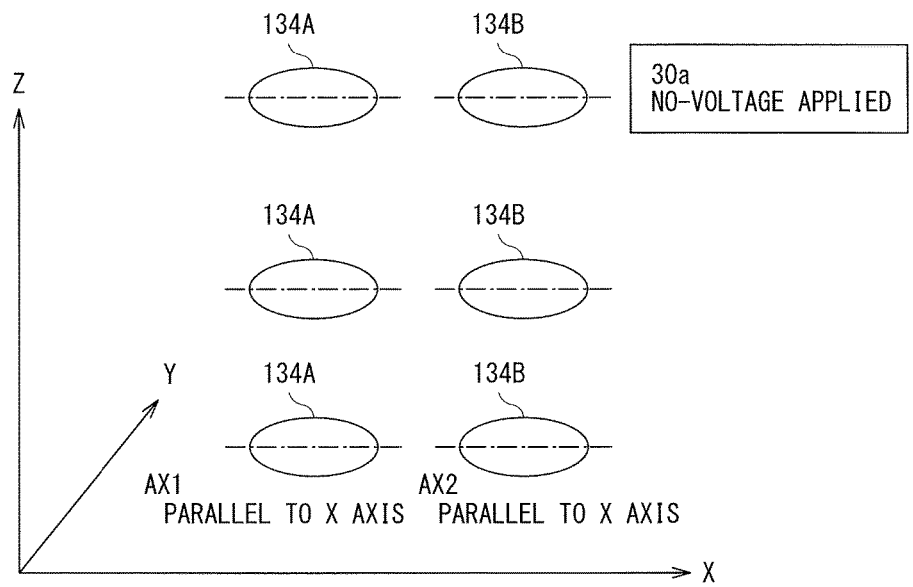
[ FIG. 24 ]
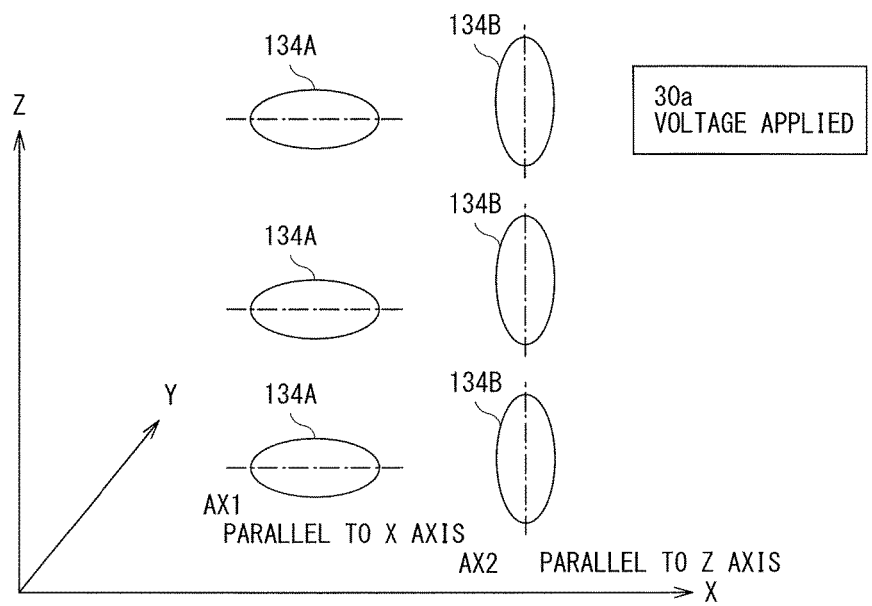

[ FIG. 25 ]
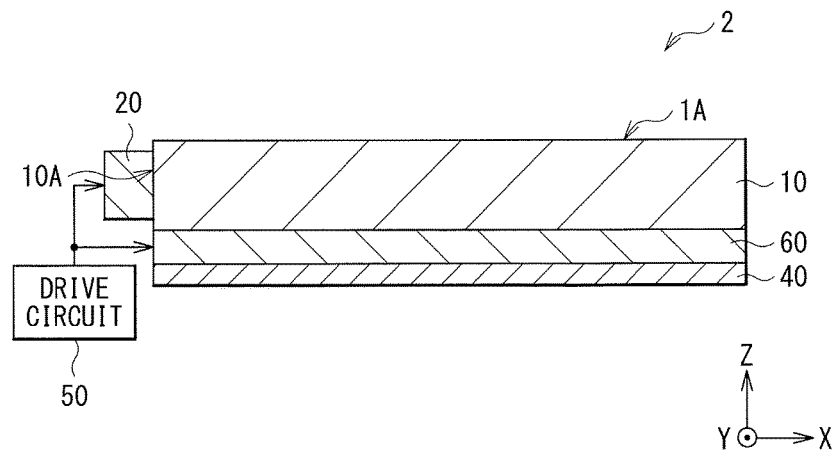
[ FIG. 26 ]
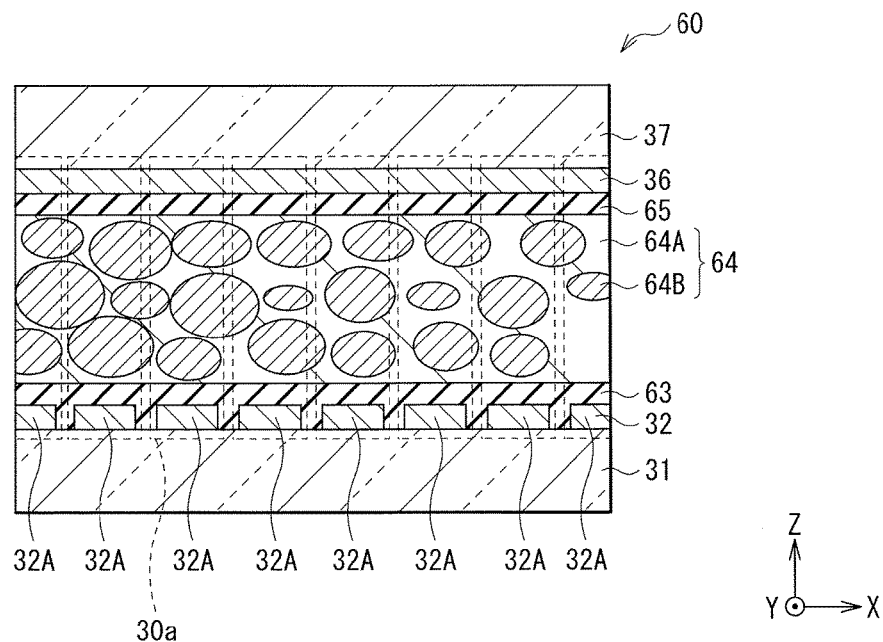

[ FIG. 27 ]
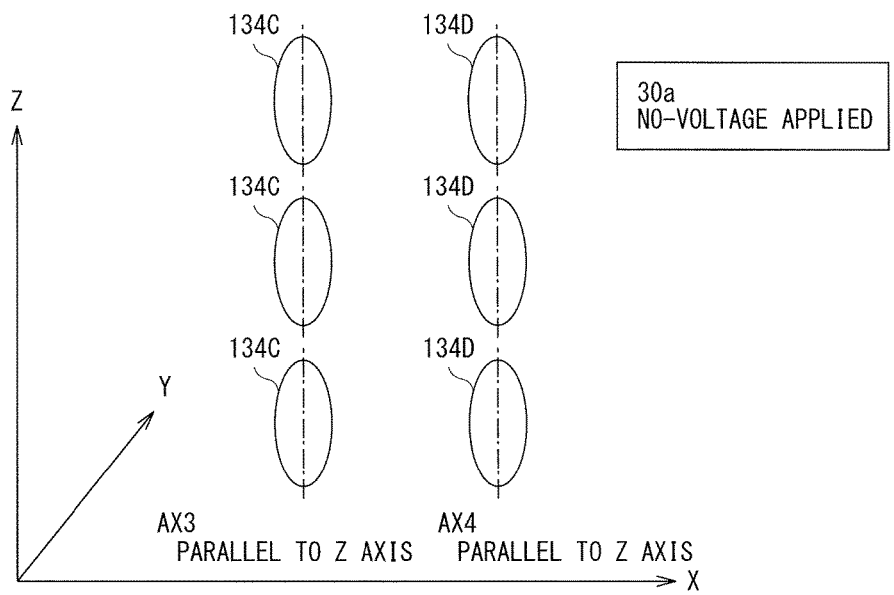
[ FIG. 28 ]
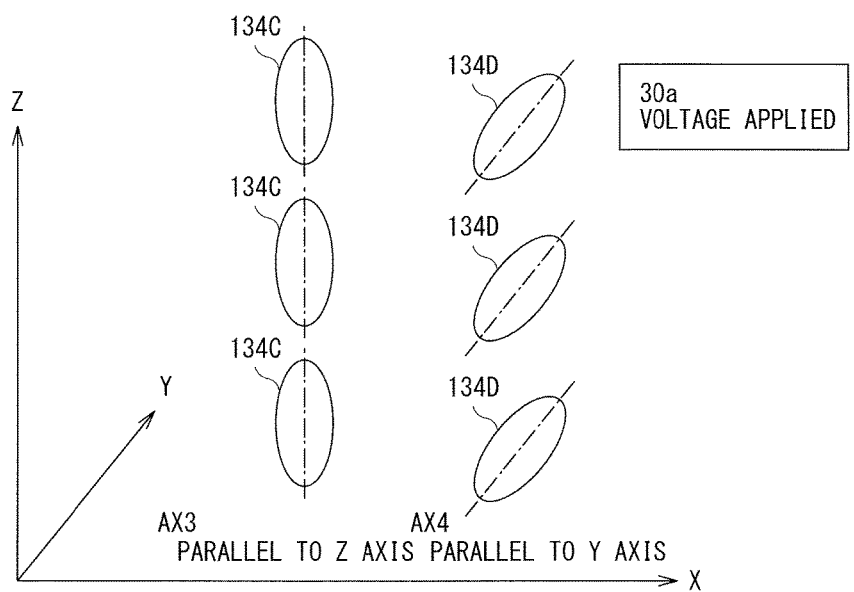

[ FIG. 29 ]
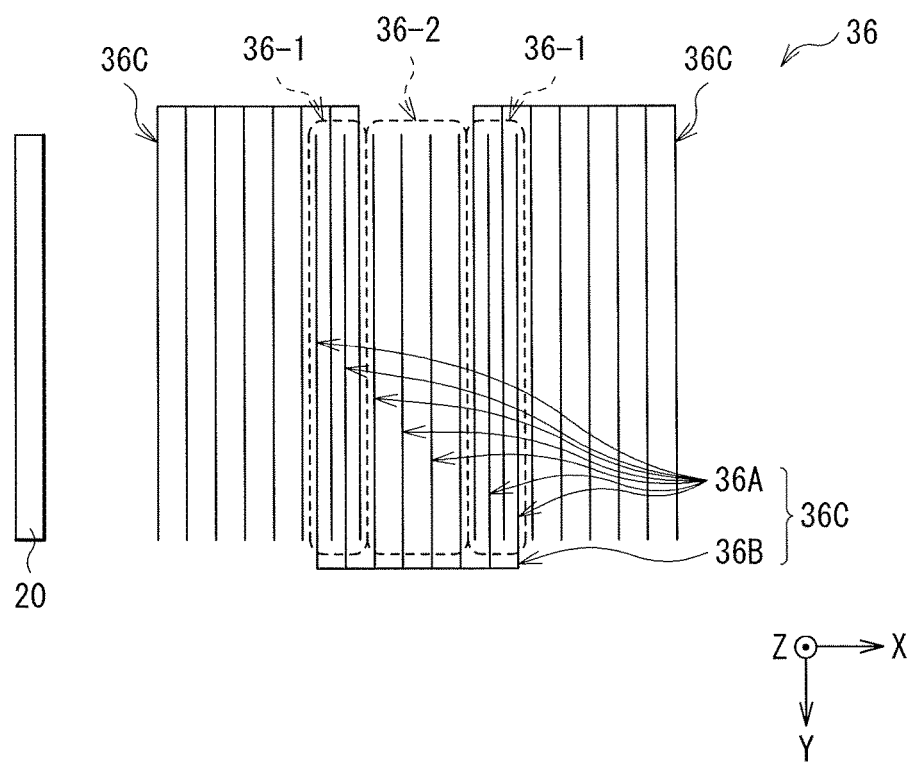

[ FIG. 30A ]
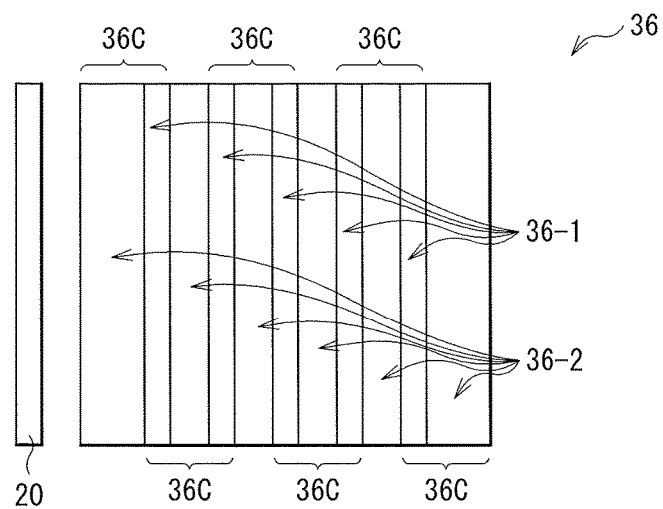
[ FIG. 30B ]
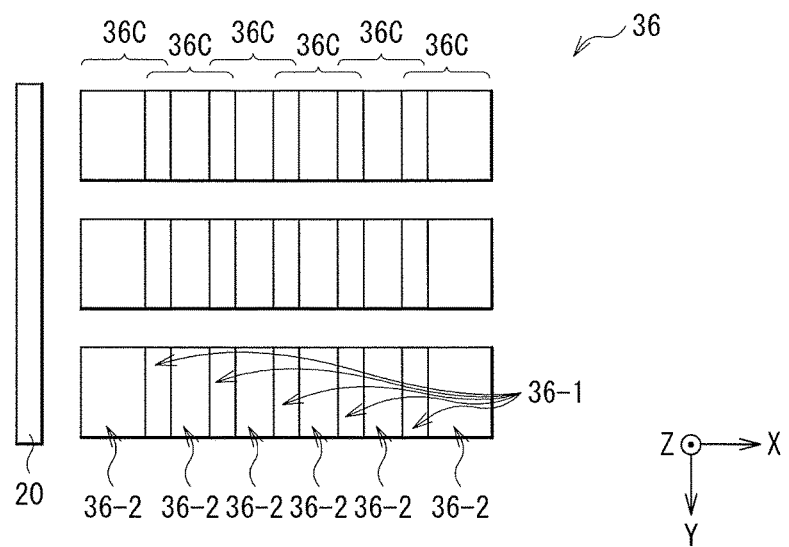

[FIG. 31]
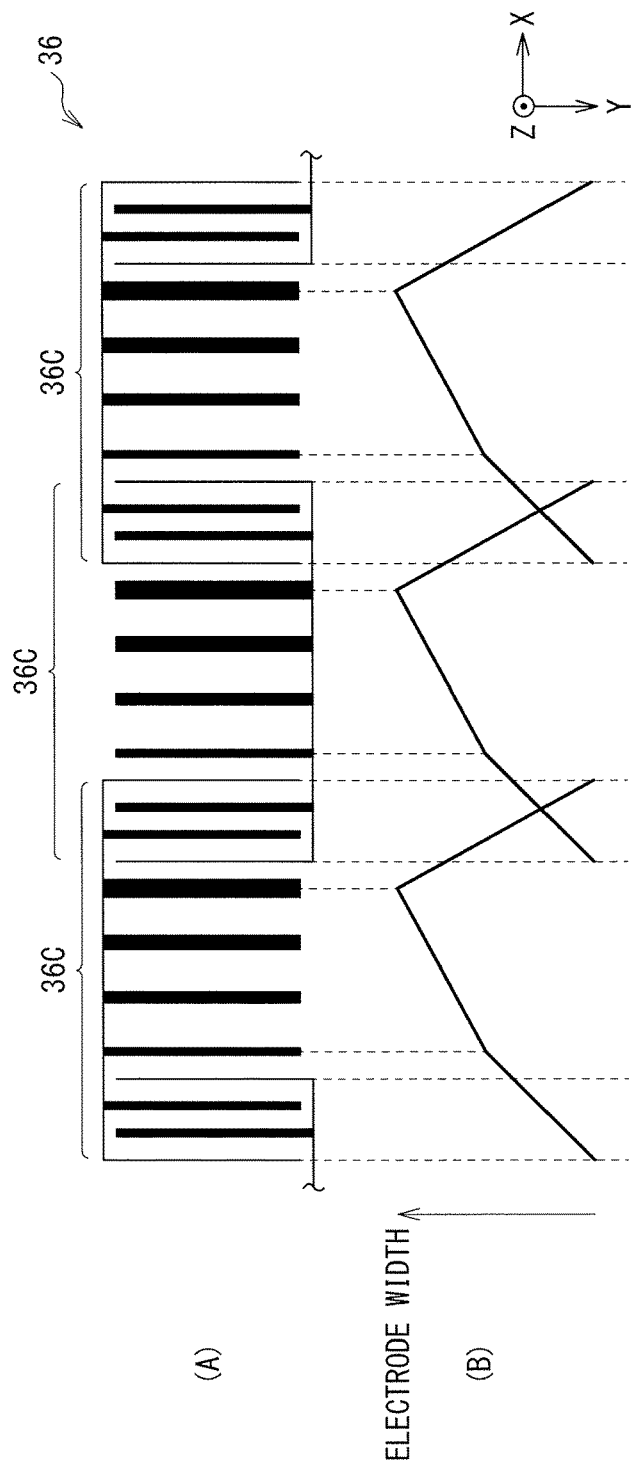

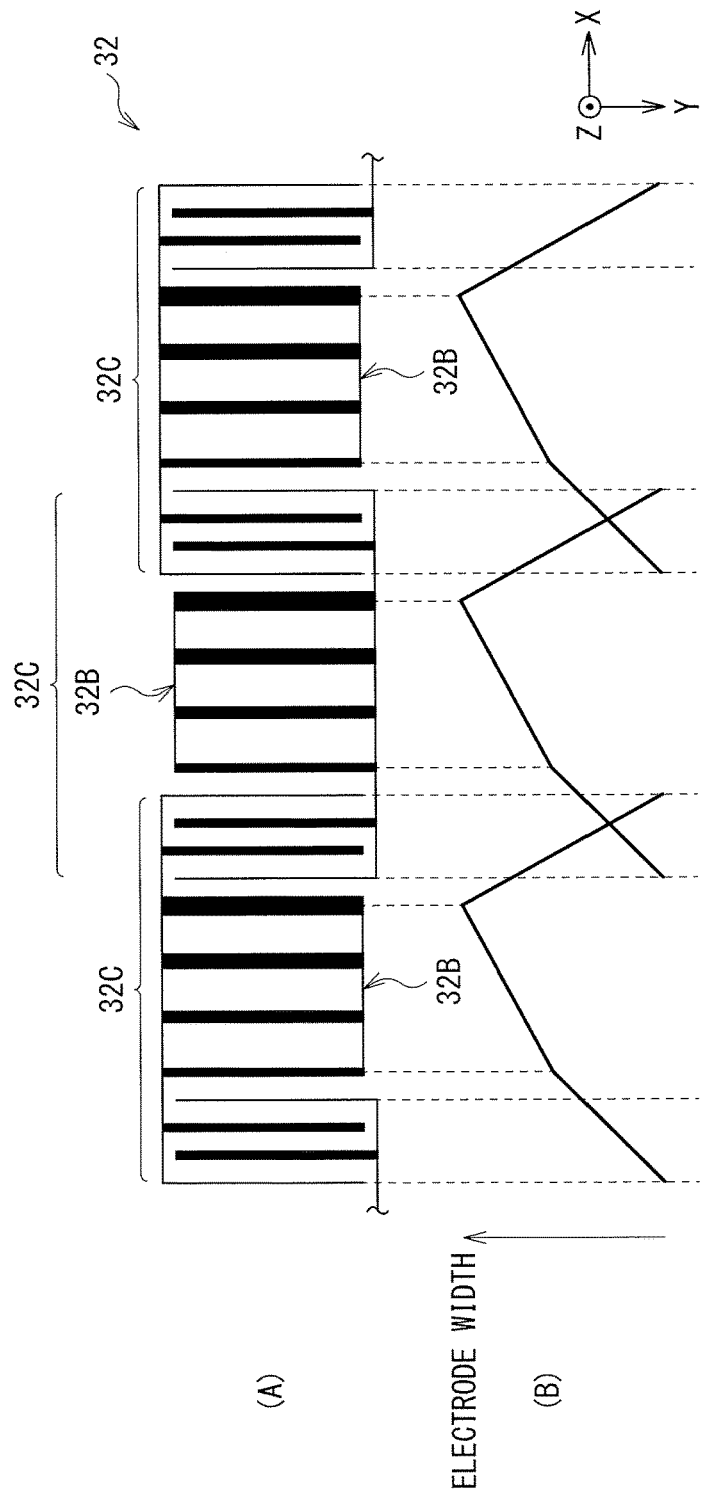
[FIG. 32]

[ FIG. 33 ]
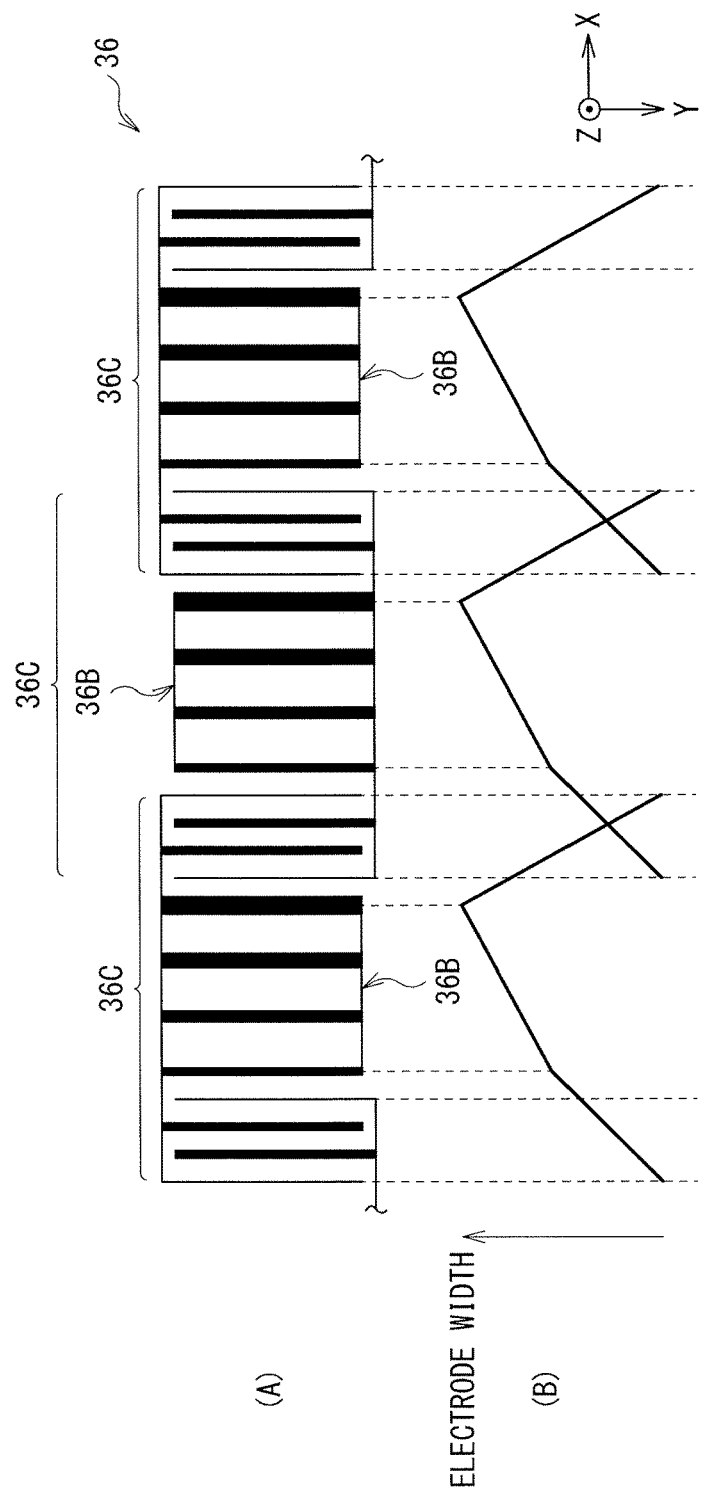

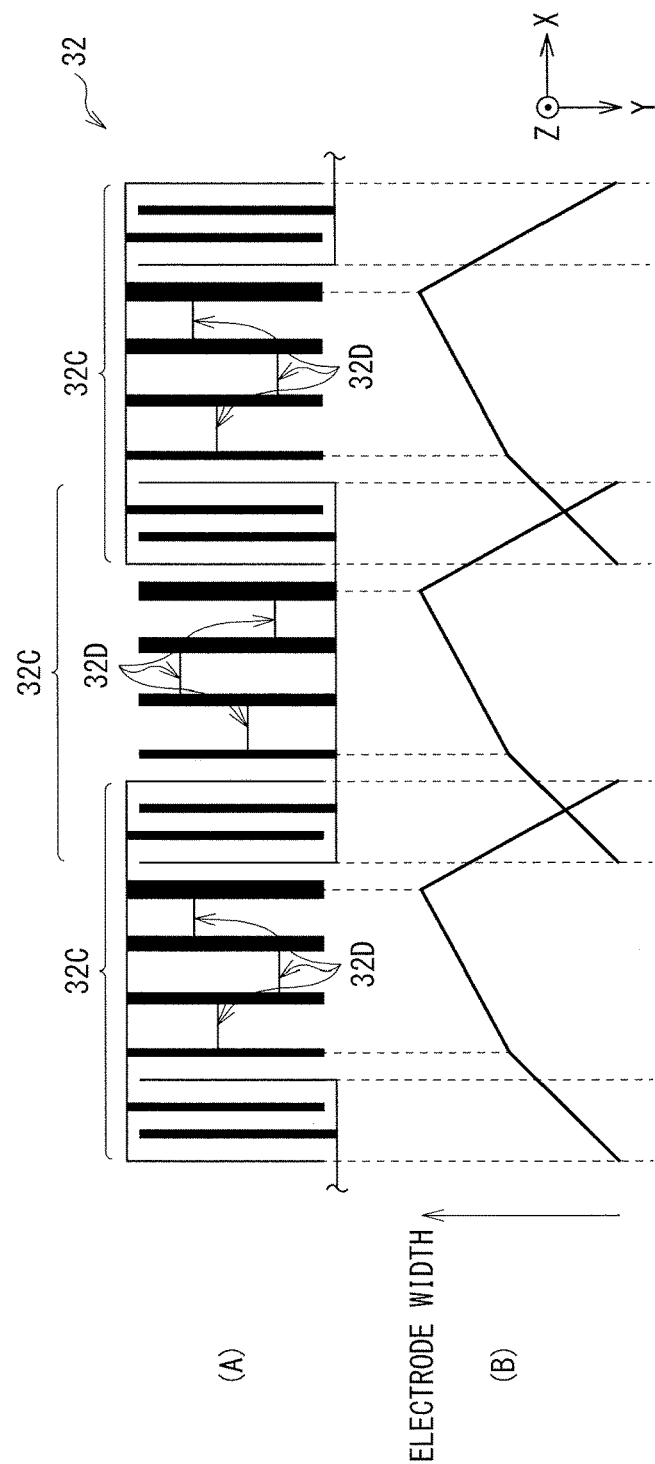
[FIG. 34]

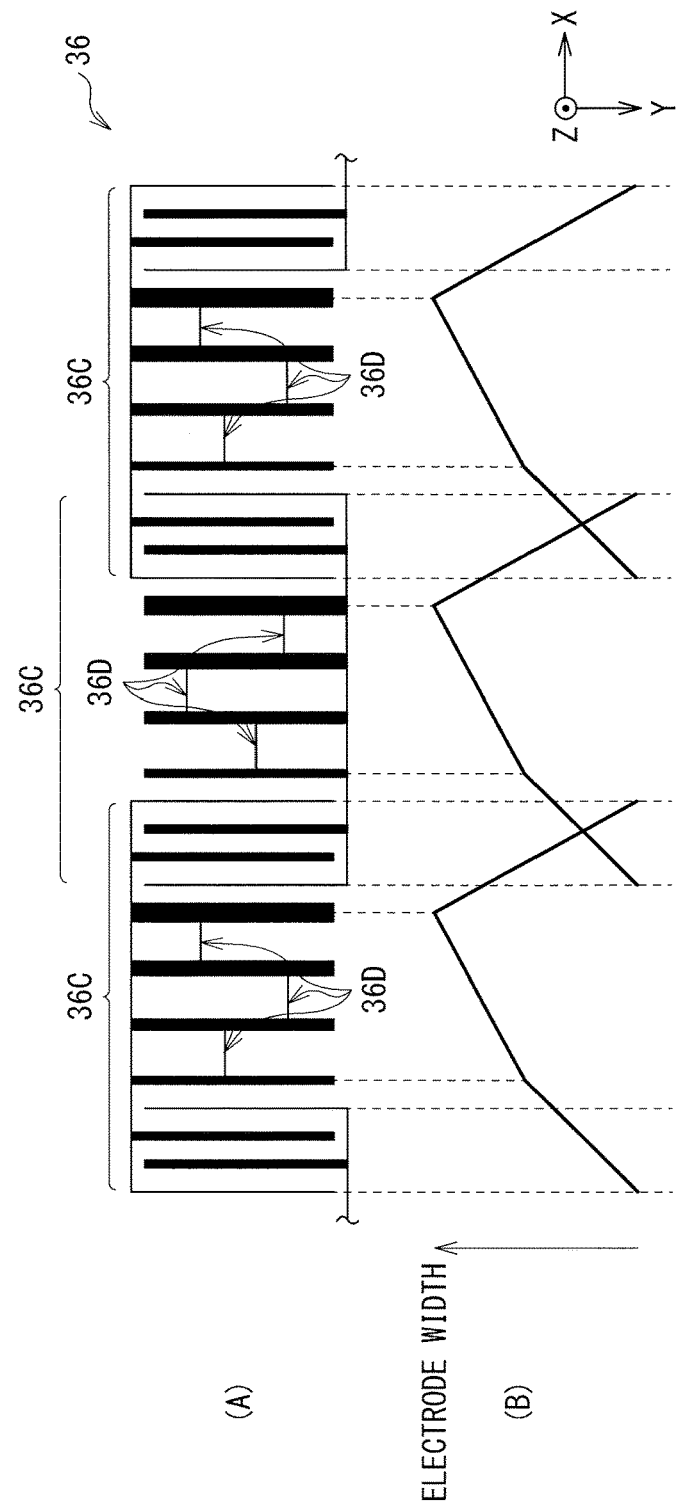
[FIG. 35]

[ FIG. 36 ]
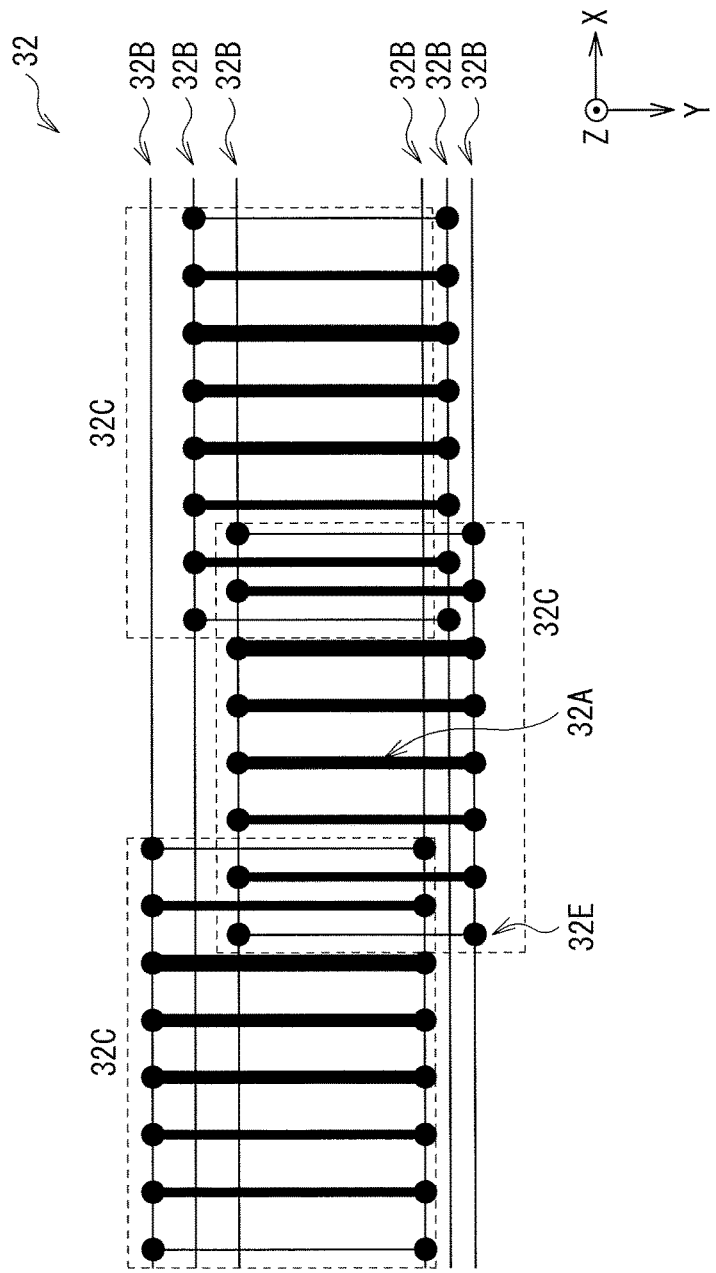

[ FIG. 37 ]
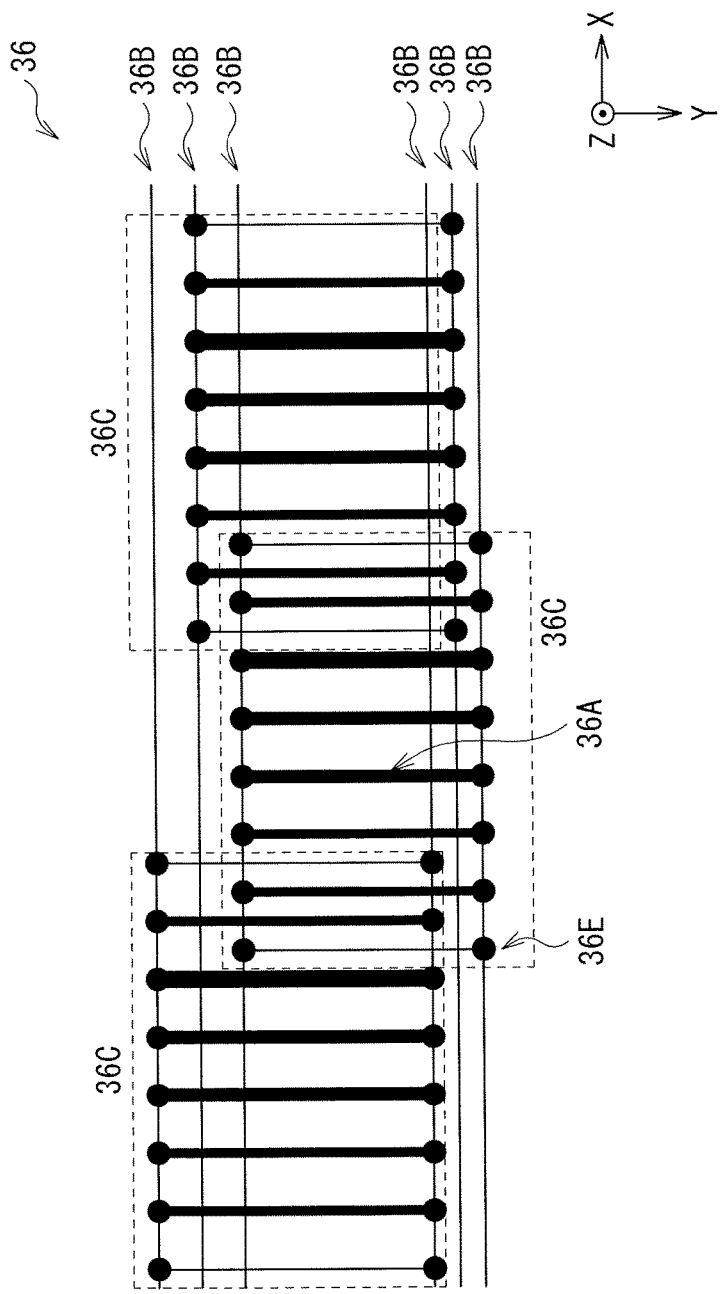

[ FIG. 38A ]
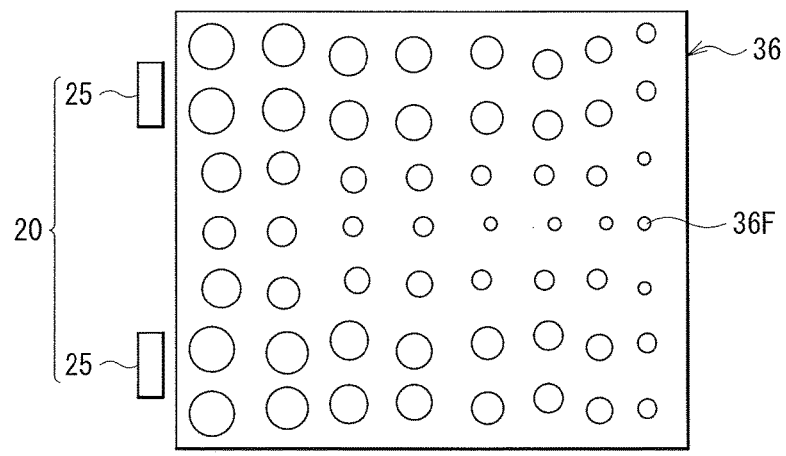
[ FIG. 38B ]
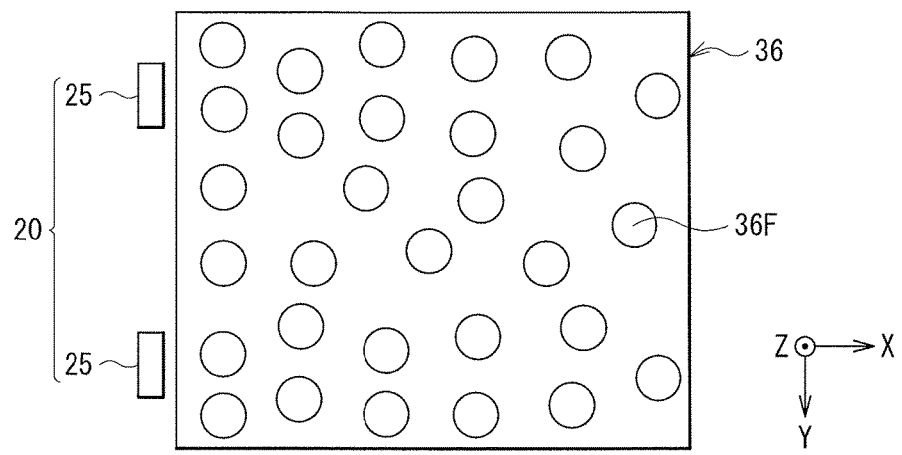

[ FIG. 39A ]
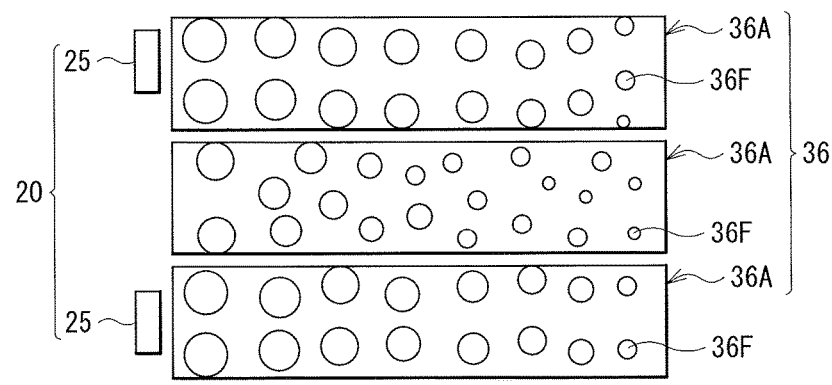
[ FIG. 39B ]
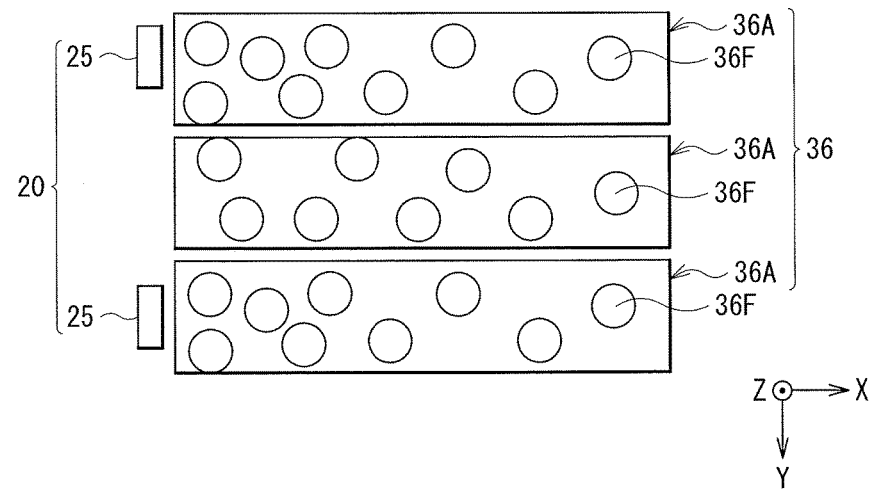

[ FIG. 40A ]
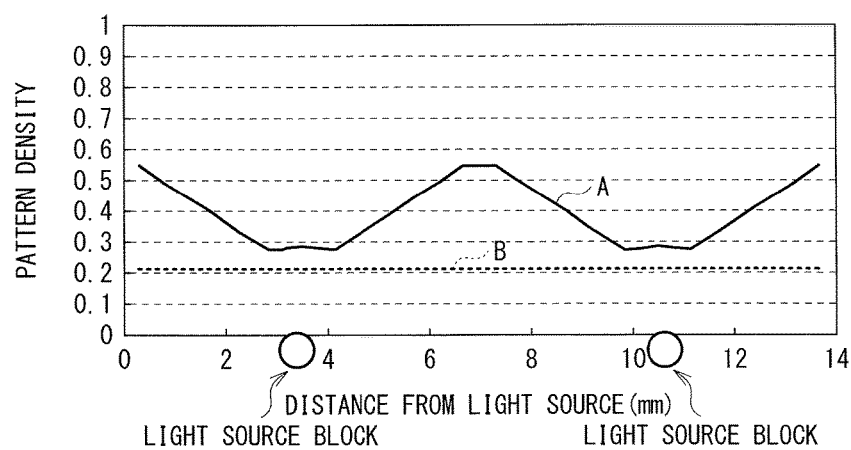
[ FIG. 40B ]
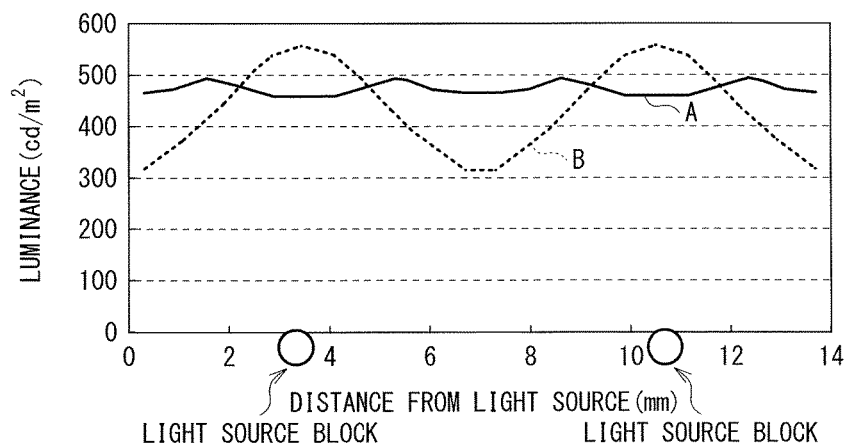

[ FIG. 41A ]
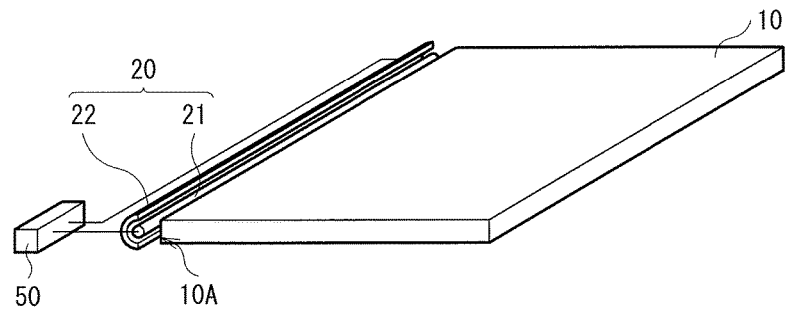
[ FIG. 41B ]
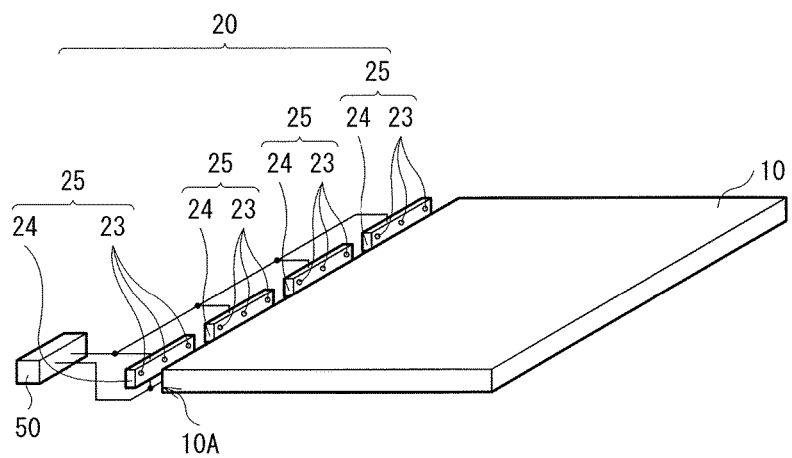
[ FIG. 41C ]
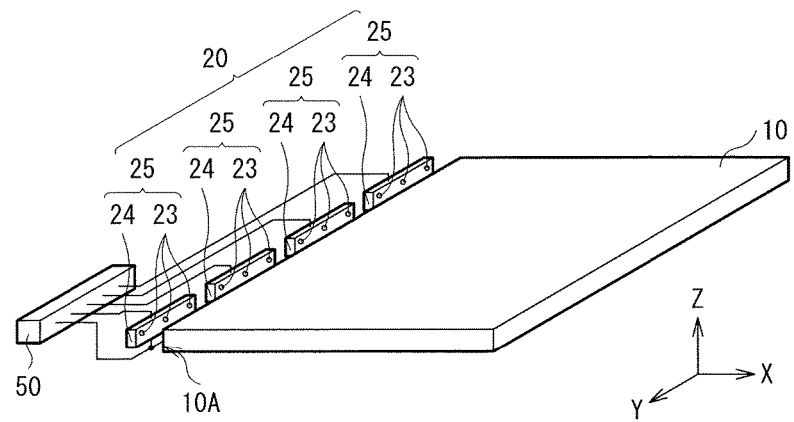

[ FIG. 42A ]
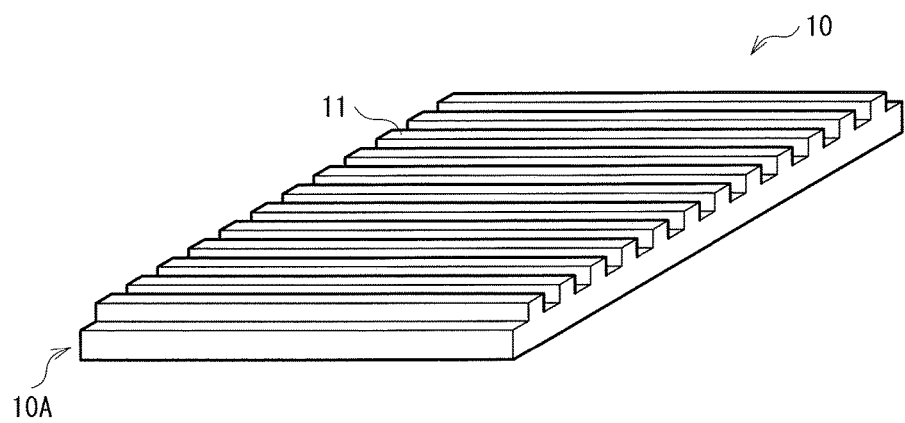
[ FIG. 42B ]
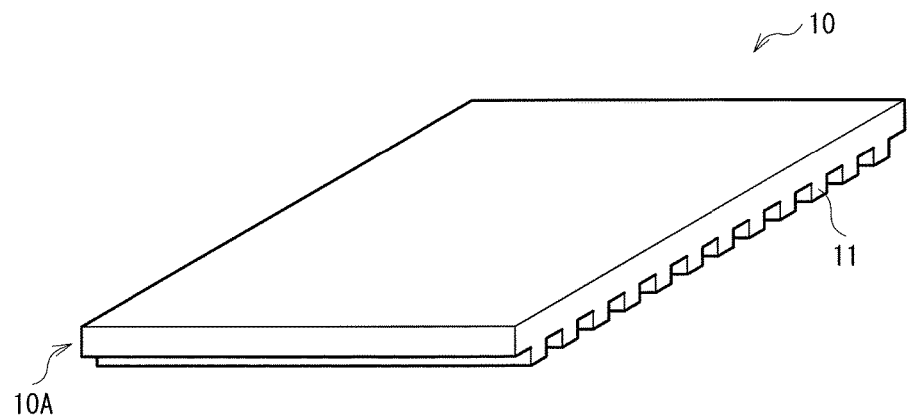

[ FIG. 43A ]
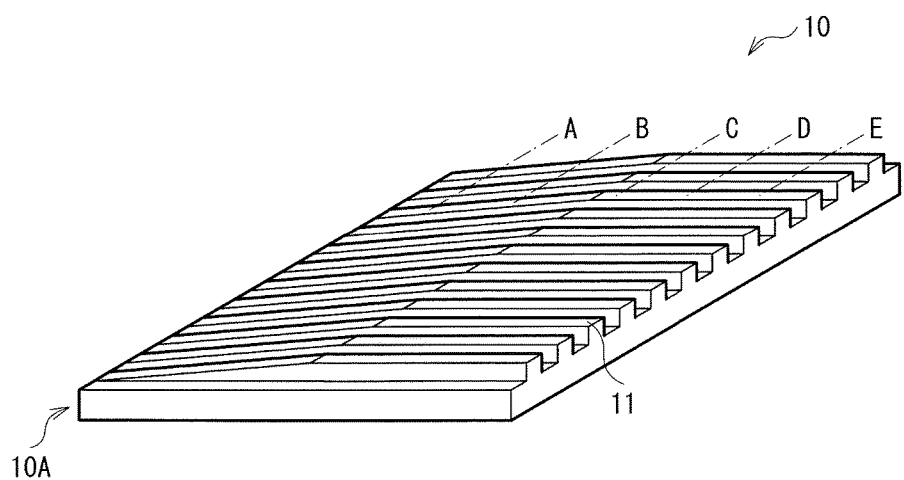
[ FIG. 43B ]
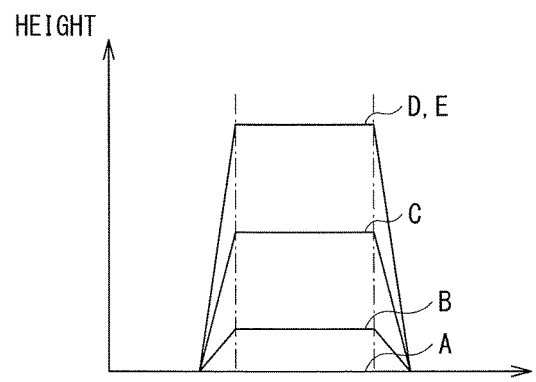

[ FIG. 44A ]
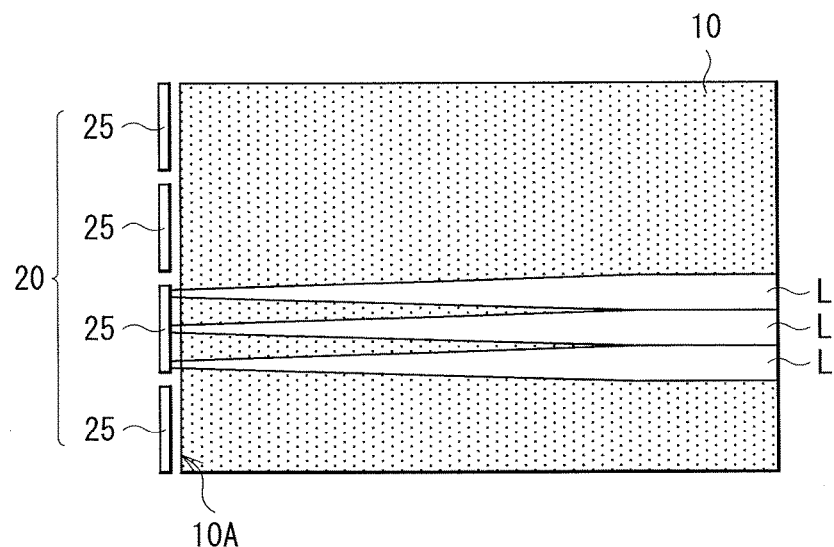
[ FIG. 44B ]
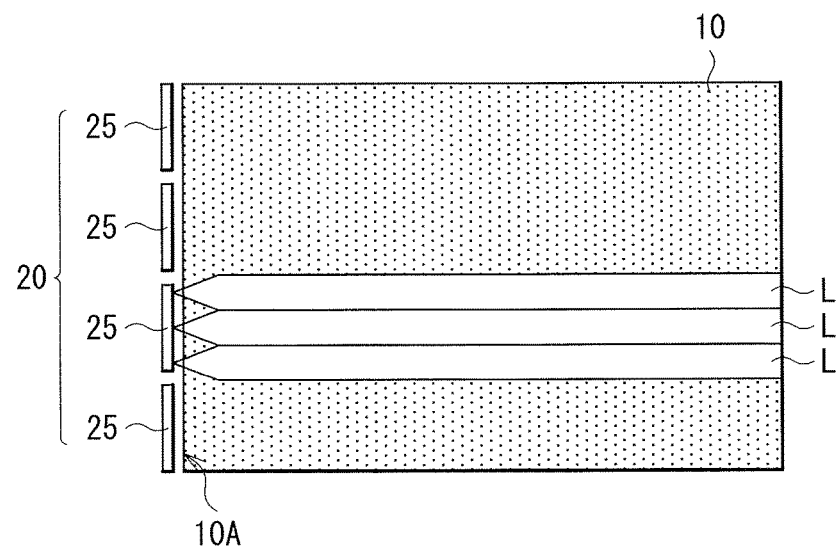

[ FIG. 45 ]
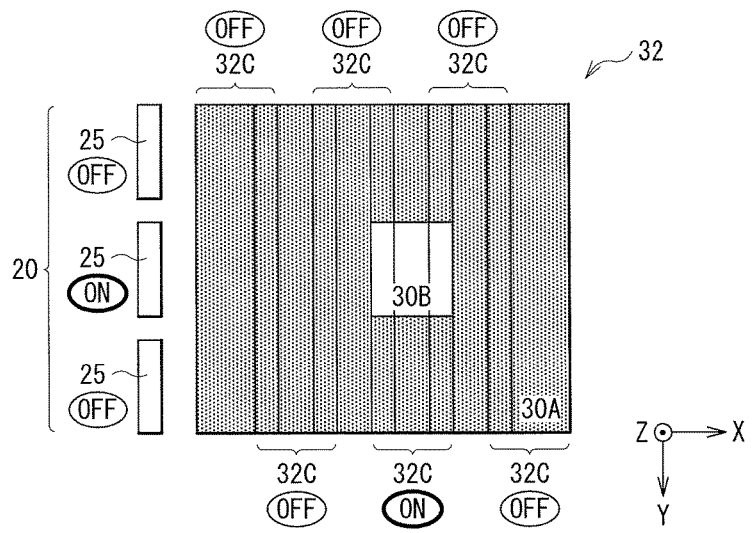
[ FIG. 46 ]
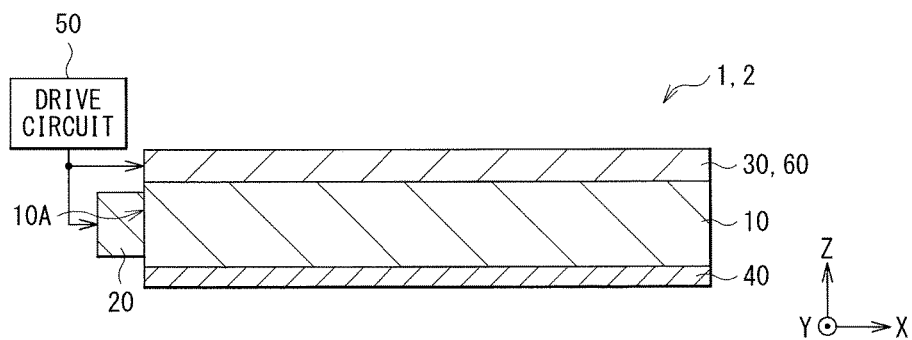
[ FIG. 47 ]
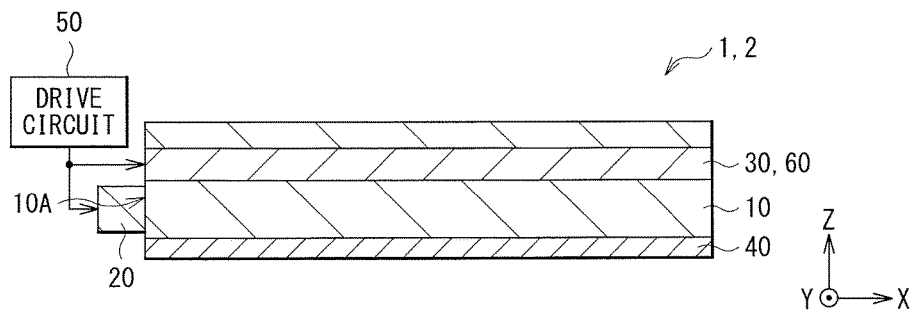

[ FIG. 48 ]
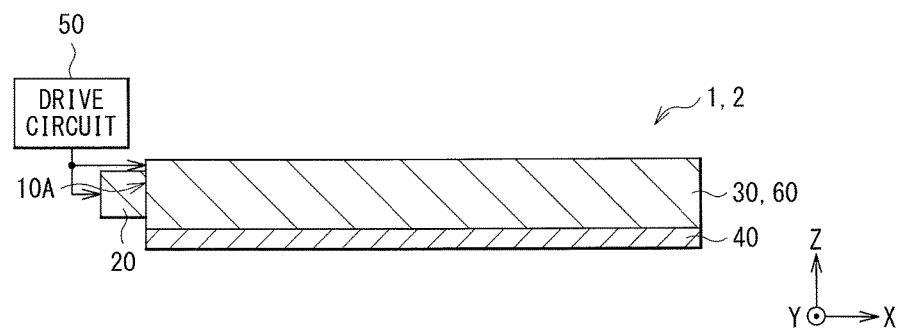
[ FIG. 49 ]
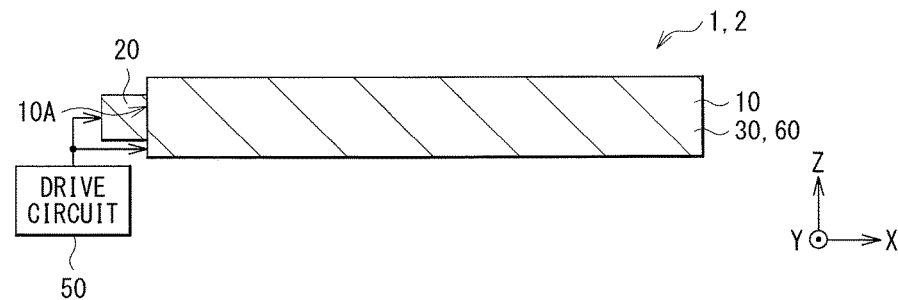
[ FIG. 50 ]
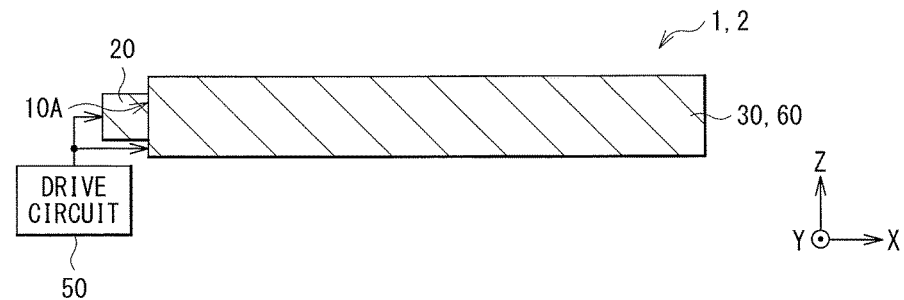

[ FIG. 51 ]
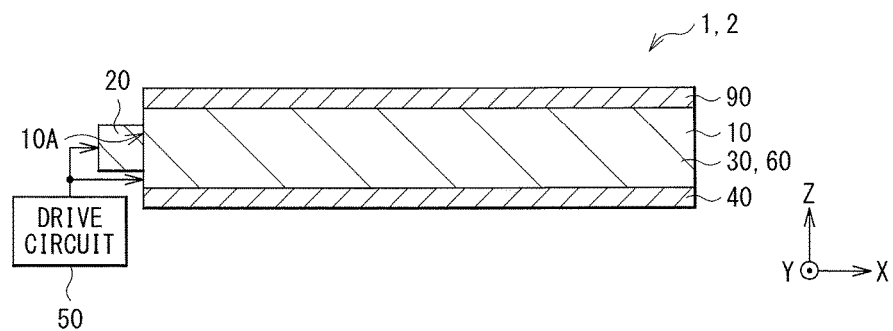
[ FIG. 52 ]
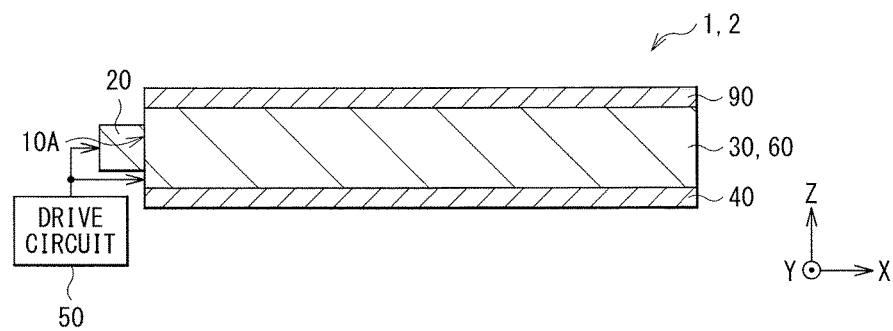
[ FIG. 53 ]
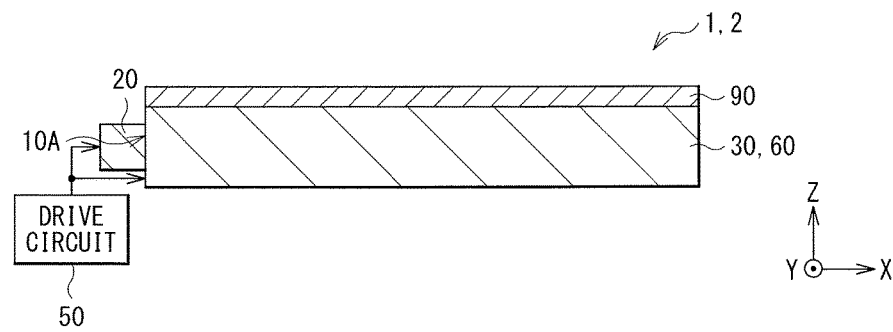

[ FIG. 54 ]
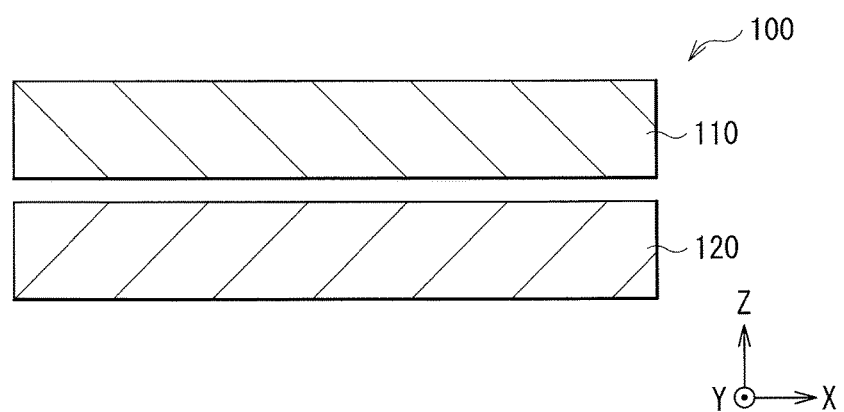

ILLUMINATION APPARATUS AND DISPLAY UNIT

CROSS REFERENCES TO RELATED APPLICATIONS

The present application is a national stage of International Application No. PCT/JP2013/062634 filed on Apr. 30, 2013 and claims priority to Japanese Patent Application No. 2012-107772 filed on May 9, 2012, the disclosure of which is incorporated herein by reference.

BACKGROUND

The present technology relates to an illumination apparatus and a display unit that are provided with a light modulation device exhibiting scattering property or transparency to light.

In recent years, a liquid crystal display has drastically progressed in terms of high definition technology and energy saving, and a method that achieves improvement in dark-place contrast by partially modulating light intensity of a backlight has been proposed. The method partially drives light emitting diodes (LEDs) used as a light source of the backlight to modulate backlight light according to a display image. In addition, reduction in thickness is increasingly demanded for a large liquid crystal display, similar to a small liquid crystal display, and an edge light method in which a light source is disposed on an end of a light guide plate has attracted attention, in place of a method in which a cold cathode fluorescent lamp or a LED is disposed directly below a liquid crystal panel. However, it is difficult for the edge light method to perform partial driving, which partially modulates light intensity of the light source.

CITATION LIST

Patent Literature

PTL 1: Japanese Unexamined Patent Application Publication No. H6-347790

SUMMARY

Incidentally, as a technology to extract light propagating through a light guide plate, for example, a display unit using polymer dispersed liquid crystal (PDLC) that switches transparency and scattering has been proposed in PTL 1. This technology is to prevent reflection, and partially applies a voltage to the PDLC to switch transparency and scattering. In this technology, however, in the case where illumination light is partially modulated by partially extracting guided light, when difference in luminance at a boundary derived from an electrode pattern driving the PDLC is large, there is a room for improvement in that the boundary appears in the displayed image.

Therefore, it is desirable to provide an illumination apparatus and a display unit that are capable of blurring a boundary between a bright part and a dark part in illumination light.

An illumination apparatus according to an embodiment of the technology includes: a pair of substrates arranged oppositely to each other with a distance; a light source disposed on a side surface of one or both of the pair of substrates; and an electrode disposed on a surface of each of the pair of substrates, and configured to generate an electric field in a direction intersecting perpendicularly to the surface of the substrate. The illumination apparatus further includes a light modulation layer disposed at a clearance between the pair of substrates, and exhibiting scattering property or transparency to light from the light source, based on magnitude of the electric field generated by the electrode. The electrode includes a plurality of first electrode blocks that are disposed on a surface of one of the pair of substrates. Each of the first electrode blocks includes a plurality of partial electrodes that each extend in a first direction and are arranged in a direction intersecting the first direction.

A display unit according to an embodiment of the technology is provided with a display panel configured to display a picture and an illumination apparatus configured to illuminate the display panel. The illumination apparatus mounted on the display unit includes similar components to those of the illumination apparatus according to the above-described embodiment.

In the illumination apparatus and the display unit according to the respective embodiments of the technology, each of the first electrode blocks includes the plurality of partial electrodes that each extend in the first direction and are arranged in a direction intersecting the first direction. Accordingly, it is possible to partially adjust scattering characteristics of the light modulation layer in regions opposing to the respective first electrode blocks.

According to the illumination apparatus and the display unit according to the respective embodiments of the technology, the scattering characteristics of the light modulation layer are allowed to be partially adjusted in the regions opposing to the respective first electrode blocks. Therefore, it is possible to moderate change in plane of the luminance distribution of light extracted from the light modulation layer. As a result, it is possible to blur a boundary between a bright part and a dark part in the illumination light.

Additional features and advantages are described herein, and will be apparent from the following Detailed Description and the figures.

BRIEF DESCRIPTION OF THE FIGURES

FIG. 1 is a sectional diagram illustrating an example of a configuration of an illumination apparatus according to a first embodiment of the present technology.

FIG. 2 is a sectional diagram illustrating an example of a structure of a light modulation device in FIG. 1.

FIG. 3 is a plan diagram illustrating an example of a configuration of a lower electrode in FIG. 2.

FIG. 4A is a plan diagram illustrating another example of the configuration of the lower electrode in FIG. 2.

FIG. 4B is a plan diagram illustrating still another example of the configuration of the lower electrode in FIG. 2.

FIG. 5 is a plan diagram illustrating an example of a width of the lower electrode in FIG. 2.

FIG. 6A is a plan diagram illustrating an example of a configuration of an upper electrode in FIG. 2.

FIG. 6B is a plan diagram illustrating another example of the configuration of the upper electrode in FIG. 2.

FIG. 7A is a plan diagram illustrating still another example of the configuration of the upper electrode in FIG. 2.

FIG. 7B is a plan diagram illustrating still another example of the configuration of the upper electrode in FIG. 2.

FIG. 8 is a schematic diagram illustrating an example of alignment of the light modulation device in FIG. 1 during no-voltage application.

FIG. 9 is a schematic diagram illustrating an example of alignment of the light modulation device in FIG. 1 during voltage application.

FIG. 10 is a schematic diagram for explaining function of the illumination apparatus in FIG. 1.

FIG. 11A is a schematic diagram illustrating an example of partial lighting in the illumination apparatus in FIG. 1.

FIG. 11B is a schematic diagram illustrating another example of the partial lighting in the illumination apparatus in FIG. 1.

FIG. 12A is a schematic diagram illustrating an example of scan driving of the illumination apparatus in FIG. 1.

FIG. 12B is a schematic diagram illustrating an example of the scan driving following FIG. 12A.

FIG. 13A is a schematic diagram illustrating another example of the scan driving of the illumination apparatus in FIG. 1.

FIG. 13B is a schematic diagram illustrating another example of the scan driving following FIG. 13A.

FIG. 14 is a diagram illustrating an example of a method of partial lighting in the illumination apparatus in FIG. 1.

FIG. 15A is a schematic diagram illustrating an example of full lighting in the illumination apparatus in FIG. 1.

FIG. 15B is a schematic diagram illustrating another example of the full lighting in the illumination apparatus in FIG. 1.

FIG. 16 is a diagram illustrating an example of a method of full lighting in the illumination apparatus in FIG. 1.

FIG. 17 is a diagram illustrating an example of a method of full lighting in an illumination apparatus according to a comparative example.

FIG. 18 is a diagram illustrating another example of the method of full lighting in the illumination apparatus according to the comparative example.

FIG. 19 is a diagram illustrating another example of a method of partial lighting in the illumination apparatus according to the comparative example.

FIG. 20 is a sectional diagram for explaining a process of manufacturing the illumination apparatus in FIG. 1.

FIG. 21 is a sectional diagram for explaining the manufacturing process following the process of FIG. 20.

FIG. 22 is a sectional diagram for explaining the manufacturing process following the process of FIG. 21.

FIG. 23 is a schematic diagram illustrating an example of alignment of a light modulation device according to a modification during no-voltage application.

FIG. 24 is a schematic diagram illustrating an example of alignment of the light modulation device according to the modification during voltage application.

FIG. 25 is a sectional diagram illustrating an example of a configuration of an illumination apparatus according to a second embodiment of the present technology.

FIG. 26 is a sectional diagram illustrating an example of a structure of a light modulation device in FIG. 25.

FIG. 27 is a schematic diagram illustrating an example of alignment of the light modulation device in FIG. 25 during no-voltage application.

FIG. 28 is a schematic diagram illustrating an example of alignment of the light modulation device in FIG. 25 during voltage application.

FIG. 29 is a plan diagram illustrating a first modification of the configuration of the upper electrode.

FIG. 30A is a plan diagram illustrating a second modification of the configuration of the upper electrode.

FIG. 30B is a plan diagram illustrating the second modification of the configuration of the upper electrode.

FIG. 31 is a plan diagram illustrating an example of a width of the upper electrode in FIG. 29 and FIG. 30.

FIG. 32 is a plan diagram illustrating a first modification of the configuration of the lower electrode.

FIG. 33 is a plan diagram illustrating a third modification of the configuration of the upper electrode.

FIG. 34 is a plan diagram illustrating a second modification of the configuration of the lower electrode.

FIG. 35 is a plan diagram illustrating a fourth modification of the configuration of the upper electrode.

FIG. 36 is a plan diagram illustrating a third modification of the configuration of the lower electrode.

FIG. 37 is a plan diagram illustrating a fifth modification of the configuration of the upper electrode.

FIG. 38A is a plan diagram illustrating a sixth modification of the configuration of the upper electrode.

FIG. 38B is a plan diagram illustrating a seventh modification of the configuration of the upper electrode.

FIG. 39A is a plan diagram illustrating an eighth modification of the configuration of the upper electrode.

FIG. 39B is a plan diagram illustrating a ninth modification of the configuration of the upper electrode.

FIG. 40A is a diagram illustrating an example of pattern density in the upper electrode of FIG. 38 and FIG. 39.

FIG. 40B is a diagram illustrating an example of luminance distribution when the upper electrodes of FIG. 38 and FIG. 39 are used.

FIG. 41A is a perspective view illustrating a modification of a configuration of a light source.

FIG. 41B is a perspective view illustrating another modification of the configuration of the light source.

FIG. 41C is a perspective view illustrating still another modification of the configuration of the light source.

FIG. 42A is a perspective view illustrating a modification of a configuration of a light guide plate.

FIG. 42B is a perspective view illustrating another modification of the configuration of the light guide plate.

FIG. 43A is a perspective view illustrating still another modification of the configuration of the light guide plate.

FIG. 43B is a diagram illustrating an example of heights of projections of the light guide plate in FIG. 43A.

FIG. 44A is a schematic diagram for explaining optical waveguide when the projections are not provided on the light guide plate.

FIG. 44B is a schematic diagram for explaining the optical waveguide when the projections are provided on the light guide plate.

FIG. 45 is a schematic diagram illustrating an example of partial lighting when the light source of FIG. 41B or FIG. 41C is used.

FIG. 46 is a sectional diagram illustrating a first modification of the illumination apparatus.

FIG. 47 is a sectional diagram illustrating a second modification of the illumination apparatus.

FIG. 48 is a sectional diagram illustrating a third modification of the illumination apparatus.

FIG. 49 is a sectional diagram illustrating a fourth modification of the illumination apparatus.

FIG. 50 is a sectional diagram illustrating a fifth modification of the illumination apparatus.

FIG. 51 is a sectional diagram illustrating a sixth modification of the illumination apparatus.

FIG. 52 is a sectional diagram illustrating a seventh modification of the illumination apparatus.

FIG. 53 is a sectional diagram illustrating an eighth modification of the illumination apparatus.

FIG. 54 is a sectional diagram illustrating an example of a display unit according to an application example.

DETAILED DESCRIPTION

Hereinafter, embodiments for carrying out the invention will be described in detail with reference to the drawings. Note that description will be given in the following order.
1. First Embodiment
    An example in which a light modulation device including a horizontal alignment film is provided in an illumination apparatus
2. Modifications of First Embodiment
3. Second Embodiment
    An example in which a light modulation device including a vertical alignment film is provided in an illumination apparatus
4. Modifications Common to Embodiments
5. Application Example
    An example in which the illumination apparatuses according to any of the above-described embodiments and the like is applied to a backlight of a display unit 1. First Embodiment FIG. 1 is a sectional diagram illustrating an example of a schematic configuration of an illumination apparatus 1 according to a first embodiment of the technology. The illumination apparatus 1 is suitably applicable to a backlight illuminating a liquid crystal display panel from backside thereof. For example, the illumination apparatus 1 may include a light guide plate 10, a light source 20 provided on a side surface of the light guide plate 10, a light modulation device 30 and a reflector 40 that are disposed behind the light guide plate 10, and a drive circuit 50 driving the light modulation device 30.

For example, the light source 20 may be configured by arranging a plurality of point light sources in line. Each of the point light sources emits light toward the side surface of the light guide plate 10, and may be configured of, for example, a light emitting element that has a light emitting spot on a surface facing the side surface of the light guide plate 10. Examples of such a light emitting element may include LED and laser diode (LD). In terms of efficiency, thickness reduction, and uniformity, each of the point light sources may be preferably a white LED. Incidentally, for example, the plurality of point light sources included in the light source 20 may be configured to include a red LED, a green LED, and a blue LED.

As illustrated in FIG. 1, the light source 20 may be provided on only one side surface of the light guide plate 10, or although not illustrated, may be provided on two side surfaces, three side surfaces, or all side surfaces of the light guide plate 10. Moreover, when the light source 20 is provided on the three side surfaces or all side surfaces, only the light sources 20 provided on the opposing two side surfaces may be turned on only at the time of performing partial lighting, and all of the light sources 20 may be turned on at the time of performing full lighting.

The light guide plate 10 guides light from the light sources 20 that are disposed on one or the plurality of side surfaces of the light guide plate 10, to an upper surface of the light guide plate 10. The light guide plate 10 has a shape corresponding to a display panel (not illustrated) disposed on the upper surface of the light guide plate 10, for example, a rectangular parallelepiped shape surrounded by the upper surface, a lower surface, and the side surfaces. Incidentally, in the following description, a side surface receiving the light from the light source 20 out of the side surfaces of the light guide plate 10 is referred to as a light incident surface 10A. For example, the light guide plate 10 mainly contains a transparent thermoplastic resin such as a polycarbonate resin (PC) and an acrylic resin (polymethyl methacrylate (PMMA)).

The reflector 40 returns, to the light guide plate 10 side, light leaked from behind the light guide plate 10 through the light modulation device 30, and for example, may have a function of reflection, diffusion, scattering, and the like. This allows efficient use of light emitted from the light source 20, and also helps improvement of front luminance. The reflector 40 may be formed of, for example, foamed PET (polyethylene terephthalate), an evaporated silver film, a multilayer reflective film, and white PET.

In the present embodiment, the light modulation device 30 is tightly adhered to the back (the lower surface) of the light guide plate 10 without an air layer in between, and is adhered to the back of the light guide plate 10 with, for example, an adhesive agent (not illustrated) in between. For example, as illustrated in FIG. 2, the light modulation device 30 may be configured by arranging a transparent substrate 31, a lower electrode 32, an alignment film 33, a light modulation layer 34, an alignment film 35, an upper electrode 36, and a transparent substrate 37 in order from the reflector 40 side.

The transparent substrates 31 and 37 are a pair of substrates disposed oppositely to each other with a distance. The transparent substrates 31 and 37 support the light modulation layer 34, and are each typically formed of a substrate transparent to visible light, for example, a glass plate or a plastic film. The lower electrode 32 and the upper electrode 36 are provided on surfaces of the transparent substrate 31 and 37, respectively, and each generate an electric field in a direction orthogonal to the surface of the transparent substrate 31. The lower electrode 32 is provided on the surface of the transparent substrate 31 (specifically, on a surface of the transparent substrate 31 opposite to the transparent substrate 37), and is configured to include a plurality of partial electrodes 32A. The plurality of partial electrodes 32A each extend in one direction (a first direction) in a plane, and are arranged in a direction intersecting the first direction. For example, the first direction may be a direction parallel to or substantially parallel to the light incident surface 10A. Note that the first direction may be a direction obliquely intersecting the light incident surface 10A.

FIG. 3 illustrates an example of a planer configuration of the lower electrode 32. FIG. 4A and FIG. 4B each illustrate another example of the planer configuration of the lower electrode 32. The lower electrode 32 has a plurality of electrode blocks 32C (first electrode blocks). The plurality of electrode blocks 32C are arranged, out of a predetermined direction (a second direction) in a plane and a direction (a third direction) intersecting the second direction, in at least the second direction. In this case, when the first direction is a direction parallel to or substantially parallel to the light incident surface 10A, the second direction is a direction orthogonal to or substantially orthogonal to the first direction. When the first direction is a direction obliquely intersecting the light incident surface 10A, the second direction is a direction orthogonal to or substantially orthogonal to the light incident surface 10A. In other words, the second direction is a direction orthogonal to or substantially orthogonal to the light incident surface 10A, irrespective of the first direction.

Each of the electrode blocks 32C is formed in a region including a part of a formation region of other electrode block 32C adjacent in the second direction so as not to block an electric field that is formed in a light modulation layer 34 by the other electrode block 32C adjacent in the second direction. Specifically, in an overlap region 32-1, two or more partial electrodes 32A are formed in the formation region of the other electrode block 32C adjacent in the second direction, and are arranged mixedly with two or more partial electrodes included in the other electrode block 32C adjacent in the second direction. For example, in each of the electrode blocks 32C, two or more partial electrodes 32A may be formed in a formation region of other electrode block 32C adjacent in the second direction, and may be alternately arranged with two or more partial electrodes included in the other electrode block 32C adjacent in the second direction. Further, in each of the electrode blocks 32C, two or more partial electrodes 32A are formed outside the formation region of the other electrode block 32C adjacent in the second direction. In other words, as illustrated in FIG. 3, FIG. 4A, and FIG. 4B, the formation region of each of the electrode blocks 32C is overlapped with a part of the formation region of other electrode block 32C adjacent in the second direction. In FIG. 3, FIG. 4A, and FIG. 4B, a region where the formation regions of the respective electrode blocks 32C are overlapped with each other is illustrated as the overlap region 32-1, and a region where the formation regions of the respective electrode blocks 32C are not overlapped with each other is illustrated as a non-overlap region 32-2. Incidentally, in the overlap region 32-1, two or more partial electrodes 32A included in one of the electrode blocks 32C may be arranged so as to skip two or more partial electrodes included in the other electrode block 32C adjacent in the second direction, for every plural partial electrodes (for example, two by two). Moreover, in the overlap region 32-1, two or more partial electrodes 32A included in one of the electrode blocks 32C may be arranged alternately with two or more partial electrodes included in the other electrode block 32C adjacent in the second direction, and may be arranged in a partially toothless manner.

In each of the electrode blocks 32C, the partial electrodes 32A are electrically connected to one another. Specifically, as illustrated in FIG. 3, each of the electrode blocks 32C has a connection section 32B (a first connection section) connected to ends of the respective partial electrodes 32A, and the partial electrodes 32A are electrically connected with one another by the connection section 32B. Accordingly, each of the electrode blocks 32C has a comb tooth shape configured of the plurality of partial electrodes 32A and the connection section 32B, and the plurality of electrode blocks 32C are arranged in a second direction so that the directions of the comb tooth of the respective electrode blocks 32C are alternately inverted (switched).

Next, widths of the respective partial electrodes 32A in the arrangement direction are described. FIG. 5 illustrates an example of the widths of the respective partial electrodes 32A in the arrangement direction. Each of the partial electrodes 32A has a width corresponding to a distance from the light source 20 in each of the electrode blocks 32C. Specifically, in each of the electrode blocks 32C, the widths of respective two or more partial electrodes 32A that are formed outside the formation region of the other electrode block 32C adjacent in the second direction (in the non-overlap region 32-2) increase as a distance from the light source 20 increases. Moreover, in each of the electrode blocks 32C, the widths of respective two or more partial electrodes 32A formed in a formation region of other electrode block 32C that is adjacent in the second direction and is located relatively farther from the light source 20 (in the overlap region 32-1 farther from the light source 20) decrease as a distance from the light source 20 increases. Further, in each of the electrode blocks 32C, the widths of respective two or more partial electrodes 32A formed in a formation region of other electrode block 32C that is adjacent in the second direction and is located relatively closer to the light source 20 (in the overlap region 32-1 closer to the light source 20) increase as a distance from the light source 20 increases. In other words, in each of the electrode blocks 32C, the widths of respective two or more partial electrodes 32A on the light source 20 side (closer to the light source 20) out of the plurality of partial electrodes 32A increase as a distance from the light source 20 increases, whereas the widths of respective two or more partial electrodes 32A on a side opposite to the light source 20 (on a side farther from the light source 20) out of the plurality of partial electrodes 32A decrease as a distance from the light source 20 increases. Such a distribution of the widths of the plurality of partial electrodes 32A is hereinafter referred to as "arched distribution". Incidentally, although a case where the "arched distribution" is illustrated with polygonal curve is exemplified in FIG. 5, the "arched distribution" may be illustrated with smooth curve. Note that the overlap region 32-1 may not be provided. In this case, in each of the electrode blocks 32C, the widths of the plurality of partial electrodes 32A in the arrangement direction are small on a side closer to the light source 20, and are gradually increased with increase in distance from the light source 20.

Next, the upper electrode 36 is described. FIG. 6A, FIG. 6B, FIG. 7A, and FIG. 7B each illustrate an example of a planer configuration of the upper electrode 36. The upper electrode 36 is provided on a surface of the transparent substrate 37 (specifically, a surface opposed to the transparent substrate 31, of the transparent substrate 37). For example, as illustrated in FIG. 6A and FIG. 6B, the upper electrode 36 may be a (single) sheet electrode formed over the entire plane. The sheet electrode is formed so as to face all of the electrode blocks 32C. For example, as illustrated in FIG. 7A and FIG. 7B, the upper electrode 36 may be configured of a plurality of strip-like partial electrodes 36A that each extend in the second direction and are arranged in the third direction. At this time, in the case where the plurality of electrode blocks 32C are arranged in the second direction and the third direction, each of the partial electrodes 36A is arranged so as to face the plurality of electrode blocks 32C arranged in the second direction.

Next, a material of the lower electrode 32 and the upper electrode 36 is described. The lower electrode 32 and the upper electrode 36 may be formed of, for example, a transparent conductive material such as indium tin oxide (ITO). The transparent conductive material preferably absorbs visible light as small as possible. The light passes through the lower electrode 32 and the upper electrode 36 many times when the light is guided through the light guide plate 10. Therefore, in a large backlight, even if absorption of visible light when the light vertically enters the surface is several percent, luminance at the center part of the screen may be lower by about several tens percent than the luminance in the vicinity of the light incident surface. Moreover, wavelength dependency of absorption of the transparent conductive material may be preferably small. When absorption of a specific wavelength is large, the chromaticity is changed as the light is guided through the wave guide plate 10, which may cause a difference in color between the center part of the screen and ends of the screen.

In the case where the upper electrode 36 is a single sheet electrode formed over the entire plane, when the light modulation device 30 is viewed from a normal direction to the light modulation device 30, a part of the light modulation device 30 facing the partial electrode 32A configures a light modulation cell 30a. For example, a part exemplified by a dashed line in FIG. 2 is the light modulation cell 30a. Each of the light modulation cells 30a is capable of being driven independently of one another by application of a predetermined voltage to the lower electrode 32 and the upper electrode 36, and exhibits transparency or scattering property to the light from the light source 20 depending on the magnitude of the voltage value applied to the lower electrode 32 and the upper electrode 36. Note that the transparency and the scattering property will be described in detail in description of the light modulation layer 34.

For example, the alignment films 33 and 35 may align a liquid crystal and a monomer used for the light modulation layer 34. Examples of kinds of the alignment films may include, for example, a vertical alignment film and a horizontal alignment film; however, in the present embodiment, the horizontal alignment film is used for the alignment films 33 and 35. The alignment films 33 and 35 have alignment direction that is parallel to (or substantially parallel to) the light incident surface 10A. Examples of the horizontal alignment film may include, for example, an alignment film formed by performing rubbing treatment on polyimide, polyamide-imide, poly vinyl alcohol, or the like, and an alignment film provided with a groove by transfer or etching. Moreover, examples of the horizontal alignment film may include, for example, an alignment film formed through oblique evaporation of an inorganic material such as silicon oxide, a diamond-like carbon alignment film formed by ion beam irradiation, and an alignment film provided with electrode pattern slit. In the case where a plastic film is used as the transparent substrates 31 and 37, polyamide-imide capable of being formed at a temperature of 100° C. or lower may be preferably used as the alignment films 33 and 35 because firing temperature after the alignment films 33 and 35 are applied to the surfaces of the transparent substrates 31 and 37, respectively, is preferably as low as possible in manufacturing process.

Note that a horizontal alignment film that has a function to provide pretilt to a liquid crystal molecule contacted to the horizontal alignment film may be used. For example, rubbing may be used as a method of developing a pretilt function of the horizontal alignment film. For example, the pretilt may indicate that the long axis of a liquid crystal molecule in proximity to an alignment film intersects "a specific direction in plane of the alignment film" or "a normal to the alignment film" at a slight angle. For example, the above-described horizontal alignment film may have a function to allow the long axis of the liquid crystal molecule in proximity to the horizontal alignment film to intersect with a direction parallel to the surface of the horizontal alignment film and to intersect with the surface of the light incident surface 10A at a slight angle in a direction parallel to the surface of the horizontal alignment film.

Moreover, it is sufficient for both of the vertical and horizontal alignment films to have a function to align the liquid crystal and the monomer, and reliability in repeat application of a voltage demanded for a typical liquid crystal display is unnecessary. This is because the reliability in the voltage application after device fabrication is determined by an interface between polymerized monomer and the liquid crystal. In addition, the liquid crystal and the monomer used for the light modulation layer 34 are allowed to be aligned by, for example, application of an electric field or a magnetic field between the lower electrode 32 and the upper electrode 36, without using the alignment films 33 and 35. In other words, alignment state of the liquid crystal and the monomer in a voltage applied state is allowed to be fixed by irradiation of ultraviolet ray while the electric field or the magnetic field is applied between the lower electrode 32 and the upper electrode 36. In the case where a voltage is used for formation of the alignment films 33 and 35, electrodes are differently formed for alignment and for drive, or a dual-frequency liquid crystal in which sign of dielectric constant anisotropy is inverted by the frequency may be used for a liquid crystal material. In addition, in the case where the magnetic field is used for formation of the alignment films 33 and 35, it is preferable to use a material having large magnetic susceptibility anisotropy for the alignment films 33 and 35, and for example, it is preferable to use a material having a large number of benzene rings.

The light modulation layer 34 exhibits scattering property or transparency to the light from the light source 20 depending on the magnitude of the electric field generated by the lower electrode 32 and the upper electrode 36. Specifically, when the voltage is not applied to the lower electrode 32 and the upper electrode 36, the light modulation layer 34 exhibits the transparency to the light from the light source 20, and when the voltage is applied to the lower electrode 32 and the upper electrode 36, exhibits the scattering property to the light from the light source 20. For example, as illustrated in FIG. 2, the light modulation layer 34 is a composite layer including a bulk 34A and a plurality of microparticles 34B dispersed into the bulk 34A. The bulk 34A and the microparticles 34B have optical anisotropy.

FIG. 8 schematically illustrates an example of an alignment state in the bulk 34A and the microparticles 34B when a voltage is not applied between the lower electrode 32 and the upper electrode 36 (hereinafter, simply referred to as "during no-voltage application"). An ellipsoid 134A in FIG. 8 illustrates an example of a reflective index ellipsoid exhibiting refractive index anisotropy of the bulk 34A during no-voltage application. An ellipsoid 134B in FIG. 8 illustrates an example of a reflective index ellipsoid exhibiting refractive index anisotropy of the microparticle 34B during no-voltage application. The reflective index ellipsoids indicate refractive indices of linear polarized light entering from various directions by a tensor ellipsoid, and geometrically indicate refractive indices through viewing of a cross-sectional surface of the ellipsoid from an entering direction of the light.

FIG. 9 schematically illustrates an example of an alignment state in the bulk 34A and the microparticles 34B when a voltage is applied between the lower electrode 32 and the upper electrode 36 (hereinafter, simply referred to as "during voltage application"). The ellipsoid 134A in FIG. 9 illustrates an example of a refractive index ellipsoid exhibiting refractive index anisotropy of the bulk 34A during voltage application. The ellipsoid 134B in FIG. 9 illustrates an example of a refractive index ellipsoid exhibiting refractive index anisotropy of the microparticle 34B during voltage application.

For example, as illustrated in FIG. 8, the bulk 34A and the microparticle 34B may have a configuration in which a direction of an optical axis AX1 of the bulk 34A (a long axis of the ellipsoid 134A) and a direction of an optical axis AX2 of the microparticle 34B (a long axis of the ellipsoid 134B) coincide with (are parallel to) each other during no-voltage application. The optical axes AX1 and AX2 each indicate a line parallel to a traveling direction of light ray having a fixed refractive index irrespective of polarization direction. It is unnecessary for the direction of the optical axis AX1 and the direction of the optical axis AX2 to constantly coincide with each other during no-voltage application, and the direction of the optical axis AX1 may be deviated in some degree from the direction of the optical axis AX2 due to, for example, manufacturing error.

Moreover, for example, the microparticle 34B may have a configuration in which the optical axis AX2 is parallel to (or substantially parallel to) the light incident surface 10A and is parallel to (or substantially parallel to) the surface of the transparent substrate 31 during no-voltage application, Further, for example, the microparticle 34B may have a configuration in which the optical axis AX2 intersects with the surface of the transparent substrate 31 at a slight angle θ1 (not illustrated). Note that the angle θ1 will be described in detail in description of the material for configuring the microparticle 34B.

On the other hand, the bulk 34A has a configuration in which the optical axis AX1 is fixed irrespective of presence or absence of voltage application to the lower electrode 32 and the upper electrode 36. Specifically, the bulk 34A has a configuration in which the optical axis AX1 is parallel to (or substantially parallel to) the light incident surface 10A, and intersects with the surface of the transparent substrate 31 at the predetermined angle θ1. In other words, the optical axis AX1 is parallel to (or substantially parallel to) the optical axis AX2 during no-voltage application.

Note that it is unnecessary for the optical axis AX2 to constantly be parallel to the light incident surface 10A and to constantly intersect with the surface of the transparent substrate 31 at the angle θ1, and the optical axis AX2 may intersect with the surface of the transparent substrate 31 at an angle slightly different from the angle θ1 due to, for example, manufacturing error. Moreover, it is unnecessary for the optical axes AX1 and AX2 to constantly be parallel to the light incident surface 10A, and the optical axes AX1 and AX2 may intersect with the light incident surface 10A at a small angle due to, for example, manufacturing error.

Here, it is preferable that an ordinary refractive index of the bulk 34A be equal to that of the microparticle 34B, and an extraordinary refractive index of the bulk 34A be equal to that of the microparticle 34B. In this case, for example, during no-voltage application, difference in refractive index is hardly generated in all directions, and high transparency (light permeability) is obtainable. Accordingly, the light from the light source 20 is not scattered in the light modulation layer 34 and passes through the light modulation layer 34. As a result, for example, as illustrated in (A) and (B) of FIG. 10, light L from the light source 20 (light from the oblique direction) propagates through a region (a transmissive region 30A) that is transparent in the light modulation device 30, and is totally reflected by an interface between the light modulation device 30 and the air. Thus, luminance of the transmissive region 30A (luminance of black display) is decreased as compared with the case where the luminance is made uniform (alternate long and short dash line in (B) of FIG. 10). Note that a graph in (B) of FIG. 10 illustrates front luminance measured in a state where a diffuser sheet (not illustrated) is provided on the light guide plate 10.

Moreover, for example, the bulk 34A and the microparticle 34B may have a configuration in which the direction of the optical axis AX1 is different from (intersects with or is orthogonal to) that of the optical axis AX2 during voltage application, as illustrated in FIG. 9. In addition, for example, the microparticle 34B may have a configuration in which the optical axis AX2 is parallel to (or substantially parallel to) the light incident surface 10A and intersects with the surface of the transparent substrate 31 at an angle θ2 (for example, 90 degrees, not illustrated) larger than the angle θ1 during voltage application. Note that the angle θ2 will be described in detail in description of a material for configuring the microparticle 34B.

Accordingly, during voltage application, in the light modulation layer 34, difference in refractive index is increased in all directions, and high scattering property is obtainable. Therefore, the light from the light source 20 is scattered in the light modulation layer 34. As a result, for example, as illustrated in (A) and (B) of FIG. 10, the light L from the light source 20 (the light from the oblique direction) is scattered in a region (the scattering region 30B) that is in a scattered state in the light modulation device 30, and the scattered light directly enters the light guide plate 10 or enters the light guide plate 10 after being reflected by the reflector 40, and then is emitted from the upper surface (the light emission surface 1A) of the light guide plate 10. Therefore, luminance of the scattering region 30B is extremely high as compared with the case where luminance is made uniform (alternate long and short dash line in (B) of FIG. 10), and luminance of partial white display (luminance enhancement) is increased by a decreased amount of luminance of the transmissive region 30A.

Note that the ordinary refractive index of the bulk 34A may be slightly different from that of the microparticle 34B due to, for example, manufacturing error, and for example, the difference therebetween may be preferably 0.1 or less, and more preferably 0.05 or less. In addition, the extraordinary refractive index of the bulk 34A may also be slightly different from that of the microparticle 34B due to, for example, manufacturing error, and for example, the difference therebetween may be preferably 0.1 or less, and more preferably 0.05 or less.

In addition, the difference in refractive index ($\Delta n_P$=the extraordinary refractive index $ne_P$–the ordinary refractive index $no_P$) of the bulk 34A and the difference in refractive index ($\Delta n_L$=the extraordinary refractive index $ne_L$–the ordinary refractive index $no_L$) of the microparticle 34B may be preferably as large as possible, preferably 0.05 or more, more preferably 0.1 or more, and still more preferably 0.15 or more. This is because when the difference in the refractive index of each of the bulk 34A and the microparticle 34B is large, the scattering power of the light modulation layer 34 becomes high to easily disrupt light guiding condition, and the light from the light guide plate 10 is easily extracted.

Moreover, a response speed to the electric field of the bulk 34A is different from that of the microparticle 34B. The bulk 34A may have, for example, a streaky structure, a porous structure, or a rod-like structure that has a response speed lower than that of the microparticle 34B. For example, the bulk 34A may be formed of a polymer material obtained through polymerization of a low-molecular monomer. For example, the bulk 34A may be formed by polymerizing a material (for example, monomer) that is aligned along the alignment direction of the microparticle 34B or the alignment direction of the alignment films 33 and 35 and has alignment property and polymerizability, by heat or light or both.

For example, the streaky structure, the porous structure, or the rod-like structure of the bulk 34A may have a long axis in a direction that is parallel to the light incident surface 10A and intersects with the surface of the transparent substrate 31 at the slight angle θ1. In the case where the bulk 34A has the streaky structure, an average size of streaky tissues in a short axis may be preferably 0.1 μm or more and 10 μm or less, and more preferably 0.2 μm or more and 2.0 μm or less in terms of enhancing scattering property of the guided light. In the case where the average size of the streaky tissues in the short axis direction is 0.1 μm or more and 10 μm or less, the scattering power in the light modulation device 30 is substantially equivalent in a visible region of 380 to 780 nm both inclusive. Therefore, increase or decrease of light of only a specific wavelength component does not occur in the plane, and thus balance in the visible region is achievable in the plane. When the average size of the streaky tissues in the short axis direction is smaller than 0.1 μm or larger than 10 μm, the scattering power of the light modulation device 30 is low irrespective of the wavelength, and thus it is difficult for the light modulation device 30 to function as a light modulation device.

Moreover, in terms of reducing wavelength dependency of scattering, the average size of the streaky tissue in the short axis direction may be preferably 0.5 μm or more and 5 μm or less, and more preferably within a range of 1 to 3 μm both inclusive. In such a case, when the light emitted from the light source 20 repeatedly passes through the bulk 34A in the light modulation device 30 during propagation of the light in the light guide plate 10, the wavelength dependency of the scattering in the bulk 34A is suppressed. The size of the streaky tissue is observable under a polarizing microscope, a confocal microscope, an electron microscope, and the like.

On the other hand, for example, the microparticle 34B may be configured to contain a liquid crystal material mainly, and may have a response speed sufficiently higher than that of the bulk 34A. The liquid crystal material (liquid crystal molecule) contained in the microparticle 34B may be, for example, a rod-like molecule. As the liquid crystal molecule contained in the microparticle 34B, a liquid crystal molecule having positive dielectric constant anisotropy (so-called positive liquid crystal) is preferably used.

Here, during no-voltage application, in the microparticle 34B, the long axis direction of the liquid crystal molecule is parallel to the optical axis AX1. At this time, the long axis of the liquid crystal molecule in the microparticle 34B is parallel to (or substantially parallel to) the light incident surface 10A and intersects with the surface of the transparent substrate 31 at the slight angle $\theta1$. In other words, the liquid crystal molecule in the microparticle 34B is aligned in a state of being inclined at the angle $\theta1$ in a plane parallel to the light incident surface 10A of the light guide plate 10 during no-voltage application. The angle $\theta1$ is called pretilt angle, and for example, may be preferably 0.1 degree or more and 30 degrees or less. The angle $\theta1$ may be more preferably 0.5 degree or more and 10 degrees or less, and still more preferably 0.7 degree or more and 2 degrees or less. There is a tendency for scattering to decrease in efficiency due to reasons described below when the angle $\theta1$ is made large. In addition, the azimuth in which the liquid crystal stands up during no-voltage application is varied when the angle $\theta1$ is excessively small. For example, the liquid crystal may even stand up in an azimuth changed by 180 degrees (reversed tilt). Accordingly, the refractive index difference of the microparticle 34B and that of the bulk 34A are not efficiently used, and thus there is a tendency of decrease in scattering efficiency and in luminance.

Moreover, during voltage application, in the microparticle 34B, the long axis direction of the liquid crystal molecule intersects or is orthogonal to (or is substantially orthogonal to) the optical axis AX1. At this time, the long axis of the liquid crystal molecule in the microparticle 34B is parallel to (or substantially parallel to) the light incident surface 10A and intersects the surface of the transparent substrate 31 at the angle $\theta2$ (for example, 90 degrees) larger than the angle $\theta1$. In other words, the liquid crystal molecule in the microparticle 34B is aligned in a state of being inclined by the angle $\theta2$ in the plane parallel to the light incident surface 10A or in a state of erecting at the angle $\theta2$ (=90 degrees), during voltage application.

As the above-described monomer having the alignment property and the polymerizability, although a material that has optical anisotropy and is combined with a liquid crystal is sufficient, in the present embodiment, a low-molecular monomer to be cured by ultraviolet ray may be preferable. Since it is preferable that the direction of optical anisotropy of the liquid crystal coincide with the direction of the optical anisotropy of the material (polymer material) formed by polymerization of the low-molecular monomer in the state of no-voltage application, the liquid crystal and the low-molecular monomer may be preferably aligned in the same direction before ultraviolet curing. In the case where a liquid crystal is used as the microparticle 34B, when the liquid crystal is a rod-like molecule, it is preferable that the shape of the monomer material to be used also have a rod-like shape. As described above, it is preferable to use a material having both of polymerizability and liquid crystallinity as a monomer material, and for example, the material may preferably contain, as the polymerizable functional group, one or more functional groups selected from the group configured of acrylate group, methacrylate group, acryloyloxy group, methacryloyloxy group, vinyl ether group, and epoxy group. These functional groups may be polymerized by irradiation of ultraviolet ray, infrared ray, or an electron beam, or heating. To suppress deterioration in alignment property at the time of ultraviolet ray irradiation, a poly-functionalized liquid crystal material may be added. When the bulk 34A has the above-described streaky structure, bifunctional liquid-crystalline monomer may be preferably used as a material of the bulk 34A. Moreover, monofunctional monomer may be added in order to adjust temperature exhibiting liquid crystallinity or trifunctional monomer may be added in order to improve crosslink density, to the material of the bulk 34A.

Next, the drive circuit 50 is described. For example, the drive circuit 50 may control the magnitude of the voltage applied to the lower electrode 32 and the upper electrode 36 so that the optical axis AX2 of the microparticle 34B is parallel to or substantially parallel to the optical axis AX1 of the bulk 34A in a certain light modulation cell 30*a* and the optical axis AX2 of the microparticle 34B intersects with or is orthogonal to the optical axis AX1 of the bulk 34A in the other light modulation cell 30*a*. In other words, the drive circuit 50 allows the directions of the optical axis AX1 of the bulk 34A and the optical axis AX2 of the microparticle 34B to coincide (or substantially coincide) with each other or to be different from each other (or be orthogonal to each other) through electric field control. The drive circuit 50 may adjust the light amount of the light source 20. Further, the drive circuit 50 may control the light amount of the light source 20 and the magnitude of the voltage applied to the lower electrode 32 and the upper electrode 36, in consideration of a picture signal input from the outside in addition to the distance from the light source 20.

(Partial Lighting and Partial Driving)

Moreover, the drive circuit 50 is allowed to drive a part (one or more) of the plurality of electrode blocks 32C. For example, as illustrated in FIG. 11A, the drive circuit 50 drives a part (one or more) of the plurality of electrode blocks 32C arranged in the second direction. At this time, strip-like light is emitted from the scattering region 30B corresponding to the electrode block 32C driven by the drive circuit 50. Moreover, for example, as illustrated in FIG. 11B, the drive circuit 50 drives a part (one or more) of the plurality of electrode blocks 32C arranged in the second direction and the third direction. At this time, block-like light is emitted from the scattering region 30B corresponding to the electrode block 32 driven by the drive circuit 50.

At this time, when the drive circuit 50 drives the plurality of electrode blocks 32C, the drive circuit 50 applies a voltage that is modulated based on the distance of the electrode block 32C from the light source 20, to each of the electrode blocks 32C. Specifically, for example, the drive circuit 50 may apply, to each of the electrode blocks 32C, the voltage whose crest value, duty ratio, and frequency are modulated based on the distance of the electrode block 32C from the light source 20. For example, the voltage is modulated so that the scattering property of the light modulation cell 30a is enhanced with increase in distance from the light source 20. Further, for example, the drive circuit 50 may apply, to the partial electrodes 32A, the voltage whose crest value, duty ratio, and frequency are modulated in consideration of a picture signal input from the outside in addition to the distances of the partial electrodes 32A from the light source 20.

The luminance of the scattering region 30B is extremely high as compared with the case where the luminance is made uniform (alternate long and short dash line in (B) of FIG. 10), and the luminance of the partial white display (luminance enhancement) is increased by a decreased amount of the luminance of the transmissive region 30A. Accordingly, contrast of a liquid crystal display is improved. In addition, with use of the "luminance enhancement", the drive circuit 50 is allowed to decrease light emission amount from the light source 20 by an amount of luminance that is to be increased by the "luminance enhancement" to the same level as that in the case where the luminance is made uniform (alternate long and short dash line in (B) of FIG. 10), and thus is allowed to decrease power consumed by the light source 20.

(Partial Lighting and Scan Driving)

Further, the drive circuit 50 may sequentially drive the plurality of electrode blocks 32C in each predetermined unit (for example, one by one). For example, as illustrated in FIG. 12A and FIG. 12B, the drive circuit 50 may sequentially drive the plurality of electrode blocks 32C arranged in the second direction, in each predetermined unit (for example, one by one). At this time, the scattering region 30B is scanned in the second direction by driving by the drive circuit 50, and the strip-like light is accordingly scanned in the second direction. At this time, the luminance that is obtained by averaging the illumination light for time by one scanning period indicates the brightness actually viewable by eyes. Moreover, for example, as illustrated in FIG. 13A and FIG. 13B, the drive circuit 50 may sequentially drive the plurality of electrode blocks 32C arranged in the second direction and the third direction in each predetermined unit (for example, one by one). At this time, the scattering region 30B is scanned in the second direction by driving by the drive circuit 50, and the block-like light is accordingly scanned in the second direction.

Here, when the illumination apparatus 1 is used as a backlight of a display panel (not illustrated), the drive circuit 50 may preferably perform the scanning of the plurality of electrode blocks 32C in the direction same as the scanning direction of pixels of the display panel, in synchronization with the scanning of the pixels of the display panel. In such a case, it is possible to perform display with high luminance and improved moving picture responsiveness (blurring).

Further, the drive circuit 50 may adjust the light amount of the light source 20 in consideration of the distance from the light source 20 and a picture signal input from the outside while sequentially driving the plurality of electrode blocks 32C in each predetermined unit (for example, one by one). At this time, the drive circuit 50 may preferably perform scanning of the plurality of electrode blocks 32C in the direction same as the scanning direction of the pixels of the display panel, in synchronization with the scanning of the pixels of the display panel. In such a case, it is possible to perform display with low power consumption and improved moving picture responsiveness (blurring).

Incidentally, in the above-described partial driving and scan driving, for example as illustrated in (A) and (B) of FIG. 14, the drive circuit 50 outputs a voltage waveform of duty ratio of 100% with respect to the electrode block 32C to be driven, and outputs a voltage waveform (a ground voltage) of duty ratio of 0% with respect to the electrode block 32C not to be driven. At this time, the widths of the respective partial electrodes 32A included in the electrode block 32C may have, for example, the "arched distribution" as illustrated in (C) of FIG. 14, and therefore, the scattering intensity of the light modulation cell 30a corresponding to the electrode block 32C to be driven has a "arched" distribution as well. As a result, the luminance of the light modulation cell 30a corresponding to the electrode block 32C to be driven has the "arched distribution" as illustrated in (D) of FIG. 14.

The formation region of each of the electrode blocks 32C is overlapped with a part of the formation region of other electrode block 32C adjacent in the second direction. Therefore, in the above-described partial driving and scan driving, the luminance of the light modulation cell 30a corresponding to the electrode block 32C to be driven has luminance distribution with smooth boundary as illustrated in (D) of FIG. 14. Further, since the widths of the respective partial electrodes 32A may have, for example, the "arched distribution" as illustrated in (C) of FIG. 14, the luminance of the light modulation cell 30a corresponding to the electrode block 32C to be driven has uniform distribution in the non-overlap region 32-2, and has smoothly attenuated distribution in the overlap region 32-1, as illustrated in (D) of FIG. 14.

(Full Lighting)

The drive circuit 50 may drive all of the electrode blocks 32C at a time. For example, as illustrated in FIG. 15A, the drive circuit 50 may drive all of the electrode blocks 32C arranged in the second direction. At this time, planar light is output from the scattering regions 30B corresponding to all of the electrode blocks 32C driven by the drive circuit 50. Moreover, for example, as illustrated in FIG. 15B, the drive circuit 50 may drive all of the electrode blocks 32C arranged in the second direction and the third direction. At this time, planar light is output from the scattering regions 30B corresponding to all of the electrode blocks 32C driven by the drive circuit 50.

Incidentally, in the above-described full lighting, the drive circuit 50 applies a voltage that is modulated based on the distance of the electrode block 32C from the light source 20, to each of the electrode blocks 32C. Specifically, in the above-described full lighting, for example, the drive circuit 50 may apply a voltage whose crest value, duty ratio, and frequency are modulated based on the distance of the electrode block 32C from the light source 20, to each of the electrode blocks 32C. For example, the voltage may be modulated so that the scattering property of the light modulation cell 30a is enhanced with increase in distance from the light source 20. Further, for example, the drive circuit 50 may apply a voltage whose crest value, duty ratio, and frequency are modulated in consideration of a picture signal input from the outside in addition to the distances of the respective electrode blocks 32C from the light source 20, to each of the electrode blocks 32C.

(A) and (B) of FIG. 16 illustrates an example of the duty ratio of the voltage to be applied to each of the electrode blocks 32C. (C) of FIG. 16 illustrates an example of widths of the respective partial electrodes 32A in the arrangement direction. (D) of FIG. 16 illustrates an example of the luminance distribution of the light modulation cell 30a when the voltage to be applied to each of the electrode blocks 32C has the duty ratio illustrated in (A) and (B) of FIG. 16. Note that (A) of FIG. 16 illustrates only the extracted plurality of electrode blocks 32C arranged in the second direction. Therefore, (A) of FIG. 16 includes not only an example in which the plurality of electrode blocks 32C are arranged only in the second direction but also an example in which the plurality of electrode blocks 32C are arranged in the second direction and the third direction.

As illustrated in (A) and (B) of FIG. 16, the duty ratio of the voltage applied to the electrode blocks 32C is gradually increased with increase in distance from the light source 20. At this time, the formation region of each of the electrode blocks 32C is overlapped with a part of the formation region of other electrode block 32C adjacent in the second direction, and further, the widths of the respective partial electrodes 32A included in the electrode block 32C may have the "arched distribution" as illustrated in (C) of FIG. 16, for example. Therefore, the value of the duty ratio of the voltage applied to the electrode blocks 32C is formally discrete; however, actually is assumed to be continuously increased with increase in distance from the light source 20. As a result, the scattering intensity of the light modulation device 30 is continuously increased with increase in distance from the light source 20, and thus the luminance of the illumination apparatus 1 is substantially uniform irrespective of the distance from the light source 20 as illustrated in (D) of FIG. 16.

(A) of FIG. 17 illustrates an example of a planar configuration of a partial electrode 132A according to a comparative example. The partial electrode 132A corresponds to the electrode block 32C in the present embodiment, and has a single strip shape. In other words, unlike the partial electrode 32A, change in line width based on the distance from the light source 20 does not occur in the partial electrode 132A. Further, unlike the electrode block 32C, the plurality of partial electrodes 132A is not grouped, and concept like the overlap region 32-1 in the present embodiment is not present. In the present comparative example, each of the partial electrodes 132A is applied with the voltage so that the duty ratio thereof is increased with increase in distance from the light source 20. At this time, as illustrated in (C) of FIG. 17, the luminance of the illumination apparatus 1 has non-uniform distribution bright on the light source 20 side, and has discontinuous distribution on a boundary of a region corresponding to the partial electrode 132A. Therefore, a boundary between a bright part and a dark part in the illumination light is visually recognized clearly.

(A) of FIG. 18 and (A) of FIG. 19 each illustrate another example of the planar configuration of the partial electrode 132A according to the comparative example. (B) of FIG. 18 and (B) of FIG. 19 each illustrate another example of the planar configuration of a partial electrode 136A according to the comparative example. The partial electrodes 132A corresponds to the electrode block 32C in the present embodiment, and has jagged irregularity on a side in proximity to adjacent other partial electrode 132A. On the other hand, the partial electrode 136A corresponds to the partial electrode 36A in the present embodiment, and has a plurality of openings whose respective diameters are gradually decreased with increase in distance from the light source 20.

In the present comparative example, at the time of full lighting of the illumination apparatus, each of the partial electrodes 132A is applied with the voltage so that the duty ratio thereof is increased with increase in distance from the light source 20 as illustrated in (C) of FIG. 18. At this time, as illustrated in (D) of FIG. 18, the luminance at the time of the full lighting of the illumination apparatus becomes substantially uniform irrespective of the distance from the light source 20. Moreover, in the present comparative example, at the time of partial lighting of the illumination apparatus, for example, as illustrated in (C) of FIG. 19, the partial electrode 132A to be driven is applied with the voltage waveform having the duty ratio of 100%, and the partial electrode 132A not to be driven is applied with the voltage waveform (the ground voltage) having the duty ratio of 0%. At this time, the luminance distribution at the time of the partial lighting of the illumination apparatus has a smooth boundary due to the effect of the jagged irregularity on the side, as illustrated in (D) of FIG. 19. Accordingly, the electrode block 32C in the present embodiment achieves a function equivalent to the two partial electrodes (the partial electrodes 132A and 136A) according to the comparative example, without being provided with jagged irregularity on the sides or being provided with the plurality of openings through patterning of the upper and lower two electrodes.

Hereinafter, a method of manufacturing the illumination apparatus 1 in the present embodiment will be described with reference to FIG. 20 to FIG. 22.

First, a transparent conductive film 32F made of ITO or the like is formed on the transparent substrate 31 configured of a glass substrate or a plastic film substrate ((A) of FIG. 20). Then, after a patterned resist layer (not illustrated) is formed on the transparent conductive film 32F, the transparent conductive film 32F is selectively etched with use of the resist layer as a mask. As a result, the lower electrode 32 is formed ((B) of FIG. 20).

Next, the alignment film 33 is applied on the entire surface, followed by drying and firing ((C) of FIG. 20). When a polyimide-based material is used as the alignment film 33, NMP (N-methyl-2-pyrroridone) is frequently used as a solvent, and at this time, a temperature of about 200° C. is necessary in the atmosphere. Note that, in this case, when a plastic substrate is used as the transparent substrate 31, the alignment film 33 may be dried in a vacuum at 100° C. and fired. After that, rubbing treatment is performed on the alignment film 33. As a result, the alignment film 33 can function as an alignment film for horizontal alignment.

Next, spacers 38 to form a cell gap are spread on the alignment film 33 by a dry method or a wet method ((A) of FIG. 21). Note that, when the light modulation cell 30a is formed by vacuum bonding method, the spacers 38 may be mixed into a mixture to be dropped. In addition, instead of the spacers 38, column spacers may be formed by photolithography. The column spacers may be preferably disposed in a region not contributing to switching between transparency and scattering in the light modulation layer 34, namely, in a region where one or both of the upper electrode 36 and the lower electrode 32 are not provided (for example, in a part where the electrodes are not provided in FIG. 5).

Moreover, when the entire region not contributing to switching between transparency and scattering is filled with the column spacers, the usage of the liquid crystal material is allowed to be reduced. Moreover, when fine scattering is present in a transparent state, it is possible to suppress the scattering and to improve contrast.

Subsequently, a seal agent pattern 39 for bonding and for preventing leakage of liquid crystal is applied, for example, in a frame shape on the alignment film 35 that has been fabricated by a method similar to that described above ((B) of FIG. 21). The seal agent pattern 39 is allowed to be formed by a dispenser method or a screen printing method.

Although the vacuum bonding method (one drop fill method, ODF method) will be described below, the light modulation cell 30a may be formed by a vacuum injection method, a roll bonding system, or the like.

First, a mixture 44 of liquid crystal and monomer corresponding to a volume that is determined from the cell gap, a cell area, and the like is dropped uniformly in a plane ((C) of FIG. 21). Although a precise dispenser of linear guide system may be preferably used for dropping the mixture 44, the seal agent pattern 39 may be used as a bank and a dye coater or the like may be used.

The above-described material may be used for the liquid crystal and the monomer, and the weight ratio of the liquid crystal and the monomer is 98:2 to 50:50, preferably 95:5 to 75:25, and more preferably 92:8 to 85:15. The drive voltage is allowed to be decreased by increasing the rate of the liquid crystal; however, if the liquid crystal is excessively increased, whiteness tends to be lowered at the time of voltage application, or transparency is tends to be deteriorated due to lowering of response speed after voltage off.

The mixture 44 is added with a polymerization initiator, in addition to the liquid crystal and the monomer. The monomer ratio of the polymerization initiator to be added is adjusted within a range of 0.1 to 10 wt % depending on the wavelength of ultraviolet ray to be used. The mixture 44 may be added with a polymerization inhibitor, a plasticizer, a viscosity modifier, and the like, in addition thereto as necessary. When the monomer is in a solid or a gel at room temperature, a metal cap, a syringe, and a substrate may be preferably warmed.

After the transparent substrate 31 and the transparent substrate 37 are placed on a vacuum bonding machine (not illustrated), evacuation and bonding are performed ((A) of FIG. 22). After that the bonded body is released in the air, and the cell gap is uniformized by uniform pressurization at atmosphere pressure. The cell gap is arbitrarily selectable based on relationship between white luminance (whiteness) and the drive voltage, and is 2 to 40 μm, preferably, may be 3 to 10 μm.

After bonding, it is preferable to perform alignment treatment if necessary (not illustrated). When light leakage occurs at the time of inserting the bonded cell between crossed-Nicols polarizers, the cell is subjected to heat treatment for a certain time or is left at room temperature to be aligned. After that, ultraviolet ray L3 is irradiated to polymerize the monomer, and thus polymer is formed ((B) of FIG. 22). In this way, the light modulation device 30 is manufactured.

It is preferable that the temperature of the cell be prevented from being varied during irradiation of the ultraviolet ray. It is preferable to use an infrared cut filter, and use a UV-LED or the like as a light source. The illuminance of the ultraviolet ray affects the tissue structure of the composite material, and thus the illuminance may be preferably adjusted based on the liquid crystal material to be used, the monomer material to be used, and the compositions thereof, may be preferably within a range of 0.1 to 500 mW/cm$^2$, and more preferably within a range of 0.5 to 30 mW/cm$^2$. There is a tendency that the drive voltage is decreased as the illuminance of the ultraviolet ray is decreased and preferable illuminance of the ultraviolet ray is selectable in terms of both of productivity and characteristics.

Then, the light modulation device 30 is bonded to the light guide plate 10 ((C) of FIG. 22). Although the bonding may be performed through adhesion or bonding, the adhesion or the bonding may be preferably performed with use of a material that has a refractive index as close to that of the light guide plate 10 and that of the substrate material of light modulation device 30 as possible. Finally, lead wire (not illustrated) is attached to the lower electrode 32 and the upper electrode 36. In this way, the illumination apparatus 1 of the present embodiment is manufactured.

As described above, the process in which the light modulation device 30 is fabricated and the light modulation device 30 is finally bonded to the light guide plate 10 has been described; however, the transparent substrate 37 formed with the alignment film 35 may be previously bonded to the surface of the light guide plate 10 and then the illumination apparatus 1 may be fabricated. Moreover, the illumination apparatus 1 may be fabricated by a single wafer system or a roll to roll system.

Next, functions and effects of the illumination apparatus 1 of the present embodiment will be described.

In the illumination apparatus 1 of the present embodiment, for example, the voltage may be applied to the lower electrode 32 and the upper electrode 36 of each of the light modulation cells 30a so that the optical axis AX2 of the microparticle 34B is parallel to or substantially parallel to the optical axis AX1 of the bulk 34A in a light modulation cell 30a and the optical axis AX2 of the microparticle 34B is orthogonal to or substantially orthogonal to the optical axis AX1 of the bulk 34A in the other light modulation cell 30a. As a result, the light that has been emitted from the light source 20 and has entered the light guide plate 10 passes through the transmissive region 30A of the light modulation device 30 where the optical axis AX1 is parallel to or substantially parallel to the optical axis AX2. On the other hand, the light that has been emitted from the light source 20 and has entered the light guide plate 10 is scattered in the scattering region 30B of the light modulation device 30 where the optical axis AX1 is orthogonal to or substantially orthogonal to the optical axis AX2. Light that has passed through the lower surface of the scattering region 30B of the scattered light is reflected by the reflector 40 to return to the light guide plate 10 again, and then is emitted from the upper surface of the backlight 1. In addition, light toward the upper surface of the scattering region 30B of the scattered light passes through the light guide plate 10, and then is emitted from the upper surface of the illumination apparatus 1. As described above, in the present embodiment, light is scarcely emitted from the upper surface of the transmissive region 30A and the light is emitted from the upper surface of the scattering region 30B. In this way, the modulation ratio in the front direction is increased.

Typically, the PDLC is formed by mixing a liquid crystal material and an isotropic low-molecular material and causing phase separation by ultraviolet irradiation, drying of a solvent, etc., and the PDLC is a composite layer in which microparticles of the liquid crystal material are dispersed in a polymer material. The liquid crystal material in the composite layer exhibits scattering property because the liquid crystal material face in random directions during no-voltage application; however the liquid crystal material aligns in an electric field direction during voltage application. Accordingly, the liquid crystal material in the composite layer exhibits high transparency in the front direction (in the normal direction of the PDLC) when the ordinary refractive index of the liquid crystal material is equal to the refractive index of the polymer material. However, in the liquid crystal material, in the oblique direction, difference between the extraordinary refractive index of the liquid crystal material and the refractive index of the polymer material is remarkable, and this results in expression of scattering property in the oblique direction even when transparency is expressed in the front direction.

Usually, a light modulation device using the PDLC frequently has a structure in which the PDLC is sandwiched between two glass plates that each have a front surface provided with a transparent conductive film. When light obliquely enters, from the air, the light modulation device having the above-described structure, the light that has entered the light modulation device in the oblique direction is refracted due to difference in refractive index between the air and the glass plate, and enters the PDLC at a smaller angle. Therefore, in such a light modulation device, large scattering does not occur. For example, when light enters the light modulation device from the air at an angle of 80 degrees, the entering angle of the light to the PDLC may be decreased to about 40 degrees by refraction at the glass interface.

However, in an edge light system using a light guide plate, since light enters through the light guide plate, the light crosses the PDLC at a large angle of about 80 degrees. Therefore, the difference between the extraordinary refractive index of the liquid crystal material and the refractive index of the polymer material is large, and further the light crosses the PDLC at larger angle, and optical path subjected to scattering is also increased accordingly. For example, when microparticles of a liquid crystal material that has an ordinary refractive index of 1.5 and an extraordinary refractive index of 1.65 are dispersed in a polymer material having a refractive index of 1.5, difference in refractive index is not generated in the front direction (the normal direction of the PDLC); however, the difference in refractive index is increased in the oblique direction. Therefore, this prevents the scattering property in the oblique direction from being decreased so that viewing angle characteristics are deteriorated. Further, when an optical film such as a diffuser film is provided on the light guide plate, obliquely-leaked light is diffused also in the front direction by the diffuser film or the like. Therefore, light leakage in the front direction is increased and the modulation ratio in the front direction is lowered.

On the other hand, in the present embodiment, since the bulk 34A and the microparticle 34B are formed to mainly contain respective optical anisotropic materials, the scattering property is decreased and the transparency is improved in the oblique direction. For example, when the bulk 34A and the microparticle 34B are configured to mainly contain respective optical anisotropic materials whose ordinary refractive indices are equal to each other and whose extraordinary refractive indices are also equal to each other, and in a region where a voltage is not applied to the lower electrode 32 and the upper electrode 36, the directions of the optical axes thereof coincide or substantially coincide with each other. Therefore, difference in refractive index is decreased or eliminated in all directions including the front direction (the normal direction of the light modulation device 30) and the oblique direction, and higher transparency is obtainable.

As a result, light leakage in a region where a viewing angle is large is allowed to be decreased or substantially eliminated, and viewing angle characteristics are allowed to be improved.

For example, when a liquid crystal that has an ordinary refractive index of 1.5 and an extraordinary refractive index of 1.65 and a liquid crystalline monomer that has an ordinary refractive index of 1.5 and an extraordinary refractive index of 1.65 are mixed and the liquid crystalline monomer is polymerized in a state where the liquid crystal and the liquid crystalline monomer are aligned by the alignment film or an electric field, the optical axis of the liquid crystal coincides with the optical axis of a polymer formed through polymerization of the liquid crystalline monomer. As a result, since the refractive indices are coincident with each other in all directions, in such a case, a state with higher transparency is achievable and the viewing angle characteristics are further improved.

In addition, in the present embodiment, for example, as illustrated in (A) and (B) of FIG. 10, the luminance of the transmissive region 30A (the luminance of black display) is lower than that in the case where the luminance is made uniform (alternate long and short dash line in (B) of FIG. 10). On the other hand, the luminance of the scattering region 30B is extremely higher than that in the case where the luminance is made uniform (alternate long and short dash line in (B) of FIG. 10), and the luminance of partial white display (luminance enhancement) is increased by a decreased amount of the luminance of the transmissive region 30A.

Incidentally, the luminance enhancement is a technique to enhance luminance when partial white display is performed, as compared with the case of entire white display. This is a technique generally used for CRT, PDP, and the like. In a liquid crystal display, however, a backlight uniformly emits light as a whole irrespective of an image so that partial enhancement of luminance is difficult. Incidentally, when the backlight is configured as an LED backlight in which a plurality of LEDs are two-dimensionally arranged, the LEDs are allowed to be partially turned off. In such a case, however, diffusion light from a dark region where the LEDs are turned off is absent, and thus the luminance is lowered as compared with the case where all of the LEDs are turned on. In addition, although it is possible to increase the luminance by increasing a current flowing through the LEDs partially turned on, in such a case, large current flows through the LEDs in an extremely short time, and thus issues are remained in terms of load and reliability of circuits.

On the other hand, in the present embodiment, since the bulk 34A and the microparticle 34B are formed to mainly contain respective optical anisotropic materials, the scattering property in the oblique direction is suppressed and leakage of light from the light guide plate in a dark state is suppressed. Therefore, the light is guided from a partial dark region to a partial bright region so that luminance enhancement is achievable without increasing power supplied to the backlight 1.

Moreover, in the present embodiment, each of the electrode blocks 32C has the plurality of partial electrodes 32A that each extend in the first direction and are arranged in a direction intersecting the first direction. Therefore, the scattering characteristics of the light modulation layer 34 are allowed to be partially adjusted in regions facing the respective electrode blocks 32C. As a result, it is possible to moderate change in plane of the luminance distribution of the light extracted from the light modulation layer 34.

In particular, when the formation region of each of the electrode blocks 32C is overlapped with a part of the formation region of other electrode block 32C adjacent in the second direction, the luminance of the light modulation cell 30a corresponding to the electrode block 32C to be driven has smooth distribution as illustrated in (D) of FIG. 14, in the partial driving and the scan driving. Further, when the widths of the respective partial electrodes 32A has the "arched distribution", for example, as illustrated in (C) of FIG. 14, the luminance of the light modulation cell 30a corresponding to the electrode block 32C to be driven has uniform distribution in the non-overlap region 32-2 and has smoothly attenuated distribution in the overlap region 32-1, as illustrated in (D) of FIG. 14.

Incidentally, although not illustrated, the overlap region 32-1 may not be provided in each of the electrode blocks 32C. In such a case, the scattering intensity of the light modulation cell 30a or the luminance of the light modulation cell 30a has rapidly "arched distribution" relative to that in the above-described case; however, has gently "arched distribution" as compared with the case where the partial electrode 132A that does not change in line width is provided as illustrated in (A) of FIG. 17.

Moreover, in the present embodiment, as described above, the overlap region 32-1 is provided in each of the electrode blocks 32C, and the duty ratio of the voltage to be applied to the electrode blocks 32C is gradually increased with increase in distance from the light source 20. Therefore, in the full lighting, it is considered that the value of the duty ratio of the voltage to be applied to the electrode blocks 32C is actually increased continuously with increase in distance from the light source 20. Accordingly, the scattering intensity of the light modulation device 30 is continuously increased with increase in distance from the light source 20. As a result, the luminance of the illumination apparatus 1 at the time of the full lighting is allowed to be made uniform irrespective of the distance from the light source 20, as illustrated in (D) of FIG. 16.

As described above, in the present embodiment, it is possible to blur the boundary between a bright part and a dark part in the illumination light at the time of the partial lighting, and to make illumination light uniform at the time of the full lighting. Moreover, it is possible to blur the boundary between a bright part and a dark part in the illumination light at each moment of scanning in scan driving, and to make the illumination light uniform at the time when the illumination light is averaged for one frame period of the display panel.

2. Modification of First Embodiment

In the above-described embodiment, the streaky structure, the porous structure, or the rod-like structure of the bulk 34A has the long axis in the direction parallel to or substantially parallel to the light incident surface 10A; however, for example, may have the long axis in a direction orthogonal to or substantially orthogonal to the light incident surface 10A. At this time, the alignment films 33 and 35 have alignment direction that is a direction orthogonal to or substantially orthogonal to the light incident surface 10A.

FIG. 23 schematically illustrates an example of alignment state in the bulk 34A and the microparticle 34B during no-voltage application. FIG. 24 schematically illustrates an alignment state in the bulk 34A and the microparticle 34B during voltage application.

For example, as illustrated in FIG. 23, the bulk 34A and the microparticle 34B may have a configuration in which the direction of the optical axis AX1 of the bulk 34A (the long axis of the ellipsoid 134A) and the direction of the optical axis AX2 of the microparticle 34B (the long axis of the ellipsoid 134B) coincide with (are parallel to) each other during no-voltage application. It is unnecessary for the direction of the optical axis AX1 and the direction of the optical axis AX2 to constantly coincide with each other during no-voltage application, and the direction of the optical axis AX1 may be deviated in some degree from the direction of the optical axis AX2 due to, for example, manufacturing error.

Moreover, for example, the microparticle 34B may have a configuration in which the optical axis AX2 is orthogonal to (or substantially orthogonal to) the light incident surface 10A and is parallel to (or substantially parallel to) the surface of the transparent substrate 31 during no-voltage application. Further, for example, the microparticle 34B may have a configuration in which the optical axis AX2 intersects with the surface of the transparent substrate 31 at a slight angle θ1 (not illustrated) during no-voltage application.

On the other hand, the bulk 34A has a configuration in which the optical axis AX1 is fixed irrespective of presence or absence of voltage application to the lower electrode 32 and the upper electrode 36. Specifically, the bulk 34A has a configuration in which the optical axis AX1 is orthogonal to (or substantially orthogonal to) the light incident surface 10A, and intersects the surface of the transparent substrate 31 at the predetermined angle θ1. In other words, the optical axis AX1 is parallel to (or substantially parallel to) the optical axis AX2 during no-voltage application.

Note that it is unnecessary for the optical axis AX2 to constantly be parallel to the light incident surface 10A and to constantly intersect with the surface of the transparent substrate 31 at the angle θ1, and the optical axis AX2 may intersect with the surface of the transparent substrate 31 at an angle slightly different from the angle θ1 due to, for example, manufacturing error. Moreover, it is unnecessary for the optical axes AX1 and AX2 to constantly be parallel to the light incident surface 10A, and the optical axes AX1 and AX2 may intersect with the light incident surface 10A at a small angle due to, for example, manufacturing error.

Here, it is preferable that an ordinary refractive index of the bulk 34A be equal to that of the microparticle 34B, and an extraordinary refractive index of the bulk 34A be equal to that of the microparticle 34B. In this case, for example, during no-voltage application, difference in refractive index is hardly generated in all directions, and high transparency (light permeability) is obtainable. Accordingly, the light from the light source 20 is not scattered in the light modulation layer 34 and passes through the light modulation layer 34. As a result, for example, as illustrated in (A) and (B) of FIG. 10, light L from the light source 20 (light from the oblique direction) propagates through a region (the transmissive region 30A) that is transparent in the light modulation device 30, and is totally reflected by an interface between the light modulation device 30 and the air. Thus, luminance of the transmissive region 30A (luminance of black display) is decreased as compared with the case where the luminance is made uniform (alternate long and short dash line in (B) of FIG. 10).

Moreover, for example, the bulk 34A and the microparticle 34B may have a configuration in which the direction of the optical axis AX1 is different from (intersects or is orthogonal to) that of the optical axis AX2 during voltage application, as illustrated in FIG. 24. In addition, for example, the microparticle 34B may have a configuration in which the optical axis AX2 is parallel to (or substantially parallel to) the light incident surface 10A and intersects the surface of the transparent substrate 31 at the angle θ2 (for example, 90 degrees, not illustrated) larger than the angle θ1 during voltage application.

Accordingly, during voltage application, in the light modulation layer 34, difference in refractive index is increased in all directions, and high scattering property is obtainable. Therefore the light from the light source 20 is scattered in the light modulation layer 34. As a result, for example, as illustrated in (A) and (B) of FIG. 10, the light L from the light source 20 (the light from the oblique direction) is scattered in the region (the scattering region 30B) that is in a scattered state in the light modulation device 30, and the scattered light directly enters the light guide plate 10 or enters the light guide plate 10 after being reflected by the reflector 40, and then is emitted from the upper surface (the light emission surface 1A) of the light guide plate 10. Therefore, the luminance of the scattering region 30B is extremely high as compared with the case where luminance is made uniform (alternate long and short dash line in (B) of FIG. 10), and the luminance of partial white display (luminance enhancement) is increased by a decreased amount of the luminance of the transmissive region 30A.

2. Second Embodiment

FIG. 25 is a sectional diagram illustrating an example of a schematic configuration of an illumination apparatus 2 according to a second embodiment of the technology. The illumination apparatus 2 in the present embodiment is different from the configuration of the illumination apparatus 1 according to the above-described first embodiment in that a light modulation device 60 is provided in place of the light modulation device 30. Therefore, in the following description, differences with the above-described embodiment will be described mainly, and description for common points to the above-described embodiment will be arbitrarily omitted.

For example, the light modulation device 60 may be tightly adhered to the back (the lower surface) of the light guide plate 10 without an air layer in between, and may be adhered to the back of the light guide plate 10 with, for example, an adhesive agent (not illustrated) in between. For example, as illustrated in FIG. 26, the light modulation device 60 may be configured by arranging the transparent substrate 31, the lower electrode 32, an alignment film 63, a light modulation layer 64, an alignment film 65, the upper electrode 36, and the transparent substrate 37 in order from the reflector 40 side.

For example, the alignment films 63 and 65 align a liquid crystal and a monomer used for the light modulation layer 64. For example, kinds of the alignment films may include a vertical alignment film and a horizontal alignment film; however in the present embodiment, the vertical alignment film is used for the alignment films 63 and 65. As the vertical alignment film, a silane coupling material, polyvinyl alcohol (PVA), a polyimide-based material, a surfactant, and the like may be used. In addition, when a plastic film is used as the transparent substrates 31 and 37, a silane coupling material capable of being used with an alcohol-based solvent as the alignment films 63 and 65 may be preferably used because firing temperature after the alignment films 63 and 65 are applied to the surfaces of the transparent substrates 31 and 37, respectively, is preferably as low as possible in manufacturing process.

Note that a vertical alignment film that has a function to provide pretilt to a liquid crystal molecule contacted to the vertical alignment film may be used. For example, rubbing may be used as a method of developing a pretilt function of the vertical alignment film. For example, the above-described vertical alignment film may have a function to allow the long axis of the liquid crystal molecule adjacent to the vertical alignment film to intersect with the normal of the vertical alignment film at a slight angle.

However, when the vertical alignment film is used as the alignment films 63 and 65, as a liquid crystal molecule contained in a microparticle 64B described later, a liquid crystal molecule having negative dielectric constant anisotropy (so-called negative liquid crystal) may be preferably used.

Next, the light modulation layer 64 of the present embodiment is described. For example, as illustrated in FIG. 26, the light modulation layer 64 is a composite layer including a bulk 64A and a plurality of microparticles 64B dispersed into the bulk 64A. The bulk 64A and the microparticles 64B have optical anisotropy.

FIG. 27 schematically illustrates an example of an alignment state in the bulk 64A and the microparticles 64B during no-voltage application. An ellipsoid 134C in FIG. 27 illustrates an example of a refractive index ellipsoid exhibiting refractive index anisotropy of the bulk 64A during no-voltage application. An ellipsoid 134D in FIG. 27 illustrates an example of a refractive index ellipsoid exhibiting refractive index anisotropy of the microparticle 64B during no-voltage application.

FIG. 28 schematically illustrates an example of an alignment state in the bulk 64A and the microparticles 64B during voltage application. The ellipsoid 134C in FIG. 28 illustrates an example of a refractive index ellipsoid exhibiting refractive index anisotropy of the bulk 64A during voltage application. The ellipsoid 134D in FIG. 28 illustrates an example of a refractive index ellipsoid exhibiting refractive index anisotropy of the microparticle 64B during voltage application.

For example, as illustrated in FIG. 27, the bulk 64A and the microparticle 64B may have a configuration in which a direction of an optical axis AX3 of the bulk 64A (a long axis of the ellipsoid 134C) and a direction of an optical axis AX4 of the microparticle 64B (a long axis of the ellipsoid 134D) coincide with (are parallel to) each other. Incidentally, the optical axes AX3 and AX4 each indicate a line parallel to a traveling direction of light ray, the line defining a refractive index as one value irrespective of polarization direction. In addition, it is unnecessary for the direction of the optical axis AX3 and the direction of the optical axis AX4 to constantly coincide with each other during no-voltage application, and the direction of the optical axis AX3 may be deviated in some degree from the direction of the optical axis AX4 due to, for example, manufacturing error.

Moreover, for example, the microparticle 64B may have a configuration in which the optical axis AX4 is parallel to (or substantially parallel to) the light incident surface 10A during no-voltage application. For example, the microparticle 64B may further have a configuration in which the optical axis AX4 intersects with the normal of the transparent substrate 31 at a slight angle θ3 (not illustrated). Note that the angle θ3 will be described in detail in description of the material for configuring the microparticle 64B.

On the other hand, for example, the bulk 64A may have a configuration in which the optical axis AX3 is fixed irrespective of presence or absence of voltage application to the lower electrode 32 and the upper electrode 36. Specifically, for example, the bulk 64A may have a configuration in which the optical axis AX3 is parallel to (or substantially parallel to) the light incident surface 10A, and intersects the normal of the transparent substrate 31 at the slight angle θ3. In other words, during no-voltage application, the optical axis AX3 is parallel to (or substantially parallel to) the optical axis AX4.

Incidentally, it is unnecessary for the optical axis AX4 to constantly be parallel to (or substantially parallel to) the light incident surface 10A and to constantly intersect with the normal of the transparent substrate 31 at the angle θ3, and the optical axis AX4 may intersect with the normal of the transparent substrate 31 at an angle slightly different from the angle θ3 due to, for example, manufacturing error. Moreover, it is unnecessary for the optical axes AX3 and AX4 to constantly be parallel to (or substantially parallel to) the light incident surface 10A, and the optical axes AX3 and AX4 may intersect with the light incident surface 10A at a small angle due to, for example, manufacturing error.

Here, it is preferable that an ordinary refractive index of the bulk 64A be equal to that of the microparticle 64B, and an extraordinary refractive index of the bulk 64A be equal to that of the microparticle 64B. In this case, for example, during no-voltage application, substantially no difference in refractive index is generated in all directions, and high transparency (light permeability) is obtainable. Accordingly, the light from the light source 20 is not scattered in the light modulation layer 64 and passes through the light modulation layer 64. As a result, for example, the light L from the light source 20 (the light from the oblique direction) propagates through the region (the transmissive region 30A) transparent in the light modulation device 60 and is then totally reflected by an interface between the air and the light modulation device 60, and luminance of the transmissive region 30A (luminance of black display) is decreased as compared with the case where the luminance is made uniform.

Moreover, for example, the bulk 64A and the microparticle 64B may have a configuration in which the direction of the optical axis AX3 is different from (intersects with or is orthogonal to) that of the optical axis AX4 during voltage application, as illustrated in FIG. 28. In addition, for example, the microparticle 64B may have a configuration in which the optical axis AX4 is parallel to (or substantially parallel to) the light incident surface 10A and intersects with the normal of the transparent substrate 31 at an angle θ4 (for example, 90 degrees, not illustrated) larger than the angle θ3 during voltage application. Note that the angle θ4 will be described in detail in description of a material for configuring the microparticle 34B.

Moreover, for example, the microparticle 64B may have a configuration in which the optical axis AX4 intersects with the light incident surface 10A and intersects the normal of the transparent substrate 31 at the angle θ4 (for example, 90 degrees, not illustrated) larger than the angle θ3 during voltage application. Further, for example, the microparticle 64B may have a configuration in which the optical axis AX4 intersects with the normal of the transparent substrate 31 at the angle θ4 (for example, 90 degrees, not illustrated) larger than the angle θ3 and the X and Y directions are random during voltage application.

Accordingly, during voltage application, in the light modulation layer 64, difference in refractive index becomes large in all directions, and high scattering property is obtainable. Therefore, the light from the light source 20 is scattered in the light modulation layer 64. As a result, the light from the light source 20 (the light from the oblique direction) is scattered in the region (the scattering region 30B) in a scattered state in the light modulation device 60, the scattered light directly enters the light guide plate 10 or enters the light guide plate 10 after being reflected by the reflector 40, and then is emitted from the upper surface (the light emission surface) of the light guide plate 10. Therefore, luminance of the scattering region 30B is extremely high as compared with the case where the luminance is made uniform, and luminance of partial white display (luminance enhancement) is increased by a decreased amount of luminance of the transmissive region 30A.

Note that the ordinary refractive index of the bulk 64A may be slightly different from that of the microparticle 64B due to, for example, manufacturing error, and for example, the difference therebetween may be preferably 0.1 or less, and more preferably 0.05 or less. In addition, the extraordinary refractive index of the bulk 64A may also be slightly different from that of the microparticle 64B due to, for example, manufacturing error, and for example, the difference therebetween may be preferably 0.1 or less, and more preferably 0.05 or less.

In addition, the difference in refractive index ($\Delta n_P$=the extraordinary refractive index $ne_P$–the ordinary refractive index $no_P$) of the bulk 64A and the difference in refractive index ($\Delta n_L$=the extraordinary refractive index $ne_L$–the ordinary refractive index $no_L$) of the microparticle 64B may be preferably as large as possible, preferably 0.05 or more, more preferably 0.1 or more, and still more preferably 0.15 or more. This is because when the difference in the refractive index of each of the bulk 64A and the microparticle 64B is large, the scattering power of the light modulation layer 64 becomes high to easily disrupt light guiding condition, and the light from the light guide plate 10 is easily extracted.

Moreover, a response speed to the electric field of the bulk 64A is different from that of the microparticle 64B. The bulk 64A may have, for example, a streaky structure, a porous structure, or a rod-like structure that has a response speed lower than that of the microparticle 64B. For example, the bulk 64A may be formed of a polymer material obtained through polymerization of a low-molecular monomer. For example, the bulk 64A may be formed by polymerizing a material (for example, monomer) that is aligned along the alignment direction of the microparticle 64B or the alignment direction of the alignment films 63 and 65 and has an alignment property and polymerizability, by heat or light or both.

For example, the streaky structure, the porous structure, or the rod-like structure of the bulk 64A may have a long axis in a direction that is parallel to the light incident surface 10A and intersects with the normal of the transparent substrate 31 at the slight angle θ3. In the case where the bulk 64A has the streaky structure, an average size of streaky tissue in a short axis may be preferably 0.1 μm or more and 10 μm or less, and more preferably 0.2 μm or more and 2.0 μm or less in terms of enhancing scattering property of the guided light. In the case where the average size of the streaky tissues in the short axis direction is 0.1 μm or more and 10 μm or less, the scattering power in the light modulation device 60 is substantially equivalent in a visible region of 380 to 780 nm both inclusive. Therefore, increase or decrease of light of only a specific wavelength component does not occur in the plane, and thus balance in the visible region is achievable in the plane. When the average size of the streaky tissues in the short axis direction is smaller than 0.1 μm or larger than 10 μm, the scattering power of the light modulation device 30 is low irrespective of the wavelength, and thus it is difficult for the light modulation device 30 to function as a light modulation device.

Moreover, in terms of reducing wavelength dependency of scattering, the average size of the streaky tissues in the short axis direction may be preferably 0.5 μm or more and 5 µm or less, and more preferably within a range of 1 to 3 µm both inclusive. In such a case, when the light emitted from the light source 20 repeatedly passes through the bulk 64A in the light modulation device 60 during propagation of the light in the light guide plate 10, the wavelength dependency of the scattering in the bulk 64A is suppressed. The size of the streaky tissue is observable under a polarizing microscope, a confocal microscope, an electron microscope, and the like.

As the above-described monomer having the alignment property and the polymerizability, although a material that has optical anisotropy and is combined with a liquid crystal is sufficient, in the present embodiment, a low-molecular monomer to be cured by ultraviolet ray is preferable. Since it is preferable that the direction of optical anisotropy of the liquid crystal coincide with the direction of the optical anisotropy of the material (polymer material) formed through polymerization of the low-molecular monomer in the state of no-voltage application, the liquid crystal and the low-molecular monomer may be preferably aligned in the same direction before ultraviolet curing. In the case where a liquid crystal is used as the microparticle 64B, when the liquid crystal is a rod-like molecule, it is preferable that the shape of the monomer material to be used also have a rod-like shape. As described above, it is preferable to use a material having both of polymerizability and liquid crystalinity as a monomer material, and the monomer material may preferably contain, for example, as a polymerizable functional group, one or more functional groups selected from the group configured of acrylate group, methacrylate group, acryloyloxy group, methacryloyloxy group, vinyl ether group, and epoxy group. These functional groups may be polymerized by irradiation of ultraviolet ray, infrared ray, or an electron beam, or heating. To suppress deterioration in alignment property at the time of ultraviolet ray irradiation, a polyfunctionalized liquid crystal material may be added. When the bulk 64A has the above-described streaky structure, bifunctional liquid-crystalline monomer may be preferably used as a material of the bulk 64A. Moreover, monofunctional monomer may be added in order to adjust temperature exhibiting liquid crystalinity or trifunctional monomer may be added in order to improve crosslink density, to the material of the bulk 64A.

In the present embodiment, the drive circuit 50 performs the same driving as that in the above-described embodiment.

Next, a function and effects of the illumination apparatus 2 according to the present embodiment will be described.

In the present embodiment, similarly to the above-described embodiment, each of the electrode blocks 32C has the plurality of partial electrodes 32A that each extend in the first direction and are arranged in a direction intersecting the first direction. Accordingly, it is possible to partially adjust the scattering characteristics of the light modulation layer 64 in the regions facing the respective electrode blocks 32C. As a result, since the change in the plane of the luminance distribution of the light extracted from the light modulation layer 64 is allowed to be moderated, it is possible to blur the boundary between a bright part and a dark part in the illumination light irrespective of partial lighting and full lighting.

4. Modifications Common to Embodiments (Modification 1)

In the above-described embodiments, the upper electrode 36 may be configured to include the similar configuration to the plurality of electrode blocks 32C, instead of the lower electrode 32.

FIG. 29 illustrates an example of a planar configuration of the upper electrode 36. (A) and (B) of FIG. 30 each illustrate another example of the planar configuration of the upper electrode 36. The upper electrode 36 is provided on the surface of the transparent substrate 37 (specifically, on a surface of the transparent substrate 37 opposing to the transparent substrate 31), and is configured to include the plurality of partial electrodes 36A. The plurality of partial electrodes 36A each extend in one direction (the first direction) in plane, and are arranged in a direction intersecting the first direction. For example, the first direction may be a direction parallel to or substantially parallel to the light incident surface 10A. Note that the first direction may be a direction obliquely intersecting the light incident surface 10A.

The upper electrode 36 has the plurality of electrode blocks 36C (second electrode blocks). Out of the predetermined direction (the second direction) in plane and a direction (the third direction) intersecting the second direction, the plurality of electrode blocks 36C are arranged in at least the second direction. In this case, when the first direction is a direction parallel to or substantially parallel to the light incident surface 10A, the second direction is a direction orthogonal to or substantially orthogonal to the first direction. When the first direction is a direction obliquely intersecting the light incident surface 10A, the second direction is a direction orthogonal to or substantially orthogonal to the light incident surface 10A. In other words, the second direction is a direction orthogonal to or substantially orthogonal to the light incident surface 10A, irrespective of the first direction.

Each of the electrode blocks 36C is formed in a region including a part of a formation region of other electrode block 36C adjacent in the second direction so as not to block an electric field that is formed in the light modulation layer 34 (or the light modulation layer 64) by the other electrode block 36C adjacent in the second direction. Specifically, in an overlap region 36-1, two or more partial electrodes 36A are formed in the formation region of the other electrode block 36C adjacent in the second direction, and are arranged mixedly with two or more partial electrodes included in the other electrode block 36C adjacent in the second direction. For example, in each of the electrode blocks 36C, two or more partial electrodes 36A may be formed in a formation region of other electrode block 36C adjacent in the second direction, and may be alternately arranged with two or more partial electrodes included in the other electrode block 36C adjacent in the second direction. Further, in each of the electrode blocks 36C, two or more partial electrodes 36A are formed outside the formation region of the other electrode block 36C adjacent in the second direction. In other words, as illustrated in FIG. 29 and (A) and (B) of FIG. 30, the formation region of each of the electrode blocks 36C is overlapped with a part of the formation region of the other electrode block 36C adjacent in the second direction. In FIG. 29 and (A) and (B) of FIG. 30, a region where the formation regions of the respective electrode blocks 36C are overlapped with each other is illustrated as the overlap region 36-1, and a region where the formation regions of the respective electrode blocks 36C are not overlapped with each other is illustrated as a non-overlap region 36-2. Incidentally, in the overlap region 36-1, two or more partial electrodes 36A included in one of the electrode blocks 36C may be arranged so as to skip two or more partial electrodes included in the other electrode block 36C adjacent in the second direction, for every plural partial electrodes (for example, two by two). Moreover, in the overlap region 36-1, two or more partial electrodes 36A included in one of the electrode blocks 36C may be arranged alternately with two or more partial electrodes included in the other electrode block 36C adjacent in the second direction, and may be arranged in a partially toothless manner.

In each of the electrode blocks 36C, the partial electrodes 36A are electrically connected to one another. Specifically, as illustrated in FIG. 29, each of the electrode blocks 36C has a connection section 36B connected to ends of the respective partial electrodes 36A, and the partial electrodes 36A are electrically connected with one another by the connection section 36B. Accordingly, each of the electrode blocks 36C has a comb tooth shape configured of the plurality of partial electrodes 36A and the connection section 36B, and the plurality of electrode blocks 36C are arranged in the second direction so that the directions of the comb tooth of the respective electrode blocks 32C are alternately inverted (switched).

Next, widths of the respective partial electrodes 36A in the arrangement direction are described. FIG. 31 illustrates an example of the widths of the respective partial electrodes 36A in the arrangement direction. Each of the partial electrodes 36A has a width corresponding to a distance from the light source 20 in each of the electrode blocks 36C. Specifically, in each of the electrode blocks 36C, the widths of respective two or more partial electrodes 36A that are formed outside the formation region of the other electrode block 36C adjacent in the second direction (in the non-overlap region 36-2) are gradually increased with increase in distance from the light source 20. Moreover, in each of the electrode blocks 36C, the widths of respective two or more partial electrodes 36A formed in a formation region of other electrode block 36C that is adjacent in the second direction and is located relatively farther from the light source 20 (in the overlap region 36-1 farther from the light source 20) are gradually decreased as increase in distance from the light source 20. Further, in each of the electrode blocks 36C, the widths of respective two or more partial electrodes 36A formed in a formation region of other electrode block 36C that is adjacent in the second direction and is located relatively closer to the light source 20 (in the overlap region 36-1 closer to the light source 20) are gradually increased with increase in distance from the light source 20. In other words, in each of the electrode blocks 36C, the widths of respective two or more partial electrodes 36A on the light source 20 side (closer to the light source 20) out of the plurality of partial electrodes 36A are gradually increased with increase in distance from the light source 20, whereas the widths of respective two or more partial electrodes 36A on a side opposite to the light source 20 (on a side farther from the light source 20) out of the plurality of partial electrodes 36A are gradually decreased with increase in distance from the light source 20. Such a distribution of the widths of the plurality of partial electrodes 36A is hereinafter referred to as "arched distribution". Incidentally, although a case where the "arched distribution" is configured of polygonal curve is exemplified in FIG. 31, the "arched distribution" may be illustrated with smooth curve. Note that, the overlap region 36-1 may not be provided. In this case, in each of the electrode blocks 36C, the widths of the plurality of partial electrodes 36A in the arrangement direction are small on a side closer to the light source 20, and are gradually increased with increase in distance from the light source 20.

In the present modification, the drive circuit 50 performs the same driving as that in the above-described embodiment.

In the present modification, as with the above-described embodiment, each of the electrode blocks 32C has the plurality of partial electrodes 32A that each extend in the first direction and are arranged in a direction intersecting the first direction. Therefore, the scattering characteristics of the light modulation layers 34 and 64 are allowed to be partially adjusted in regions opposing to the respective electrode blocks 32C. As a result, it is possible to moderate change in plane of the luminance distribution of the light extracted from the light modulation layers 34 and 64, which makes it possible to blur the boundary between a bright part and a dark part in illumination light irrespective of partial lighting and full lighting.

(Modification 2)

In the above-described embodiments, the lower electrode 32 may be configured to include the plurality of electrode blocks 32C, and further the upper electrode 36 may be configured to include the plurality of electrode blocks 36C. In this case, the electrode blocks 32C and the electrode blocks 36C may be preferably arranged at positions opposed to each other. This makes it possible to reduce area of the electrodes, and in the case where the upper electrode 36 is formed of ITO or the like, it is possible to reduce absorption of visible light by the upper electrode 36. At this time, the widths of the respective partial electrodes 36A may be preferably wider by about 5 μm than the widths of the respective partial electrodes 32A, or the widths of the respective partial electrodes 32A may be preferably wider by about 5 μm than the widths of the respective partial electrodes 36A. This makes it possible to prevent decrease in width of the scattering region 30B due to alignment misregistration of the substrates. Moreover, the electrode blocks 36C may be electrically connected to one another. The upper electrode 36 may have only one electrode block 36C.

(Modification 3)

In the above-described embodiments and the modifications thereof, for example, as illustrated in FIG. 32, each of the electrode blocks 32C may have the connection section 32B that is connected to ends of respective partial electrodes 32A in the non-overlap region 32-2. In such a case, when a certain partial electrode 32A in the non-overlap region 32-2 is disconnected, it is possible to apply a voltage to the disconnected partial electrode 32A through the connection section 32B.

Further, in the present modification, when the upper electrode 36 has the plurality of electrode blocks 36C, each of the electrode blocks 36C may have the connection section 36B connected to the ends of respective partial electrodes 36A in the non-overlap region 36-2. In such a case, when a certain partial electrode 36A in the non-overlap region 36-2 is disconnected, it is possible to apply the voltage to the disconnected partial electrode 36A through the connection section 36B.

(Modification 4)

In the above-described embodiments and the modifications thereof, for example, as illustrated in FIG. 34, each of the electrode blocks 32C may further have a connection section 32D (a second connection section) connected to two partial electrodes 32A adjacent to each other of the plurality of partial electrodes 32A that are formed outside the formation region of the other electrode block 32C adjacent in the second direction (in the non-overlap region 32-2). In such a case, when a certain partial electrode 32A in the non-overlap region 32-2 is disconnected, it is possible to apply a voltage to the disconnected partial electrode 32A through the connection section 32D.

Further, in the present modification, when the upper electrode 36 has the plurality of electrode blocks 36C, for example, as illustrated in FIG. 35, each of the electrode blocks 36C may further have a connection section 36D connected to two partial electrodes 36A adjacent to each other of the plurality of partial electrodes 36A that are formed outside the formation region of the other electrode block 36C adjacent in the second direction (in the non-overlap region 36-2). In such a case, when a certain partial electrode 36A in the non-overlap region 36-2 is disconnected, it is possible to apply a voltage to the disconnected partial electrode 36A through the connection section 36D.

(Modification 5)

In the above-described embodiments and the modifications thereof, for example, as illustrated in FIG. 36, in each of the electrode blocks 32C, the connection section 32B may be electrically connected to the partial electrodes 32A through vias 32E. At this time, each of the vias 32E is a conductive member penetrating through the interlayer insulating film, and electrically connects a conductive member (for example, the partial electrode 32A) in a lower layer of the interlayer insulating film to a conductive member (for example, the connection section 32B) in an upper layer of the interlayer insulating film. In such a case, it is possible to apply disconnection countermeasures of the partial electrodes 32A while securing flexibility of arrangement layout of the lower electrode 32. Note that, instead of the vias 32E, openings penetrating through the interlayer insulating film may be provided simply. Incidentally, in this case, the connection section 32B or the partial electrode 32A may be formed in the above-described opening, and the connection section 32B and the partial electrode 32A may be in contact with each other in the opening.

Further, in the present modification, when the upper electrode 36 has the plurality of electrode blocks 36C, for example, as illustrated in FIG. 37, in each of the electrode blocks 36C, the connection section 36B may be electrically connected to the partial electrodes 36A through vias 36E. At this time, each of the vias 36E is a conductive member penetrating through the interlayer insulating film, and electrically connects a conductive member (for example, the partial electrode 36A) in a lower layer of the interlayer insulating film to a conductive member (for example, the connection section 36B) in an upper layer of the interlayer insulating film. In such a case, it is possible to apply disconnection countermeasures of the partial electrodes 36A while securing flexibility of arrangement layout of the lower electrode 36. Note that, instead of the vias 36E, openings penetrating through the interlayer insulating film may be provided simply. Incidentally, in this case, the connection section 36B or the partial electrode 36A may be formed in the above-described opening, and the connection section 36B and the partial electrode 36A may be in contact with each other in the opening.

(Modification 6)

In the above-described embodiments and the modifications thereof, when the upper electrode 36 is a single sheet electrode, the sheet electrode may be patterned. Moreover, in the above-described embodiments and the modifications thereof, when the upper electrode 36 includes the plurality of partial electrodes 36A, each of the partial electrodes 36A may be patterned. This makes it possible to perform uniformization of in-plane luminance of illumination light more easily. Further, it is possible to reduce absorption of visible light by the electrodes because the area of the electrodes is decreased when the upper electrode 36 or the partial electrode 36A is formed of ITO or the like.

The patterning formed in the upper electrode 36 or the partial electrode 36A may be configured of a plurality of openings 36F. At this time, a pattern density of the upper electrode 36 or the partial electrode 36A (occupancy of a part other than the openings 36F of the upper electrode 36 or the partial electrode 36A per unit area) with respect to the entire upper electrode 36 may be preferably varied depending on distance from the light source 20. For example, density of the openings 36F (occupancy of the openings 36F per unit area) with respect to the entire upper electrode 36 may be varied depending on the distance from the light source 20, as illustrated in FIG. 38A, FIG. 38B, FIG. 39A, and FIG. 39B. In the examples illustrated in FIG. 38A and FIG. 39A, the number of openings 36F per unit area is fixed irrespective of the distance from the light source 20, whereas a radius r of the opening 36F is gradually decreased with increase in distance from the light source 20. Moreover, in the examples illustrated in FIG. 38B and FIG. 39B, the radius r of the opening 36F is fixed ($r=a_1$) irrespective of the distance from the light source 20, whereas the number of openings 36F per unit area is gradually decreased with increase in distance from the light source 20. Accordingly, in any of the examples of FIG. 38A, FIG. 38B, FIG. 39A, and FIG. 39B, the density of the openings 36F becomes sparse (is gradually decreased) with increase in distance from the light source 20. In other words, the pattern density of the upper electrode 36 or the partial electrode 36A becomes dense (is gradually increased) with increase in distance from the light source 20.

The pattern density of the upper electrode 36 or the partial electrode 36A (the occupancy of a part other than the openings 36F of the upper electrode 36 or the partial electrode 36A per unit area) may be relatively large in a region closer to a light source block 25 described later (see FIG. 41B and FIG. 41C) and may be relatively decreased in a region farther from the light source block 25 in a direction parallel to the light incident surface 10A. For example, as illustrated in FIG. 38A and FIG. 39A, the radius of the opening 36F may be relatively large in a region closer to the light source block 25 and may be relatively small in a region farther from the light source block 25 in the direction parallel to the light incident surface 10A. For example, as illustrated in FIG. 38B and FIG. 39B, the number of openings 36F (the radius thereof is fixed) per unit area may be relatively large in a region closer to the light source block 25, and may be relatively small in a region farther from the light source block 25, in the direction parallel to the light incidence surface 10A. In such a case, in the direction parallel to the light incidence surface 10A, the luminance in a region closer to the light source block 25 is allowed to be suppressed as compared with the case where the openings 36F are not provided, and the luminance in a region farther from the light source block 21 is allowed to be enhanced as compared with the case where the openings 36F are not provided. As a result, for example, when the entire light emission region of the illumination apparatus 1 or 2 is put in a bright state, the in-plane luminance is allowed to be uniformized.

For example, in the case where the patterning density in a region away from the light incidence surface 10A by 2 mm has a distribution represented in FIG. 40A, the in-plane luminance is allowed to be uniformized in the direction parallel to the light incidence surface 10A as represented by A in FIG. 40B. On the other hand, for example, in the case where the patterning density in a region farther from the light incidence surface 10A by 2 mm has a flat distribution represented by B in FIG. 40A, the in-plane luminance is largely varied in the direction parallel to the light incidence surface 10A as represented by B in FIG. 40B. Note that, in the present modification, when point light sources 23 are used instead of the light source blocks 25, the density of the openings 36F per unit area may be relatively large in a region closer to the point light sources 23, and may be relatively small in a region farther from the point light sources 23, in the direction parallel to the light incidence surface 10A. Also in such a case, the in-plane luminance is allowed to be uniformized in the direction parallel to the light incidence surface 10A.

Note that the pattern density of the upper electrode 36 or the partial electrode 36 with respect to the entire upper electrode 36 is not necessarily varied depending on the distance from the light source 20. For example, the pattern density of the upper electrode 36 or the partial electrode 36A may be varied depending on the distance from the light source 20 for each part opposing to the partial electrode 32A.

(Modification 7)

In the above-described respective embodiments and the modifications thereof, for example, as illustrated in FIG. 41A, the light source 20 may be configured of a linear light source 21 and a reflective mirror 22 provided behind the linear light source 21. Moreover, in the above-described respective embodiments and the modifications thereof, as illustrated in FIG. 41B and FIG. 41C, the light source 20 may include a plurality of point light sources 23 arranged in line. At this time, for example, as illustrated in FIG. 41B and FIG. 41C, the plurality of point light sources 23 may be provided one by one or two by two or more on respective common substrates 24. In this case, the light source block 25 is configured of one substrate 24 and the plurality of point light sources 23 provided on the substrate 24. For example, the substrate 24 may be a circuit board provided with a wiring that electrically connects the point light sources 23 to the drive circuit 50, and each of the point light sources 23 is mounted on the circuit board. The respective point light sources 23 provided on the common substrate 24 (the respective point light sources 23 in the light source block 25) are collectively (non-independently) driven by the drive circuit 50, and for example, although not illustrated, may be connected in parallel or in series to one another. In addition, the point light sources 23 provided on different substrates 24 (the point light sources 23 in the respective light source blocks 25) may be independently driven by the drive circuit 50, and may be connected to current paths different from one another, for example, as illustrated in FIG. 41C.

In the present modification, for example, as illustrated in FIG. 42A, the light guide plate 10 may include a plurality of strip-shaped projections 11 on the top surface thereof. Incidentally, for example, as illustrated in FIG. 42B, the light guide plate 10 may include the plurality of strip-shaped projections 11 on the bottom surface thereof. In addition, although not illustrated, for example, the strip-shaped projections 11 may be provided in the light guide plate 10. Moreover, the inside of the light guide plate 10 may be hollow or may be densely packed. This allows the light L output from the light source block 25 to propagate through the light guide plate 10 while suppressing spread of the light L in a lateral direction (the width direction).

The projections 11 each extend in the direction parallel to the normal of the light incidence surface 10A, and for example, as illustrated in FIG. 42A and FIG. 42B, the projections 11 may be formed successively from one side surface of the light guide plate 10 to the other side surface opposing to that side surface. A cross-sectional surface in an arrangement direction of each of the projections 11 may have, for example, a rectangular shape, a trapezoidal shape, or a triangular shape. When the cross-sectional surface in the arrangement direction of each of the projections 11 has a rectangular shape, a rectilinear propagation property of light is extremely high, and the light guide plate 10 having such projections 11 is suitable for a large-scale backlight. When the cross-sectional surface in the arrangement direction of each of the projections 11 has a trapezoidal shape, processing of a die used to form each of the projections 11 by injection molding, extrusion molding, heat-press molding, or the like is easy, and mold releasability in molding is high, and yields and molding speed are allowed to be improved due to a reduction in errors.

A flat surface may or may not be disposed between adjacent projections 11. The height of each of the projections 11 may be uniform or nonuniform in a plane. For example, as illustrated in 43A and 43B, when one side surface of the light guide plate 10 is the light incident surface 10A, the height of each of the projections 11 may be relatively smaller on the light incident surface 10A side, and relatively higher on a side surface side facing the light incident surface 10A. Moreover, for example, when a pair of opposing side surfaces among the side surfaces of the light guide plate 10 are light incident surfaces 10A, the height of each of the projections 11 may be relatively lower at and in proximity to both of the light incident surfaces 10A, and is relatively higher in other regions. The height at and in proximity to the light incident surface 10A of each of the projections 11 may be zero or substantially zero. For example, as illustrated in FIG. 43A and FIG. 43B, the height of each of the projections 11 may be increased from the light incident surface 10A side toward the side surface side opposing to the light incident surface 10A. At this time, the height of each of the projections 11 may be uniform in a midway from the light incident surface 10A to the side surface side opposing to the light incident surface 10A. Incidentally, a plurality of projections 11 with nonuniform height as illustrated in FIG. 43A and FIG. 43B may be disposed in a region other than the top surface of the light guide plate 10, and for example, may be disposed on the bottom surface of the light guide plate 10 or in the light guide plate 10.

As described above, varying the height of each of the projections 11 (in other words, varying the depth of a groove formed between the projections 11) enables varying of the rectilinear propagation property of light. For example, as illustrated in FIG. 42A and FIG. 42B, in the case where the projections 11 are disposed on and in proximity to the light incident surface 10A, when one light source block 25 is turned on, for example, as illustrated in FIG. 44A, light L emitted from the light source block 25 propagates through the light guide plate 10 while not spreading too much in a lateral direction (a width direction). In this case, a dark region may be generated between the point light sources 23 in proximity to the light incident surface 10A, and in this case, image quality may be degraded. Therefore, in such a case, for example, as illustrated in FIG. 43A and FIG. 43B, the height of each of the projections 11 may be preferably set to be relatively low or zero at and in proximity to the light incident surface 10A. In doing this way, for example, as illustrated in FIG. 44B, the light L emitted from the light source block 25 is allowed to be spread in the lateral direction (the width direction) at a divergent angle of the point light source 23 at and in proximity to the light incident surface 10A, and therefore, the light L is allowed to propagate with a substantially uniform width in a region distant from the light incident surface 10A.

In the present modification, for example, as illustrated in FIG. 45, the drive circuit 50 may turn on a part of (one or more) light source blocks 25 as well as may drive a part of (one or more) of the plurality of electrode blocks 32C arranged in the second direction. At this time, block-like light that is smooth in boundary in both the X direction and Y direction is output from the scattering region 30B corresponding to intersection between the electrode block 32C driven by the drive circuit 50 and an optical path of the light output from the light source block 25.

(Modification 8)

In the above-described embodiments and the modifications thereof, the light modulation device 30 or 60 is closely bonded to the backside (the bottom surface) of the light guide plate 10 without an air layer. However, for example, as illustrated in FIG. 46, the light modulation device 30 or 60 may be closely bonded to the top surface of the light guide plate 10 without an air layer. In addition, for example, as illustrated in FIG. 47, the light modulation device 30 or 60 may be provided inside the light guide plate 10. However, also in this case, it is necessary for the light modulation device 30 or 60 to be closely bonded to the light guide plate 10 without an air layer.

(Modification 9)

In the above-described embodiments and the modifications thereof, the light guide plate 10 is provided. However, for example, as illustrated in FIG. 48, the light guide plate 10 may be omitted. Incidentally, in this case, the transparent substrate 31 or the transparent substrate 37 functions as the light guide plate 10. Therefore, the light source 20 is provided on a side surface of the transparent substrate 31 or the transparent substrate 37. Note that the light source 20 may be provided on a side surface one of the transparent substrate 31 and the transparent substrate 37, or may be provided on side surfaces of both the transparent substrate 31 and the transparent substrate 37.

(Modification 10)

In the above-described embodiments and the modifications thereof, the reflector 40 is provided. However, for example, as illustrated in FIG. 49, the reflector 40 may be omitted. At this time, the lower electrode 32 may not be formed of a transparent material, and for example, may be formed of a metal. Incidentally, when the lower electrode 32 is formed of a metal, the lower electrode 32 has a function to reflect incident light similarly to the reflector 40. Further, in the present modification, for example, as illustrated in FIG. 50, the light guide plate 10 may be omitted.

(Modification 11)

In the above-described embodiments and the modifications thereof, nothing is particularly provided on the light guide plate 10. However, for example, as illustrated in FIG. 51, FIG. 52, and FIG. 53, the illumination apparatus 1 or 2 may include an optical sheet 90 (for example, a diffuser plate, a diffuser sheet, a lens film, or a polarization separation sheet) on the light emission side. In such a case, part of the light emitted from the light guide plate 10 in the oblique direction stands up in the front direction, and thus the front luminance is allowed to be effectively improved.

5. Application Example

Next, an application example of the illumination apparatuses 1 and 2 according to the above-described embodiments and the modifications thereof will be described.

FIG. 54 illustrates an example of a schematic configuration of a display unit 100 according to the present application example. The display unit 100 includes a liquid crystal display panel 110 and a backlight 120 disposed behind the liquid crystal display panel 110. In this example, the backlight 120 corresponds to the illumination apparatuses 1 and 2 according to the above-described embodiments and the modifications thereof.

The liquid crystal display panel 110 is to display a picture. The liquid crystal display panel 110 has a plurality of pixels arranged in a matrix, and is capable of displaying a picture when the plurality of pixels are driven based on a picture signal. For example, the liquid crystal display panel 110 may be a transmissive liquid crystal display panel, and has a configuration in which a liquid crystal layer is sandwiched between a pair of transparent substrates. For example, although not illustrated, the liquid crystal display panel 110 has a polarizer, a transparent substrate, pixel electrodes, an alignment film, a liquid crystal layer, an alignment film, a common electrode, a color filter, a transparent substrate, and a polarizer in order from the backlight 120 side.

The transparent substrate may be formed of a substrate transparent to visible light, for example, a plate glass. Incidentally, although not illustrated, an active drive circuit including a TFT (thin film transistor) electrically connected to the pixel electrodes and wirings and the like is formed on the transparent substrate on the backlight 120 side. The pixel electrodes and the common electrode may be each formed of, for example, ITO. The pixel electrodes are arranged in lattice arrangement or delta arrangement on the transparent substrate, and each function as an electrode for each pixel. On the other hand, the common electrode is formed on a surface of the color filter, and functions as a common electrode opposing to the pixel electrodes. The alignment film may be formed of a polymer material such as polyimide, and performs alignment treatment on the liquid crystal. The liquid crystal layer may be formed of a liquid crystal of, for example, VA (Vertical Alignment) mode, TN (Twisted Nematic) mode, or STN (Super Twisted Nematic) mode, and has a function of changing the direction of the polarizing axis of the light emitted from the backlight 120 for each pixel, in response to a voltage applied from the drive circuit (not illustrated). Incidentally, the direction of the transmission axis for each pixel is adjusted at multiple levels by changing the arrangement of the liquid crystal at multiple levels. The color filter is configured by arranging, corresponding to the arrangement of the pixel electrodes, color filters that separates light that has passed through the liquid crystal layer, into three primary colors of red (R), green (G), and blue (B), for example, or into four colors of R, G, B, and white (W). Examples of the filter arrangement (pixel arrangement) include, typically, stripe arrangement, diagonal arrangement, delta arrangement, and rectangle arrangement.

The polarizer is one kind of an optical shutter, and allows light (polarized light) that oscillates in a certain direction to pass therethrough. Note that the polarizer may be an absorption type polarizing device absorbing light (polarized light) that oscillates in a direction other than the transmission axis; however, the polarizer may be preferably a reflection type polarizing device reflecting the light toward the backlight 120 side in terms of luminance improvement. The polarizers are disposed so that the polarizing axes are different by 90 degrees from each other, and this allows the light emitted from the backlight 120 to pass therethrough through the liquid crystal layer or to be blocked.

For example, the drive circuit 50 controls the magnitude of the voltage applied to each of the light modulation cells 30a so that the optical axes AX2 and AX4 of the microparticles 34B and 64B are parallel to the optical axes AX1 and AX3 of the bulks 34A and 64A, respectively, in a cell corresponding to a pixel position of black display out of the plurality of light modulation cells 30a. Further, for example, the drive circuit 50 controls the magnitude of the voltage applied to each of the light modulation cells 30a so that the optical axes AX2 and AX4 of the microparticles 34B and 64B intersect with the optical axes AX1 and AX3 of the bulk 34A and 64A, respectively, in a cell corresponding to the pixel position of white display out of the plurality of light modulation cells 30a.

The drive circuit 50 is allowed to drive only a part (one or more) of the plurality of electrode blocks 32C. For example, as illustrated in FIG. 11A, the drive circuit 50 may drive only a part (one or more) of the plurality of electrode blocks 32C that are arranged in the second direction. At this time, strip-like light is emitted from the scattering region 30B corresponding to the electrode block 32C driven by the drive circuit 50. Moreover, for example, as illustrated in FIG. 11B, the drive circuit 50 may drive only a part (one or more) of the plurality of electrode blocks 32C that are arranged in the second direction and the third direction. At this time, block-like light is emitted from the scattering region 30B corresponding to the electrode block 32C driven by the drive circuit 50.

At this time, when driving the plurality of electrode blocks 32C, the drive circuit 50 applies the voltage that is modulated based on the distance of the electrode block 32C from the light source 20, to each of the electrode blocks 32C. Specifically, for example, the drive circuit 50 may apply the voltage whose crest value, duty ratio, and frequency are modulated based on distance of the electrode block 32C from the light source 20, to each of the electrode blocks 32C. For example, the voltage may be modulated so that the scattering property of the light modulation cell 30a is increased with increase in distance from the light source 20. Further, for example, the drive circuit 50 may apply, to the partial electrodes 32A, the voltage whose crest value, duty ratio, and frequency are modulated in consideration of a picture signal input from the outside in addition to the distance of the partial electrode 32A from the light source 20.

The luminance of the scattering region 30B is extremely high as compared with the case where the luminance is made uniform (alternate long and short dash line in (B) of FIG. 10), and the luminance of the partial white display (luminance enhancement) is increased by a decreased amount of the luminance of the transmissive region 30A. Accordingly, contrast of a liquid crystal display is improved. In addition, with use of the "luminance enhancement", the drive circuit 50 is allowed to decrease light emission amount from the light source 20 by an amount of luminance that is to be increased by the "luminance enhancement" to the same level as that in the case where the luminance is made uniform (alternate long and short dash line in (B) of FIG. 10), and thus is allowed to decrease power consumed by the light source 20.

The drive circuit 50 sequentially drives the plurality of electrode blocks 32C in each predetermined unit (for example, one by one). For example, as illustrated in FIG. 12A and FIG. 12B, the drive circuit 50 sequentially drives the plurality of electrode blocks 32C arranged in the second direction, in each predetermined unit (for example, one by one). At this time, the scattering region 30B is scanned in the second direction by driving by the drive circuit 50, and the strip-like light is accordingly scanned in the second direction. At this time, the luminance that is obtained by averaging the illumination light for time by one scanning period indicates the brightness actually viewable by eyes. Moreover, for example, as illustrated in FIG. 13A and FIG. 13B, the drive circuit 50 may sequentially drive the plurality of electrode blocks 32C arranged in the second direction and the third direction in each predetermined unit (for example, one by one). At this time, the scattering region 30B is scanned in the second direction by driving by the drive circuit 50, and the block-like light is accordingly scanned in the second direction.

Here, the drive circuit 50 may preferably perform scanning of the plurality of electrode blocks 32C in the direction same as the scanning direction of the pixels of the display panel, in synchronization with the scanning of the pixels of the display panel. In such a case, it is possible to perform display with high luminance and improved moving picture responsiveness (blurring).

Further, the drive circuit 50 may adjust the light amount of the light source 20 in consideration of the distance from the light source 20 and a picture signal input from the outside while sequentially driving the plurality of electrode blocks 32C in each predetermined unit (for example, one by one). At this time, the drive circuit 50 may preferably perform scanning of the plurality of electrode blocks 32C in the direction same as the scanning direction of the pixels of the display panel, in synchronization with the scanning of the pixels of the display panel. In such a case, it is possible to perform display with low power consumption and improved moving picture responsiveness (blurring).

In the present application example, the illumination apparatus 1 or 2 according to the above-described embodiments and the modifications thereof is used as the light source (the backlight 120) illuminating the liquid crystal display panel 110. Accordingly, it is possible to improve display luminance while light leakage in a range where a view angle is large is reduced or substantially eliminated. As a result, it is possible to increase modulation ratio in the front direction. Further, it is possible to achieve luminance enhancement without increasing power applied to the backlight 120.

Moreover, in the present application example, since the illumination apparatus 1 or 2 according to the above-described embodiments and the modifications thereof is used as the backlight 120, it is possible to blur a boundary between a bright part and a dark part in the illumination light at the time of partial lighting and to make illumination light uniform at the time of full lighting. In addition, it is possible to blur a boundary between a bright part and a dark part in the illumination light at each moment of scanning in scan driving, and to make the illumination light uniform at the time when the illumination light is averaged for one frame period of the display panel Moreover, for example, the present technology may be configured as follows.

(1) An illumination apparatus including:

a pair of substrates arranged oppositely to each other with a distance;

a light source disposed on a side surface of one or both of the pair of substrates;

an electrode disposed on a surface of each of the pair of substrates, and configured to generate an electric field in a direction intersecting perpendicularly to the surface of the substrate; and a light modulation layer disposed at a clearance between the pair of substrates, and exhibiting scattering property or transparency to light from the light source, based on magnitude of the electric field generated by the electrode, wherein the electrode includes a plurality of first electrode blocks that are disposed on a surface of one of the pair of substrates, and each of the first electrode blocks includes a plurality of partial electrodes that each extend in a first direction and are arranged in a direction intersecting the first direction.

(2) The illumination apparatus according to (1), wherein the plurality of first electrode blocks are arranged in at least a second direction out of the second direction and a third direction intersecting the second direction, each of the first electrode blocks is formed in a region including a part of a formation region of other first electrode block adjacent in the second direction, in a state where the plurality of partial electrodes of each of the first electrode blocks are insulated from the plurality of partial electrodes of the other first electrode block adjacent in the second direction, and in each of the first electrode blocks, two or more of the partial electrodes are formed in the formation region of other first electrode block adjacent in the second direction, and are arranged mixedly with two or more of the partial electrodes included in the other first electrode block adjacent in the second direction.

(3) The illumination apparatus according to (2), wherein, in each of the first electrode blocks, two or more of the partial electrodes are formed outside the formation region of the other first electrode block adjacent in the second direction.

(4) The illumination apparatus according to (2) or (3), wherein the first direction is a direction parallel to or substantially parallel to the side surface.

(5) The illumination apparatus according to any one of (2) to (4), wherein the second direction is a direction perpendicular to or substantially perpendicular to the side surface.

(6) The illumination apparatus according to any one of (2) to (5), wherein each of the first electrode blocks has a first connection section connected to ends of the respective partial electrodes.

(7) The illumination apparatus according to (6), wherein the plurality of first electrode blocks are arranged to allow directions of comb tooth to be alternately inverted, the comb tooth being formed of the plurality of partial electrodes and the first connection section.

(8) The illumination apparatus according to (6) or (7), wherein each of the first electrode blocks has a second connection section connected to two partial electrodes adjacent to each other out of the plurality of partial electrodes that are formed outside the formation region of other first electrode block adjacent in the second direction.

(9) The illumination apparatus according to any one of (2) to (8), wherein in each of the first electrode blocks, widths of respective two or more partial electrodes formed in a formation region of other first electrode block that is adjacent in the second direction and is located relatively farther from the light source decrease as a distance from the light source increases, and in each of the first electrode blocks, widths of respective two or more partial electrodes formed in a formation region of other electrode block that is adjacent in the second direction and is located relatively closer to the light source increase as a distance from the light source increases.

(10) The illumination apparatus according to (3), wherein in each of the first electrode blocks, widths of respective two or more partial electrodes formed outside the formation region of other first electrode block adjacent in the second direction increase as a distance from the light source increases.

(11) The illumination apparatus according to (3), wherein in each of the first electrode blocks, width of respective two or more partial electrodes formed outside the formation region of other first electrode block adjacent in the second direction increase as a distance from the light source increases, in each of the first electrode blocks, width of respective two or more partial electrodes formed in a formation region of other first electrode block that is adjacent in the second direction and is located relatively farther from the light source decrease as a distance from the light source increases, and in each of the first electrode blocks, width of respective two or more partial electrodes formed in a formation region of other first electrode block that is adjacent in the second direction and is located relatively closer to the light source increase as a distance from the light source increases.

(12) The illumination apparatus according to any one of (2) to (11), wherein the electrode has one second electrode block or a plurality of second electrode blocks arranged in at least the second direction out of the second direction and the third direction, on the surface of the other of the pair of substrates, and the one or the plurality of second electrode blocks each include a plurality of partial electrodes that each extend in the first direction and are arranged in a direction intersecting the first direction, and the second electrode blocks are arranged at positions opposing to the respective first electrode blocks.

(13) The illumination apparatus according to any one of (1) to (12), further including a drive circuit configured to apply, to each of the first electrode blocks, a voltage that is modulated based on a distance of the first electrode block from the light source.

(14) The illumination apparatus according to any one of (1) to (13), further including a drive circuit configured to sequentially drive the plurality of first electrode blocks in each predetermined unit.

(15) The illumination apparatus according to any one of (1) to (14), wherein one or both of the pair of substrates each include a plurality of projections each extending in a direction parallel to a normal of the side surface, and the light source is configured of a plurality of light source blocks capable of being driven independently of one another.

(16) The illumination apparatus according to (16), wherein heights of the respective projections are low in a region closer to the light source, and are high in a region farther from the light source.

(17) The illumination apparatus according to (1), wherein in each of the first electrode blocks, width of the respective partial electrodes are small on a side closer to the light source, and are gradually increased with increase in distance from the light source.

(18) A display unit provided with a display panel configured to display a picture and an illumination apparatus configured to illuminate the display panel, the illumination apparatus including:

a pair of substrates arranged oppositely to each other with a distance;

a light source disposed on a side surface of one or both of the pair of substrates;

an electrode provided on a surface of each of the pair of substrates, and configured to generate an electric field in a direction intersecting perpendicularly to the surface of the substrate; and a light modulation layer disposed at a clearance between the pair of substrates, and configured to exhibit scattering property or transparency to light from the light source, based on magnitude of the electric field generated by the electrode, wherein the electrode includes a plurality of first electrode blocks that are disposed on a surface of one of the pair of substrates, and each of the first electrode blocks includes a plurality of partial electrodes that each extend in a first direction and are arranged in a direction intersecting the first direction.

(19) The display unit according to (18), further including a drive circuit configured to sequentially drive the plurality of first electrode blocks in each predetermined unit, and configured to perform scanning of the plurality of first electrode blocks in a direction same as a scanning direction of pixels of the display panel, in synchronization with the scanning of the pixels of the display panel.

(20) The display unit according to (19), wherein the drive circuit adjusts light amount of the light source in consideration of a distance from the light source and a picture signal input from outside, while sequentially driving the plurality of first electrode blocks in each predetermined unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An illumination apparatus comprising:
a pair of substrates arranged oppositely to each other with a distance;
a light source disposed on a side surface of one or both of the pair of substrates;
an electrode disposed on a surface of each of the pair of substrates, and configured to generate an electric field in a direction intersecting perpendicularly to the surface of the substrate; and
a light modulation layer disposed at a clearance between the pair of substrates, and exhibiting scattering property or transparency to light from the light source, based on magnitude of the electric field generated by the electrode, wherein
the electrode includes a plurality of first electrode blocks that are disposed on a surface of one of the pair of substrates, and
each of the first electrode blocks includes a plurality of partial electrodes that each extend in a first direction and are arranged in a direction intersecting the first direction, wherein
the plurality of first electrode blocks are arranged in at least a second direction out of the second direction and a third direction intersecting the second direction,
each of the first electrode blocks is formed in a region including a part of a formation region of other first electrode block adjacent in the second direction, in a state where the plurality of partial electrodes of each of the first electrode blocks are insulated from the plurality of partial electrodes of the other first electrode block adjacent in the second direction, and in each of the first electrode blocks, two or more of the partial electrodes are formed in the formation region of other first electrode block adjacent in the second direction, and are arranged mixedly with two or more of the partial electrodes included in the other first electrode block adjacent in the second direction.

2. The illumination apparatus according to claim 1, wherein, in each of the first electrode blocks, two or more of the partial electrodes are formed outside the formation region of the other first electrode block adjacent in the second direction.

3. The illumination apparatus according to claim 2, wherein in each of the first electrode blocks, widths of respective two or more partial electrodes formed outside the formation region of other first electrode block adjacent in the second direction increase as a distance from the light source increases.

4. The illumination apparatus according to claim 2, wherein
in each of the first electrode blocks, width of respective two or more partial electrodes formed outside the formation region of other first electrode block adjacent in the second direction increase as a distance from the light source increases,
in each of the first electrode blocks, width of respective two or more partial electrodes formed in a formation region of other first electrode block that is adjacent in the second direction and is located relatively farther from the light source decrease as a distance from the light source increases, and
in each of the first electrode blocks, width of respective two or more partial electrodes formed in a formation region of other first electrode block that is adjacent in the second direction and is located relatively closer to the light source increase as a distance from the light source increases.

5. The illumination apparatus according to claim 1, wherein the first direction is a direction parallel to or substantially parallel to the side surface.

6. The illumination apparatus according to claim 1, wherein the second direction is a direction perpendicular to or substantially perpendicular to the side surface.

7. The illumination apparatus according to claim 1, wherein each of the first electrode blocks has a first connection section connected to ends of the respective partial electrodes.

8. The illumination apparatus according to claim 7, wherein the plurality of first electrode blocks are arranged to allow directions of comb tooth to be alternately inverted, the comb tooth being formed of the plurality of partial electrodes and the first connection section.

9. The illumination apparatus according to claim 7, wherein each of the first electrode blocks has a second connection section connected to two partial electrodes adjacent to each other out of the plurality of partial electrodes that are formed outside the formation region of other first electrode block adjacent in the second direction.

10. The illumination apparatus according to claim 1, wherein
in each of the first electrode blocks, widths of respective two or more partial electrodes formed in a formation region of other first electrode block that is adjacent in the second direction and is located relatively farther from the light source decrease as a distance from the light source increases, and
in each of the first electrode blocks, widths of respective two or more partial electrodes formed in a formation region of other electrode block that is adjacent in the second direction and is located relatively closer to the light source increase as a distance from the light source increases.

11. The illumination apparatus according to claim 1, wherein
the electrode has one second electrode block or a plurality of second electrode blocks arranged in at least the second direction out of the second direction and the third direction, on the surface of the other of the pair of substrates, and
the one or the plurality of second electrode blocks each include a plurality of partial electrodes that each extend in the first direction and are arranged in a direction intersecting the first direction, and
the second electrode blocks are arranged at positions opposing to the respective first electrode blocks.

12. The illumination apparatus according to claim 1, further comprising
a drive circuit configured to apply, to each of the first electrode blocks, a voltage that is modulated based on a distance of the first electrode block from the light source.

13. The illumination apparatus according to claim 1, further comprising
a drive circuit configured to sequentially drive the plurality of first electrode blocks in each predetermined unit.

14. The illumination apparatus according to claim 1, wherein
one or both of the pair of substrates each include a plurality of projections each extending in a direction parallel to a normal of the side surface, and
the light source is configured of a plurality of light source blocks capable of being driven independently of one another.

15. The illumination apparatus according to claim 14, wherein heights of the respective projections are low in a region closer to the light source, and are high in a region farther from the light source.

16. An illumination apparatus comprising:
a pair of substrates arranged oppositely to each other with a distance;
a light source disposed on a side surface of one or both of the pair of substrates;
an electrode disposed on a surface of each of the pair of substrates, and configured to generate an electric field in a direction intersecting perpendicularly to the surface of the substrate; and
a light modulation layer disposed at a clearance between the pair of substrates, and exhibiting scattering property or transparency to light from the light source, based on magnitude of the electric field generated by the electrode, wherein
the electrode includes a plurality of first electrode blocks that are disposed on a surface of one of the pair of substrates, and
each of the first electrode blocks includes a plurality of partial electrodes that each extend in a first direction and are arranged in a direction intersecting the first direction, wherein in each of the first electrode blocks, width of the respective partial electrodes are small on a side closer to the light source, and are gradually increased with increase in distance from the light source.

17. A display unit provided with a display panel configured to display a picture and an illumination apparatus configured to illuminate the display panel, the illumination apparatus according to claim 16.

18. A display unit provided with a display panel configured to display a picture and an illumination apparatus configured to illuminate the display panel, the illumination apparatus comprising:
a pair of substrates arranged oppositely to each other with a distance;
a light source disposed on a side surface of one or both of the pair of substrates;
an electrode provided on a surface of each of the pair of substrates, and configured to generate an electric field in a direction intersecting perpendicularly to the surface of the substrate; and
a light modulation layer disposed at a clearance between the pair of substrates, and configured to exhibit scattering property or transparency to light from the light source, based on magnitude of the electric field generated by the electrode, wherein
the electrode includes a plurality of first electrode blocks that are disposed on a surface of one of the pair of substrates, and
each of the first electrode blocks includes a plurality of partial electrodes that each extend in a first direction and are arranged in a direction intersecting the first direction, wherein
the plurality of first electrode blocks are arranged in at least a second direction out of the second direction and a third direction intersecting the second direction,
each of the first electrode blocks is formed in a region including a part of a formation region of other first electrode block adjacent in the second direction, in a state where the plurality of partial electrodes of each of the first electrode blocks are insulated from the plurality of partial electrodes of the other first electrode block adjacent in the second direction, and
in each of the first electrode blocks, two or more of the partial electrodes are formed in the formation region of other first electrode block adjacent in the second direction, and are arranged mixedly with two or more of the partial electrodes included in the other first electrode block adjacent in the second direction.

19. The display unit according to claim 18, further comprising
a drive circuit configured to sequentially drive the plurality of first electrode blocks in each predetermined unit, and configured to perform scanning of the plurality of first electrode blocks in a direction same as a scanning direction of pixels of the display panel, in synchronization with the scanning of the pixels of the display panel.

20. The display unit according to claim 19, wherein the drive circuit adjusts light amount of the light source in consideration of a distance from the light source and a picture signal input from outside, while sequentially driving the plurality of first electrode blocks in each predetermined unit.

* * * * *